(12) United States Patent (10) Patent No.: US 8,498,893 B2
Kincaid (45) Date of Patent: Jul. 30, 2013

(54) SYSTEMS AND METHODS FOR PROVIDING DISTRIBUTED RECURSIVE VOTING

(76) Inventor: Ian Kincaid, Hardwick, NJ (US)

( * ) Notice: Subject to any disclaimer, the term of this patent is extended or adjusted under 35 U.S.C. 154(b) by 198 days.

(21) Appl. No.: 13/278,236

(22) Filed: Oct. 21, 2011

(65) Prior Publication Data

US 2012/0035988 A1 Feb. 9, 2012

Related U.S. Application Data

(63) Continuation of application No. 12/476,341, filed on Jun. 2, 2009, now abandoned.

(60) Provisional application No. 61/059,120, filed on Jun. 5, 2008.

(51) Int. Cl.
*G06F 11/00* (2006.01)
*G07B 15/02* (2011.01)

(52) U.S. Cl.
USPC ............... 705/12; 705/16; 705/59; 380/262; 380/278; 380/279

(58) Field of Classification Search
USPC .............. 705/12, 16, 21, 59, 71; 380/44, 262, 380/278
See application file for complete search history.

(56) References Cited

U.S. PATENT DOCUMENTS

| 8,150,429 B1* | 4/2012 | Zheng | 455/466 |
| 2003/0182177 A1* | 9/2003 | Gallagher et al. | 705/10 |
| 2005/0171794 A1* | 8/2005 | Lubetzky | 705/1 |
| 2007/0265909 A1* | 11/2007 | Piccionelli | 705/12 |

* cited by examiner

*Primary Examiner* — Dante Ravetti
(74) *Attorney, Agent, or Firm* — Jennifer Meredith, Esq.; Meredith & Keyhani, PLLC

(57) ABSTRACT

A recursive voting method: creating an original initiative which requires a vote response, transmitting the original initiative to first tier recipient(s); transmitting the initiative by at least one first tier recipient to at least one second tier recipient to provide selected second tier recipients; receiving by each first tier recipient a tabulation of vote responses from the selected second tier recipients to provide a second tier vote tabulation; providing a first tier vote tabulation for each first tier recipient according to the second tier vote tabulation and a vote response from the first tier recipient; sending a first tier vote tabulation for each first tier recipient to the creator of the original initiative to provide an originator total tabulation, submitting a petition according to the originator total tabulation, wherein a preponderance of support responses is needed for the initiative to be submitted for petition; transmitting a vote update.

15 Claims, 43 Drawing Sheets

SYSTEMS AND METHODS FOR PROVIDING DISTRIBUTED RECURSIVE VOTING

REFERENCE TO RELATED APPLICATION

This patent application is a continuation of U.S. patent application Ser. No. 12/476,341 filed Jun. 2, 2009 now abandoned entitled "Direct democracy framework" which claims the benefit of U.S. Provisional Application No. 61/059,120 filed on Jun. 5, 2008, the disclosures of each of which are incorporated herein by reference in their entirety.

COPYRIGHT NOTICE

A portion of the disclosure of this patent document contains material which is subject to copyright protection. The copyright owner has no objection to the facsimile preproduction by anyone of the patent document or the patent disclosure, as it appears in the Patent and Trademark Office patent file or records, but otherwise reserves all copyright rights whatsoever.

BACKGROUND OF THE INVENTION

Field of the Invention

This invention relates to methods and processes for removing inefficiencies and barriers to entry from the direct democratic process, making direct democracy a more fundamental component of everyday life in society.

There is disclosed a voting tool that can be used to quickly reach multitudes of individuals. For example, the user interface of the voting tool includes a checkbox to allow recursive voting; when this feature is selected, users receiving an initiative have the ability to forward it on to a user list of their own choosing. Those users in turn would be able to forward it on to users of their choosing and so on. In this manner, it's possible for an initiative to spread out to vast numbers of individuals within a few iterations of the process. For example, if ten people are asked to respond to an initiative, and they in turn each ask ten more people, and the process is continued for ten cycles, the initiative will reach millions of people, a number which is far more than the practical limits of the number of people who would have access to the appropriate technology to participate in this voting tree. What is needed is a process that allows an end user voting tool to generate a counter-initiative (an initiative that automatically records a vote to oppose the original initiative in conjunction with a vote to support the counter-initiative) or an amended initiative, and still allow the user to record a vote of support or no opinion to the original initiative. Through the constant exchange of initiatives, counter-initiatives, and amended initiatives, the contribution of everyone in the voting tree will be absorbed to ensure that the very best available thinking is included in the final output of the process.

The method of voting disclosed is a software tool that can be integrated into an email or instant messaging application that has the following capabilities: Instead of allowing recipients to respond to the sender with a message of their own, recipients can only respond with predetermined responses (such as support, opposition, or no opinion). This message will be called an initiative. The tool then provides the ability to record a tally of the responses that are received, effectively tracking votes for each initiative.

The tool also includes a checkbox to allow recursive voting; when this feature is selected, users receiving an initiative have the ability to forward it on to a user list of their own choosing. Those users would, in turn, be able to forward it on to users of their choosing, and so on. As responses are sent back up the voting tree created by this recursive process, the tally of incoming responses is calculated and passed back along the tree to the original sender. Note that the voting roster itself is not sent to the original sender, just the end tally. As the process proceeds, the original author of the initiative ends up collecting a total tally of all the votes cast against the original initiative; that tally is then sent back out through the tree so that all users receive constant updates on the votes for and against the initiative as it grows.

The tool allows users to launch counter initiatives and amended initiatives of their own. An amended initiative allows support for the original initiative, whereas a counter initiative automatically includes a vote against the original initiative. As these derivative initiatives move through their own voting trees, they carry with them the original initiative on which they are based as attachments. The tool also supports the automatic submission of a petition by defining a pre-defined voting management server to which to send a copy of the initiative once a specific voting threshold is passed. Notification of the initiation of a petition would flow through the voting tree, allowing other voters to participate in the petition.

The tool also uses a voting management server which combines the functionality of current web based voting servers with an email server to provide several unique capabilities as follows: The voting management server provides an internet browser based version of the previously described end user voting tool. The server also hosts open forums, in which users could subscribe to a specific topic and automatically receive all initiatives submitted to the forum.

The server similarly hosts petitions of successful initiatives, to support large scale petitions, voting management servers have the ability to distribute petitions across multiple servers. The server can also replicate the capabilities of software distribution servers in updating client based end user voting tools. Confirming and registering the identity of a voter is also provided by the voting management server. This process would allow the Direct Democracy Framework to replicate the security found in traditional voting systems.

The voting management server allows for a statistical sampling of voters to be selected so that, in case of particularly important initiatives, those voters could be selected to attend a congress. Finally, these two technology components are brought together in a five step framework that provides the solution with the flexibility to meet the needs of any size of organization. The first step is always performed; then, based on the level of importance of the initiative in question, any of the additional steps that follow may be added: (1) Distributed voting is the first step; it is supported exclusively by the end user voting tool. (2) Petition is the second step in the process; it is supported by the voting management server. (3) Registration is the third step; it is supported by the voting management server. (4) Congress, the fourth step, occurs when a random selection of delegates from the list of registered voters is asked to attend a physical event and confirm their voting record. (5) Ratification is the fifth and final step in the process; in this step, direct democracy initiatives are incorporated into traditional democratic legislatures through their own standard voting procedures.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

Other aspects, features, and advantages of the present invention will become more fully apparent from the following detailed description, the appended claim, and the accompanying drawings.

BRIEF DESCRIPTION OF THE DRAWINGS

FIG. 1 shows Initiative Creation;
FIG. 2 shows First Level Response;
FIG. 3 shows First Level Voter Update;
FIG. 4 shows Second Level Send;
FIG. 5 shows Second Level Response;
FIG. 6 shows Second Level Response Received;
FIG. 7 shows Second Level Updates;
FIG. 8 shows Level Updates Reach Second Level;
FIG. 9 is a flow chart of Main Program Loop;
FIG. 10 is a flow chart of Process User Input;
FIG. 11 is a flow chart of Create New Initiative;
FIG. 12 is a flow chart of Search Initiatives;
FIG. 13 is a flow chart of Display Initiative;
FIG. 14 is a flow chart of Edit Existing Initiative;
FIG. 15 is a flow chart of Send Existing Initiative;
FIG. 16 is a flow chart of Recursive Send Process;
FIG. 17 is a flow chart of Vote on Initiative;
FIG. 18 is a flow chart of Voter Response Process;
FIG. 19 is a flow chart of Voter Update Generation Process;
FIG. 20 is a flow chart of Process Inbox Messages;
FIG. 21 is a flow chart of Initiative In-processing;
FIG. 22 is a flow chart of Voter Response In-processing;
FIG. 23 is a flow chart of Vote Update In-processing;
FIG. 24 is a flow chart of Update User Profile;
FIG. 25 is a flow chart of Voter Management Server Message In-processing;
FIG. 26 is a flow chart of Send Petitions;
FIG. 27 is a flow chart of Petition Status Change Process;
and
FIG. 28 is a flow chart of Petition Signature Process.
FIG. 29 is a flow chart of Main Program Loop;
FIG. 30 is a flow chart of Process Administrator Requests-Part 1;
FIG. 31 is a flow chart of Process Administrator Requests-Part 2;
FIG. 32 is a flow chart of Group Administration Process;
FIG. 33 is a flow chart of User Administration Process;
FIG. 34 is a flow chart of Petition Administration Process;
FIG. 35 is a flow chart of Forum Administration Process;
FIG. 36 is a flow chart of Server Configuration Process;
FIG. 37 is a flow chart of Auto Process Inbox;
FIG. 38 is a flow chart of Auto Process Membership Request;
FIG. 39 is a flow chart of Auto Process Petition Request;
FIG. 40 is a flow chart of Auto Process Petition Signature or Link Request;
FIG. 41 is a flow chart of Admin Inbox Process;
FIG. 42 is a flow chart of USER Details Process.

DETAILED DESCRIPTION OF THE INVENTION

Figure 1:
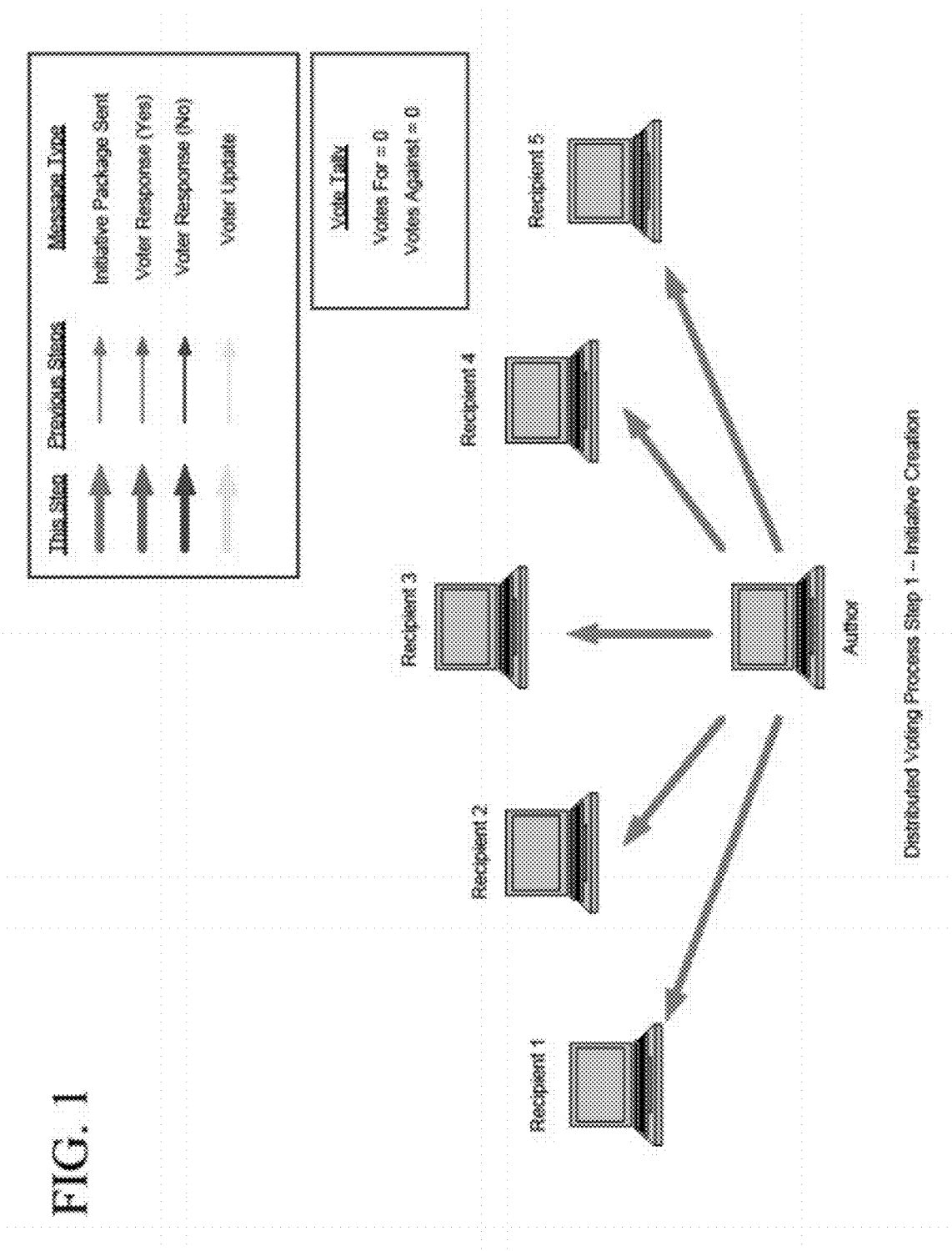
FIGS. 1-8 Illustrate Recursive Voting
Figure 2:
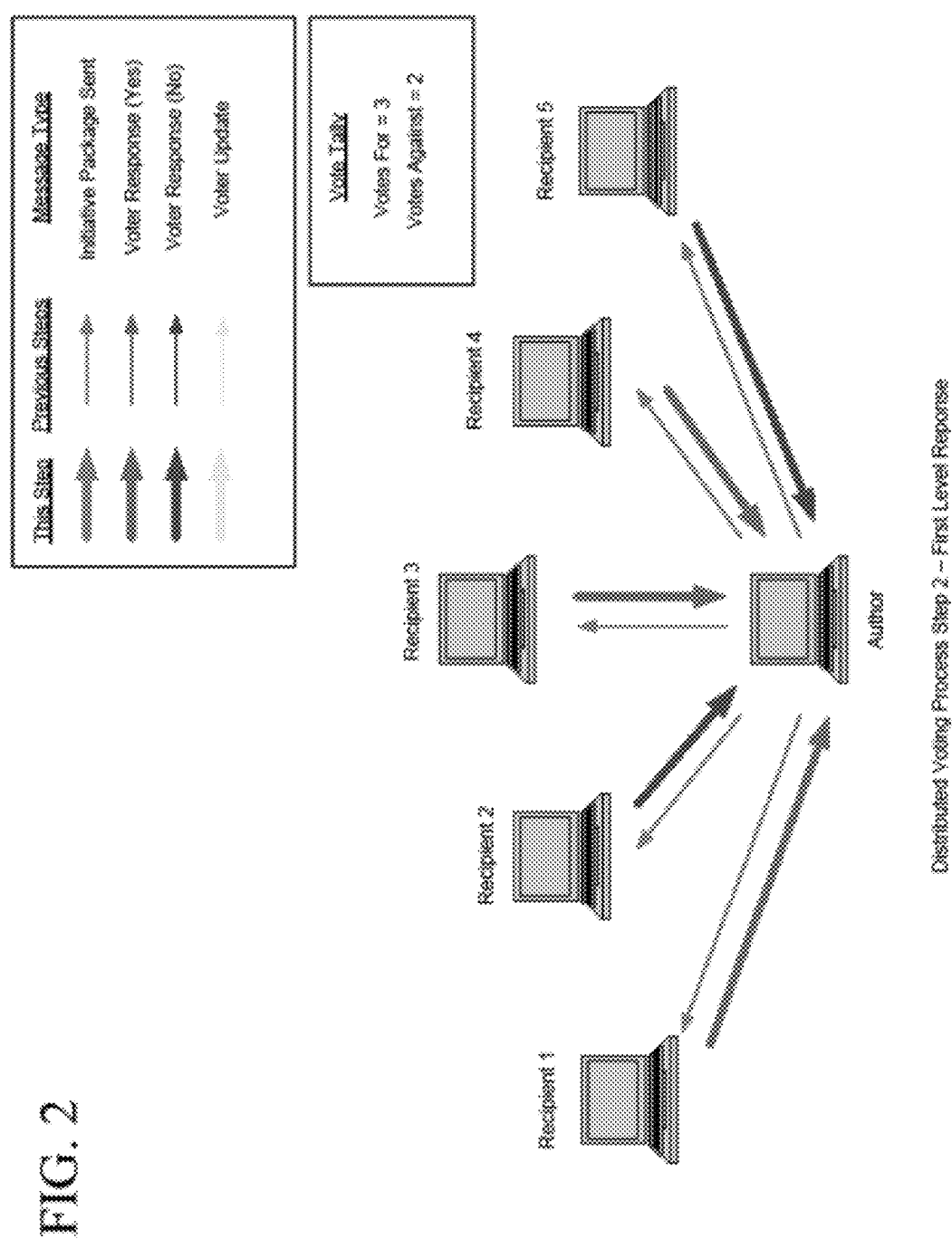
Figure 3:
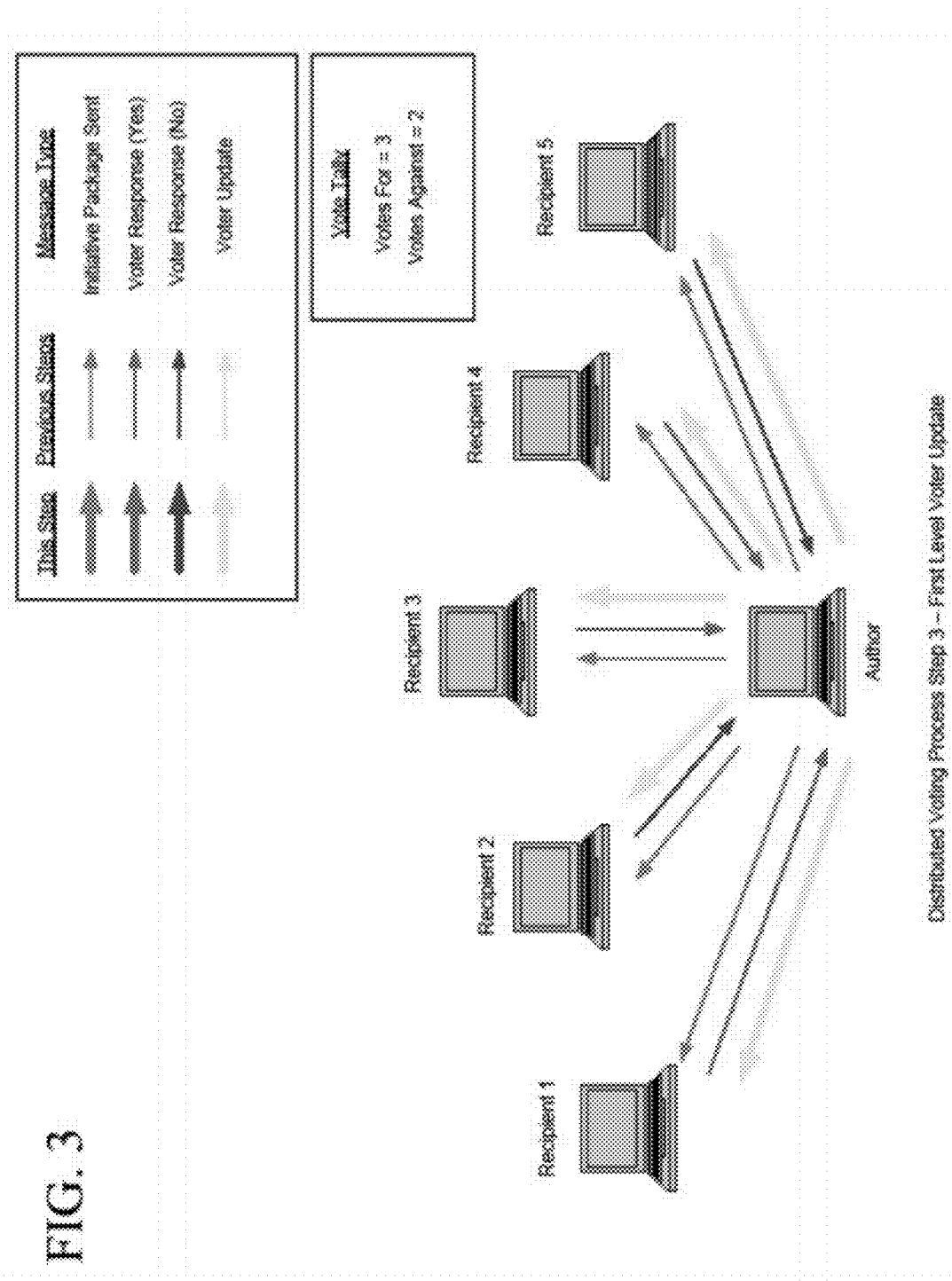
Figure 4:
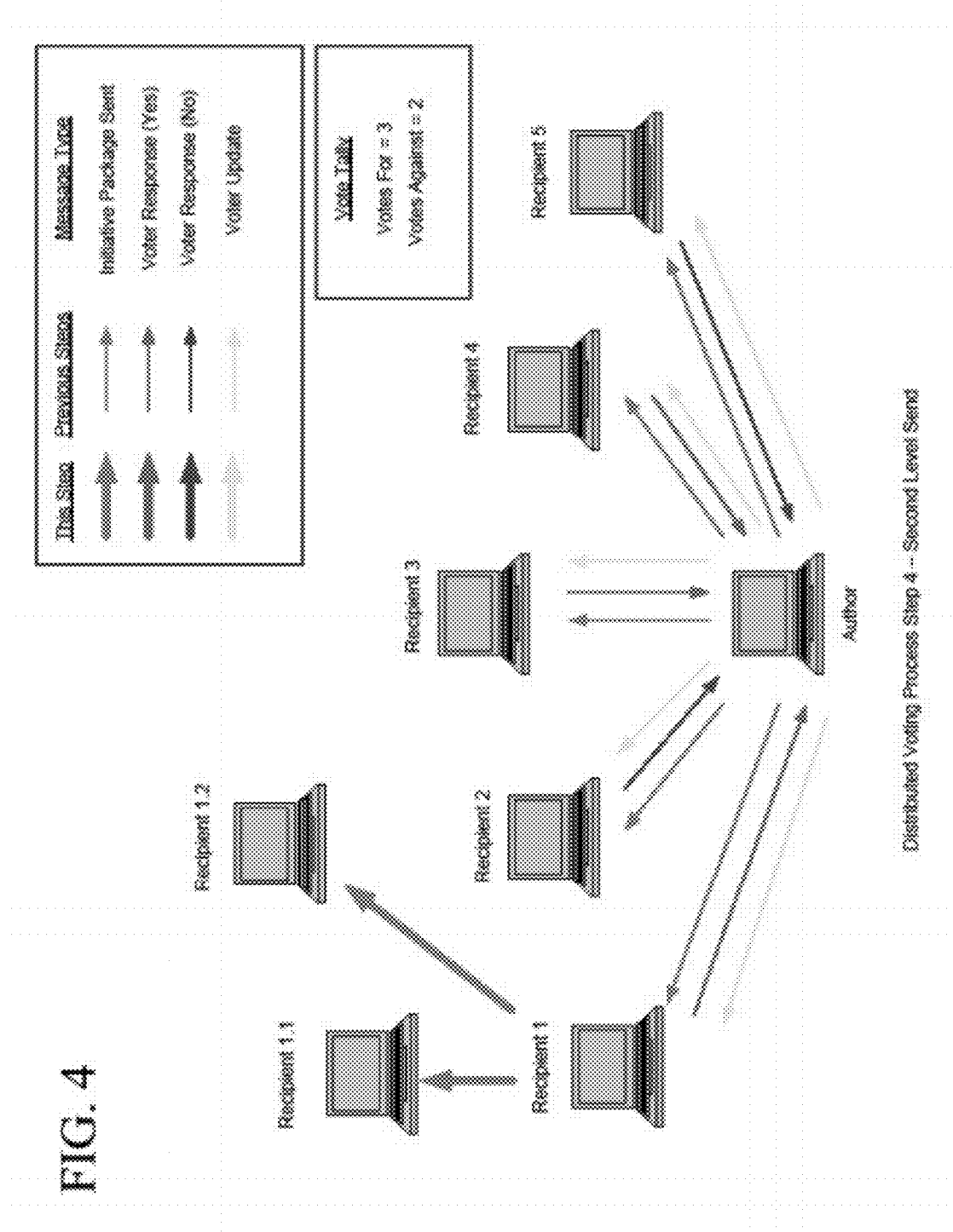
Figure 5:
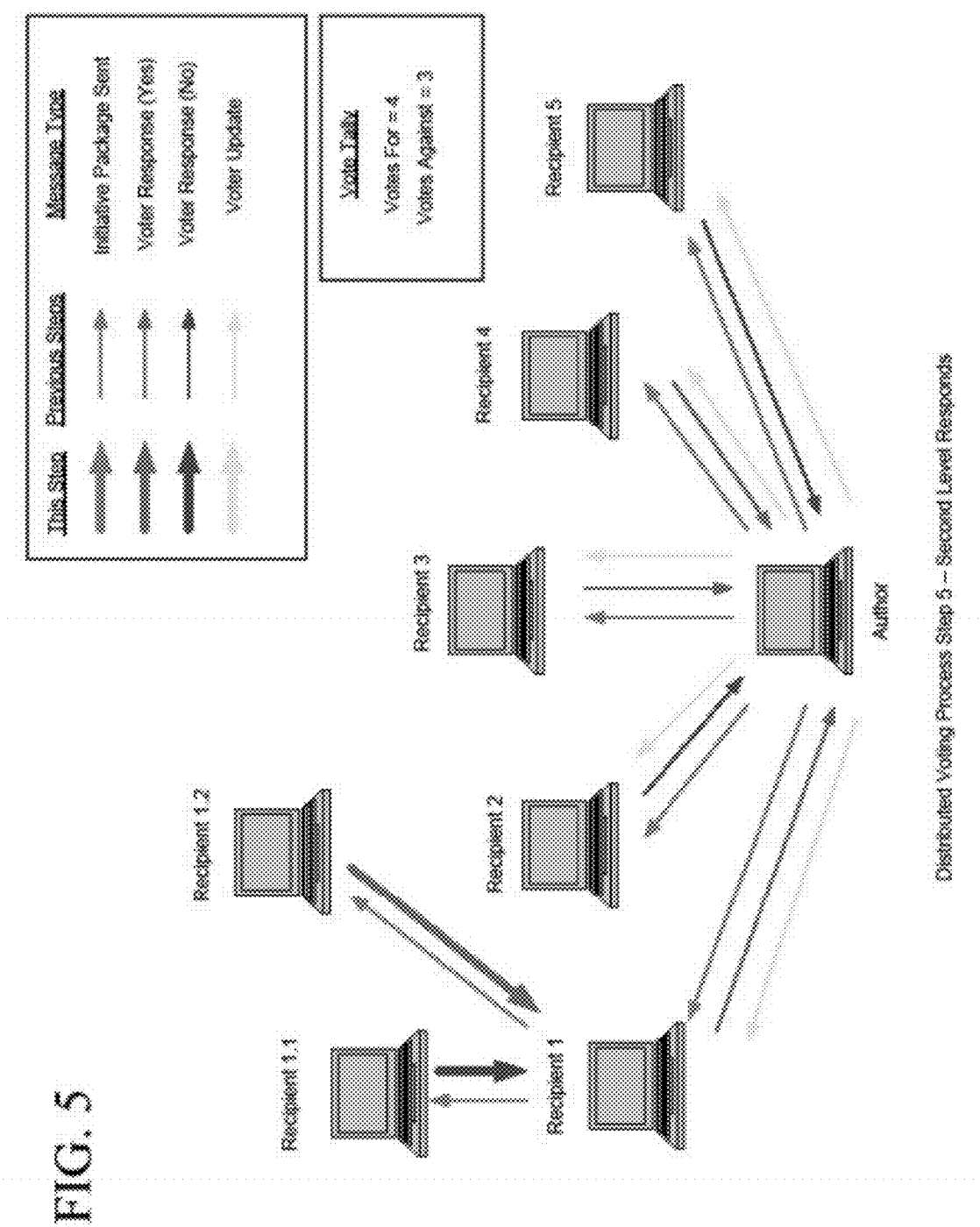
Figure 6:
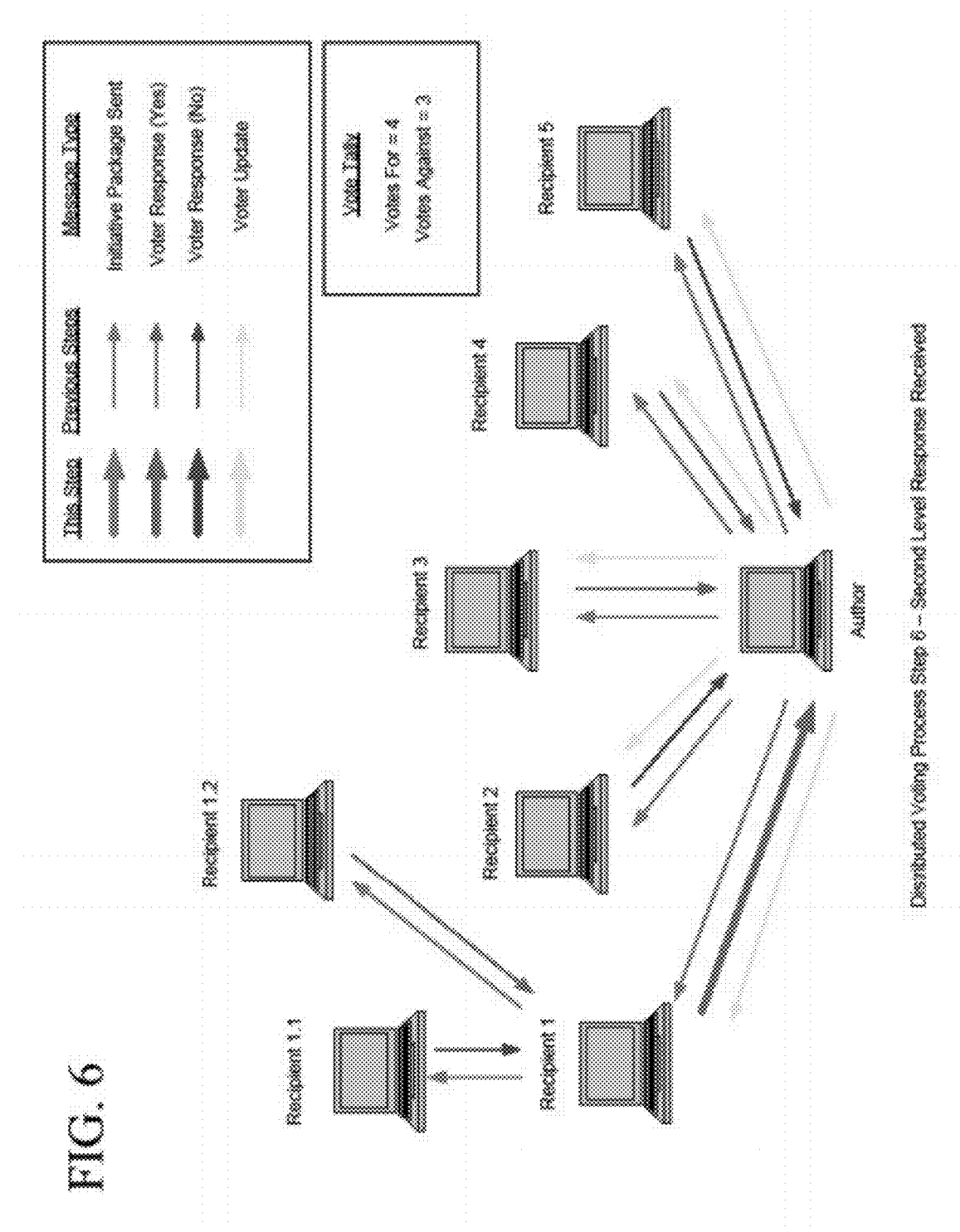
Figure 7:
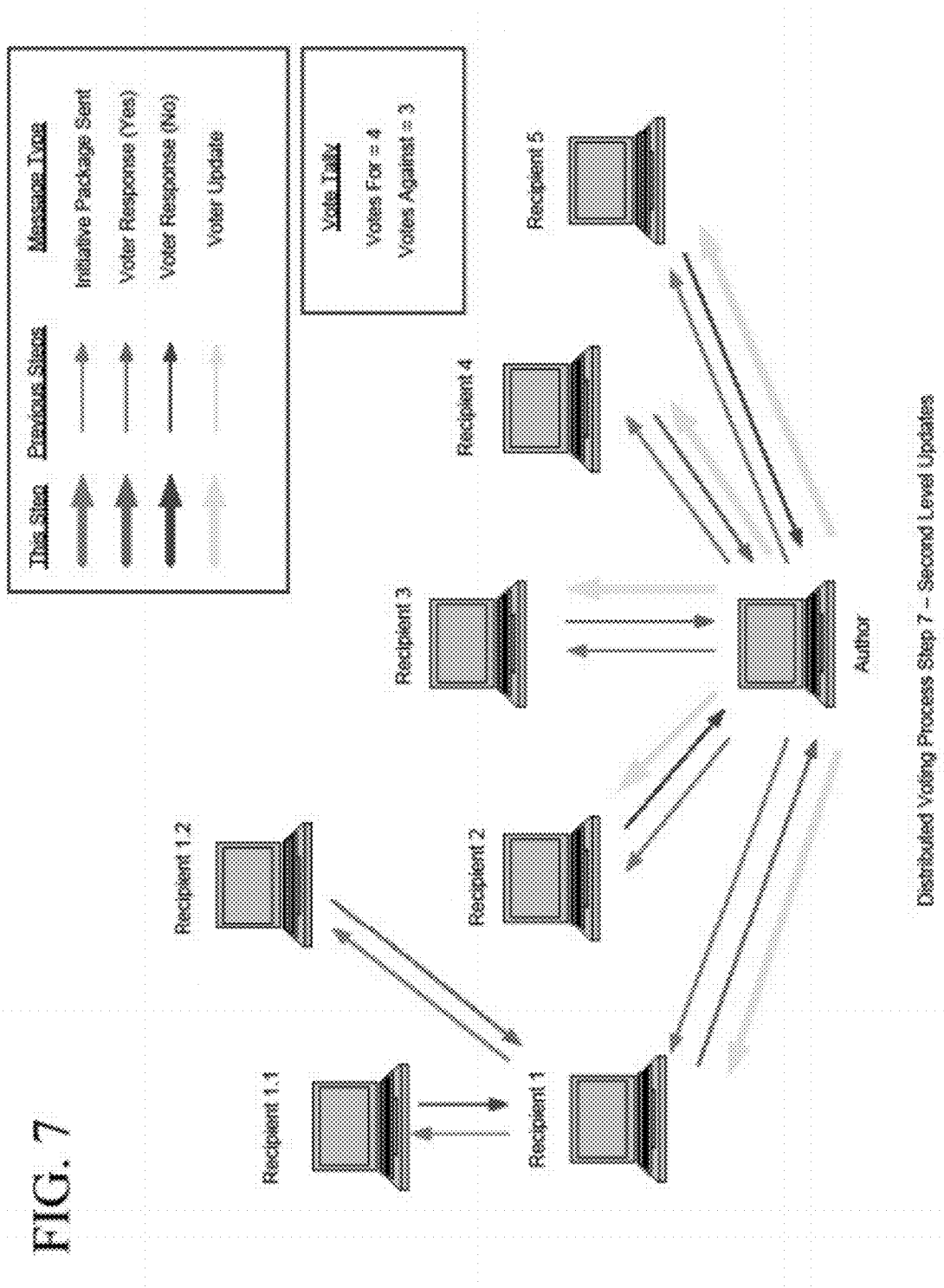
Figure 8:
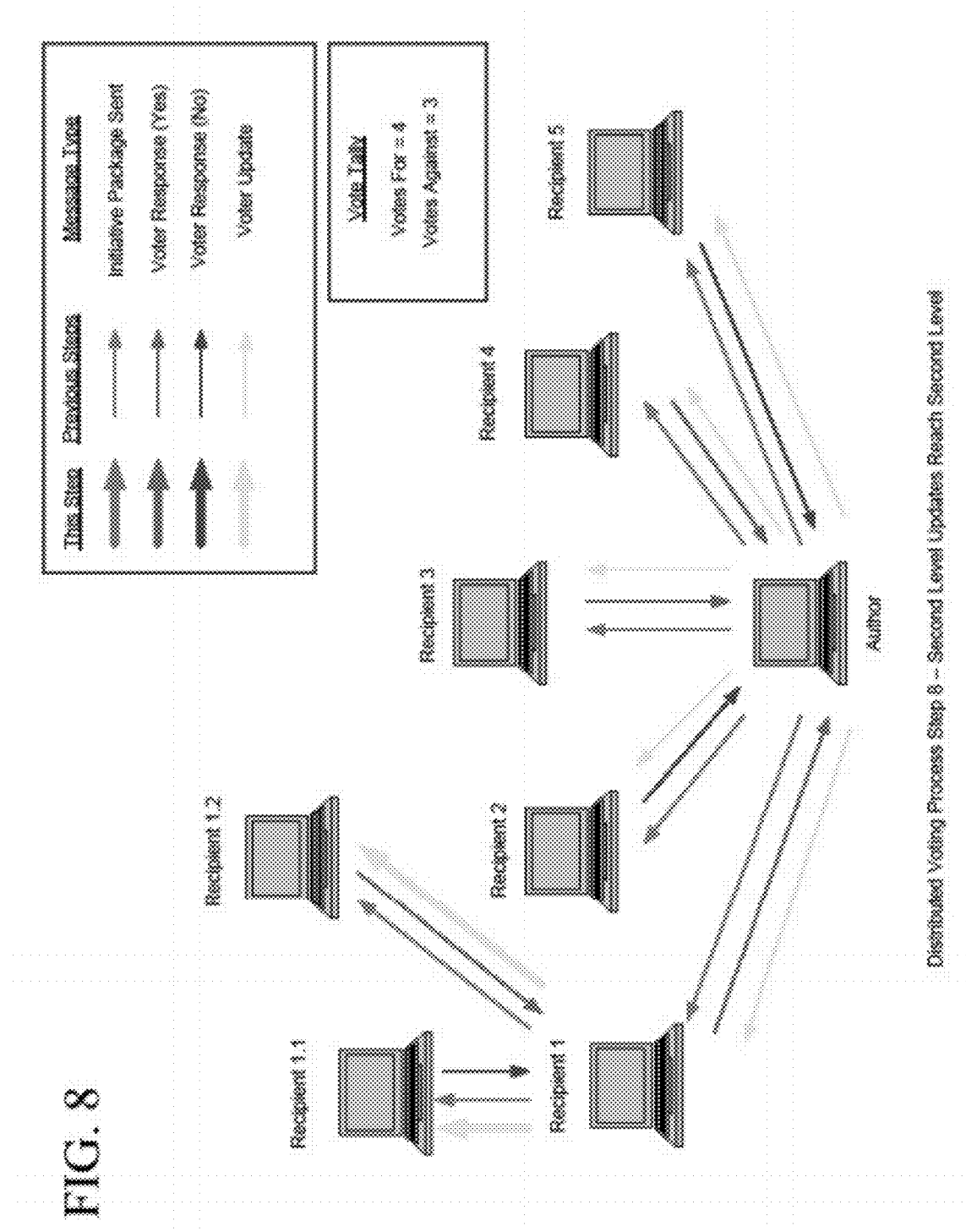
Figure 9:
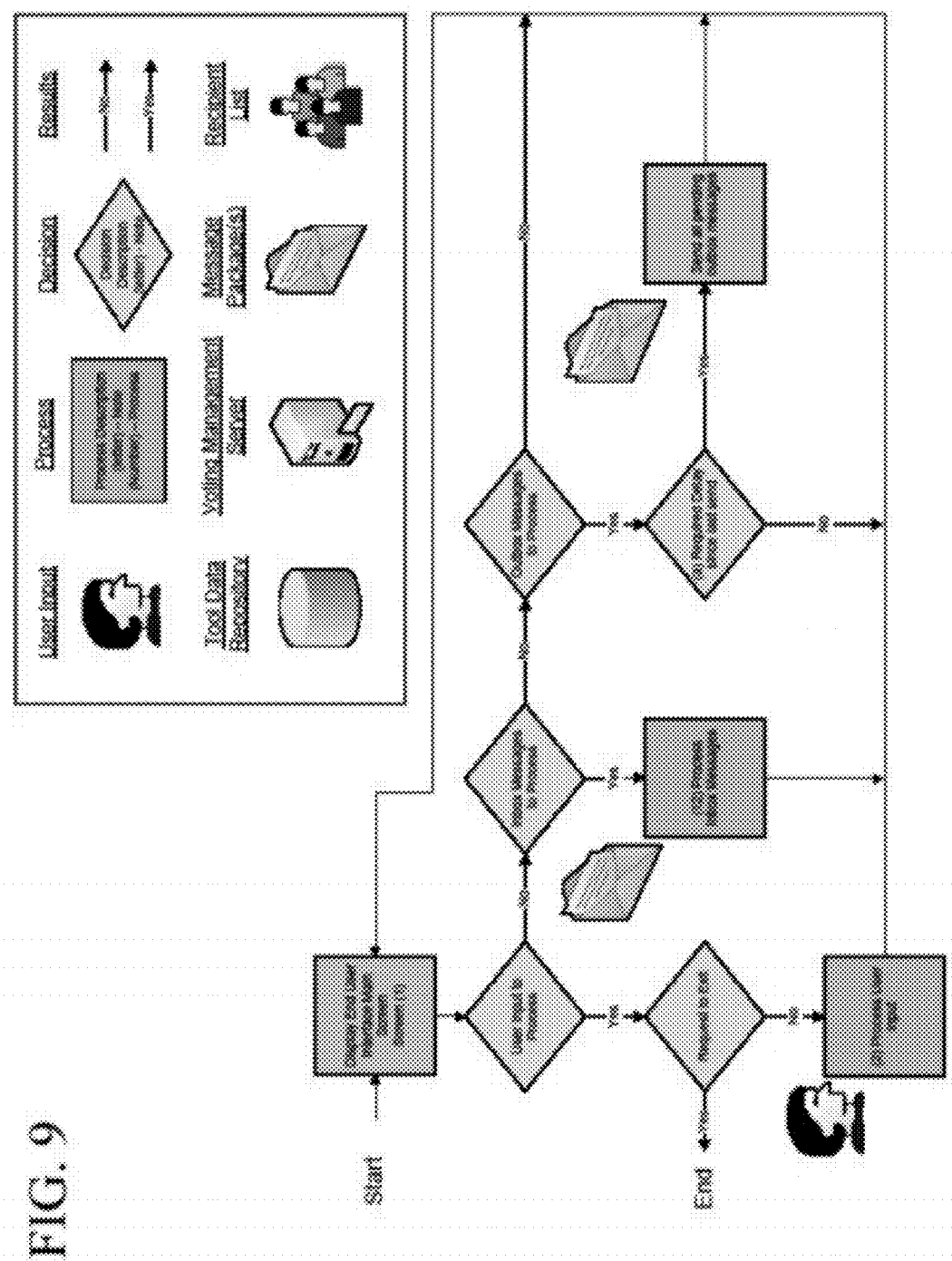
FIGS. 9-28 are End User Voting Flowcharts
Figure 10:
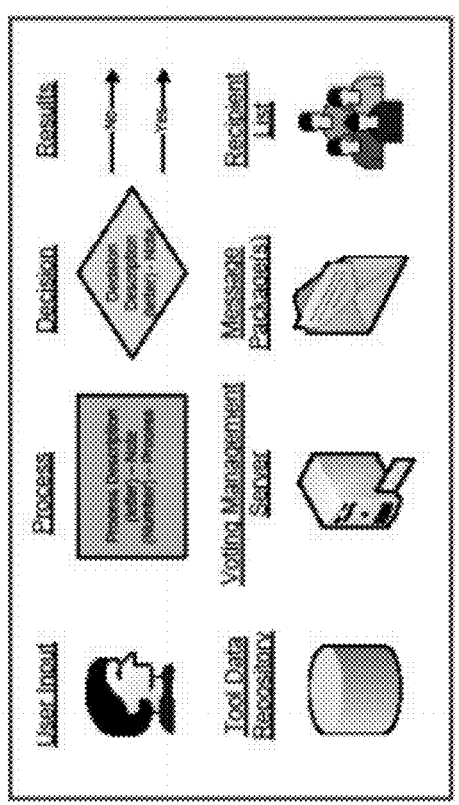
Figure 10:
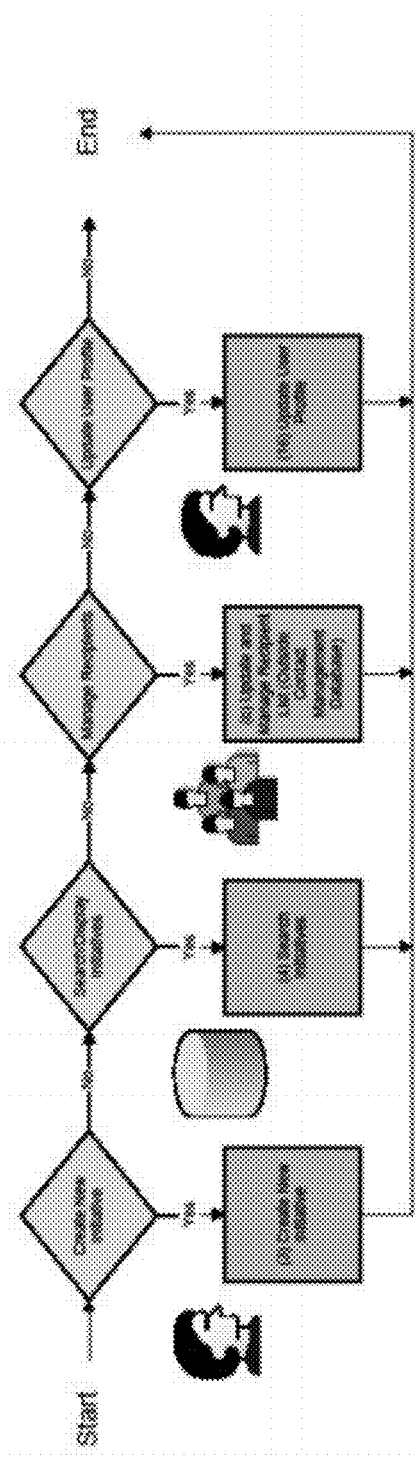
Figure 11:
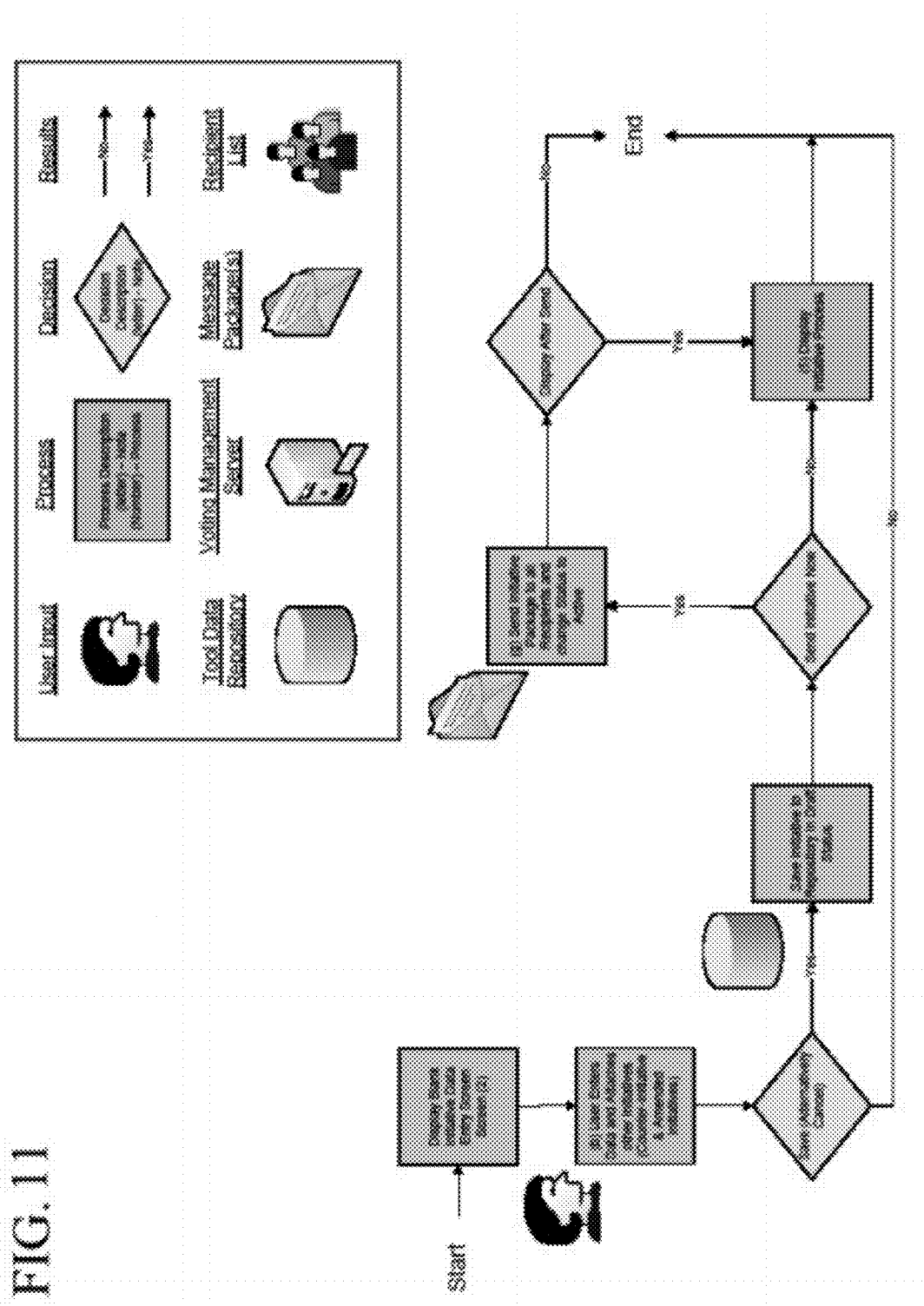
Figure 12:
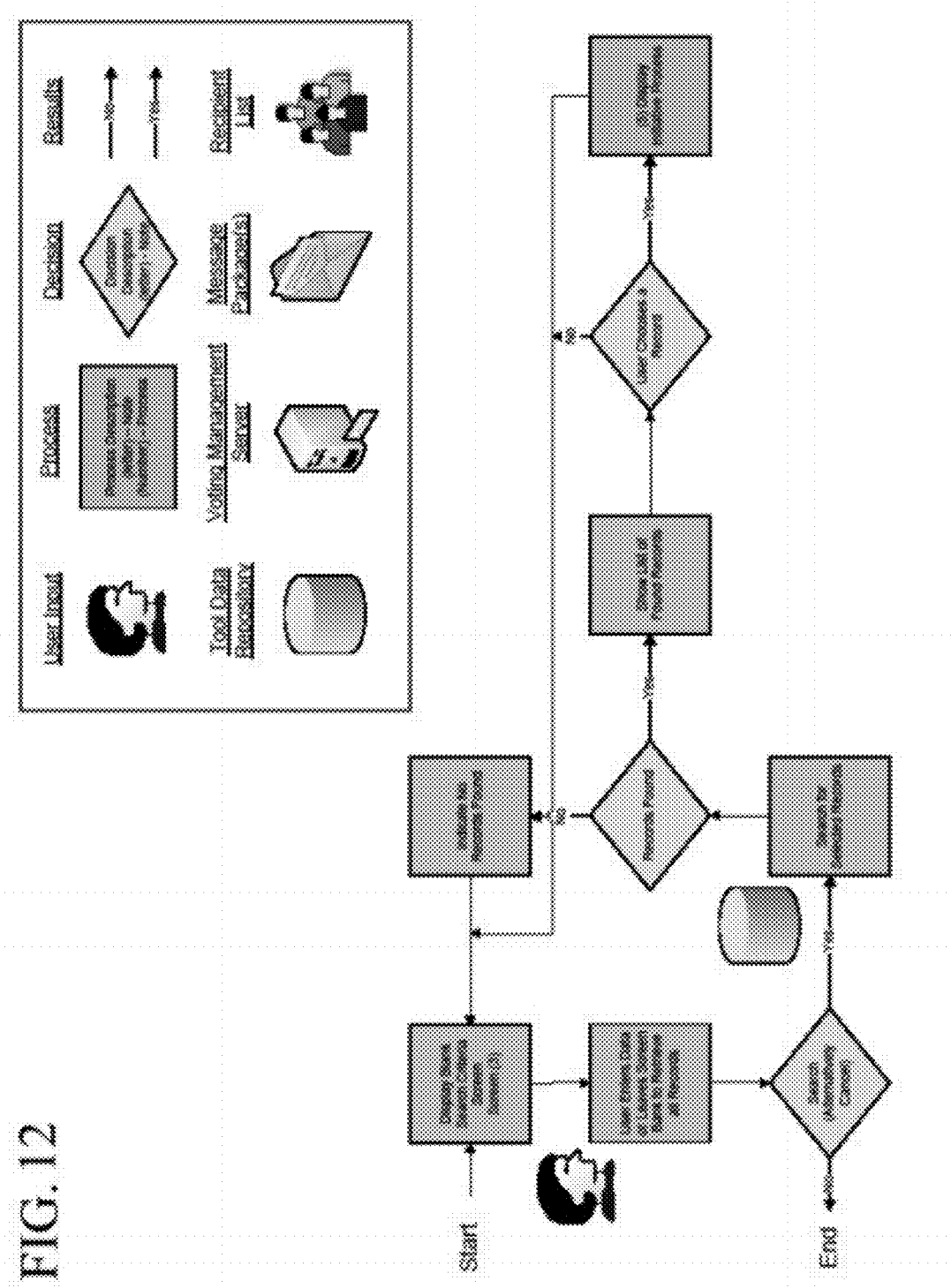
Figure 13:
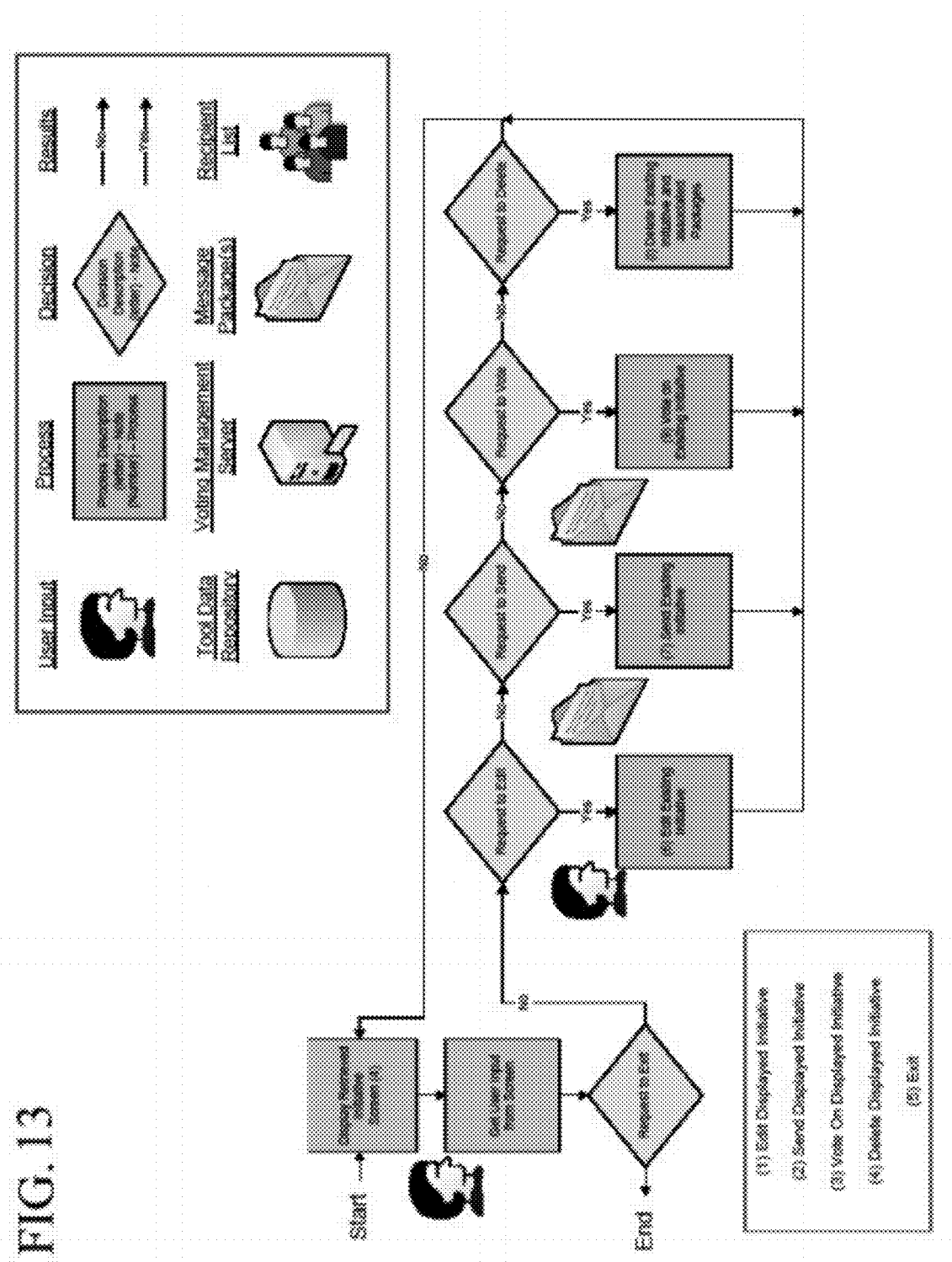

There is disclosed a global infrastructure that would help change the world's political landscape. Utilizing the distributed technology of end-user voting tools—installed on computers, cell phones, and other digital devices across the globe—this new infrastructure would facilitate a viral virtual democracy process identified as distributed voting. When integrated with the centralized management capabilities of a Voting Management Server into a Direct Democracy Framework, this process can dovetail into petitioning, registration, congress, and ratification. Such a system makes it clearly possible to represent the will of the people far more effectively than the often slow-moving voting systems that serve us today, either by providing a conduit of the people's will to existing representative governments or, where appropriate, by facilitated governance by direct democracy.

The End User Voting Tool may only allow recipients to respond with predetermined responses. For example, the predetermined responses may be support, opposition or no opinion. The term "in support" means that recipients agrees with and supports the initiative. For example, the initiative may be "A new traffic light at the corner of Main and North Street." A "support" response means that the person supports or agrees with a new traffic light at the corner of Main and North Street. An "opposition" response means that the voter does not want a new traffic light at the corner of Main and North Street. A response of "no opinion" means that the voter has no opinion on the matter and is not in support of or opposition to the new traffic light at the corner of Main and North Street. Such a tool might be very handy for making extremely quick group decisions, such as where to meet our friends for dinner or whether or not to approve the latest bylaw in a home owners association. Individuals would be able to author something they would like a group or organization to decide on—here referred to as an initiative—and select recipients from their contact lists to gather their input. Note that each step of the present invention may be implemented in and/or by a computer. The computer may or may not be networked and may be any type of microprocessor based computing device. For example, the present invention may be carried out on a network of smart phones or tablet computers without departing from the scope of the present invention.

Communication related to the initiative could take advantage of various communication methods including, email networks, cell phone data networks, and the Internet. Within minutes, responses would begin to come back and a list of people supporting and opposing the decision would emerge. Group actions could then move forward based on the simple and democratic process driving them. Such a tool could be called simply an End User Voting Tool. It is the first of two pieces of technology that are envisioned as part of the larger concept of the Direct Democracy Framework that is discussed in this document. Given the constraints of a tool of this nature, perhaps installed in a personal computer, a laptop computer, personal digital assistant or a cell phone, it becomes a practical solution for groups of any size (for example, a hundred people or less) to make decisions effectively and consider those decisions final.

The Global Reach of Recursive Voting—With today's technology, a single email is sent and resent and can eventually end up arriving in millions of different inboxes. This principle can affect the reach of the End User Voting Tool if security concerns are put aside for a second. Imagine that the user interface of the End User Voting Tool includes a checkbox to allow recursive voting; when this feature is selected, users receiving an initiative have the ability to forward it on to a user list of their own choosing. Those users in turn would be able to forward it on to users of their choosing and so on. In this manner, it's possible for an initiative to spread out to vast numbers of people within a few iterations of the process. For example, if you ask people to respond to an initiative, and they in turn each ask more people—a process that continues for cycles—the initiative in question will reach ten billion people—more than the population of our globe and far more than the practical limits of the number of people who would have access to the appropriate technology to participate in this voting tree.

The process by which people connect to the voting tree might also be accelerated by allowing users to transmit an initiative to an open forum in which other interested parties could subscribe and add themselves to the voting roster. Undoubtedly, users would also use conventional communication techniques such as email, instant messaging, chats, or just meetings over a cup of coffee to exchange dialogue about the initiatives outside the voting process itself. New ideas could then become integrated into the process by allowing the End User Voting Tool to generate a counter-initiative (an initiative that automatically records a vote to oppose the original initiative in conjunction with a vote to support the counter-initiative) or an amended initiative (still allowing the user to record a vote of support or no opinion to the original initiative). Through the constant exchange of initiatives, counter-initiatives, and amended initiatives, the contribution of everyone in the voting tree would be absorbed to ensure that the very best available thinking is included in the final output of the process. In this process of group thinking the true benefits of the End User Voting Tool can be realized.

FIGS. 1 through 8 graphically illustrate an example of recursive voting. First, an initiative is created. In this case, illustrated is an example in which an initiative is first sent to five other users, FIG. 1. The next step involves the first-level recipients of the initiative sending back their responses, FIG. 2. In the third step in the process, once the votes have been received by the initiating end user voting tool, the vote count can automatically be sent out to the first level in the appropriate voter update packages, FIG. 3. At this point in the process, the voting cycle is completed assuming that no recursive voting is desired. For the purposes of illustration, five additional steps have been added to show how a second level is added to the voting tree. This happens when a first-level recipient initiates recursive voting (in this case, Recipient 1), FIG. 4. In the fifth step of the process, recipients in the second level of the tree can now vote. Their responses are sent back to the first level in the form of voter response packages. Although additional votes have been cast, the vote tally has not changed because the newly placed votes have not yet reached the author of the initiative, FIG. 5. The next step consists of the updates from the second level reaching the author and joining the total vote count. This step is automated. At this point, the vote tally now changes, FIG. 6. The seventh step is simply the automated update of the vote tally back to the first level, FIG. 7. Finally, in the automated eighth step, the total vote count reaches the second level, FIG. 8. The process is complete until the status of the initiative changes, any recipient in the tree chooses to change his or her vote or perhaps a recipient initiates further recursive voting.

The Five Steps of the Direct Democracy Framework and the Role of the Voting Management Server—The End User Voting Tool might be very handy if we are looking to make decisions in groups of perhaps a hundred individuals or less. However, larger groups—or even any group where we incorporate recursive voting into the system and create the voting tree previously described—may be vulnerable to fraud and corruption and may not be counted on as a final and reliable electoral process.

To solve this problem, we must combine cultural and organizational components with technology to achieve a workable solution. With that said, let's consider the possibility that the voting process we have described serves as the first of five process steps of the Direct Democracy Framework, a system to support the creation of ideas and law that any individual in the world can initiate. By creating a bright idea and asking our friends and colleagues to support it as well as allowing them to invite their own friends and colleagues to in turn support it, we have now tossed our creative energies into the ring of democratic thinking Step 1—Distributed Voting. We can think of this distributed voting process as the first of the five process steps in the Direct Democracy Framework. We may find that we get a large number of supporting votes; we might then decide to take the second step and submit our initiative for petition to one or more organizations.

Step 2—Petition. To create a virtual petition, we would simply check another box on our end user tool that indicates our ability to petition the initiative. In parallel, we would indicate where we are sending our petition—perhaps to a Direct Democracy Portal hosted by our local town council, our fantasy football league, or even a Global Democratic Union of Humanity. The hosting organization might also host open forums that allow initiatives to spread to users who are proactively interested in a given topic but may not have been contacted yet by someone in the voting tree for a given issue. The technical system that hosts this petition might be thought of as a Voting Management Server; it serves as the second piece of technology required in this process. In addition to hosting petitions and open forums, the Voting Management Server would also serve other purposes, some of which will be discussed later.

The petition process would be simple and similar to the paper petition process with which most people are familiar. An electronic record of the initiator's identity would be sent to the Voting Management Server while the fact that the initiative in question was now being petitioned would simultaneously be transmitted out across the voting tree created when we launched the initiative. Voters further up the tree would receive notification that the initiative they previously supported or opposed was being petitioned; they would then have the opportunity to automatically or manually sign the petition for or the petition against the initiative as well as forward the petition to the users to whom they originally forwarded the initiative.

To support large-scale petitions, Voting Management Servers would have the ability to distribute petitions across multiple servers. A small organization might host a petition on a single Voting Management Server whereas a global institution gathering millions of votes might collect the petition through hundreds or even thousands of interconnected Voting Management Servers. Over time, the petition would grow. The number of people supporting an initiative or opposing the initiative would be tracked, and the sponsoring agency would be able to make a determination—at a point it deems appropriate—to take further action, which might simply be to act on the petition immediately or perhaps move to the third step in the Direct Democracy Framework.

Step 3—Registration. In the third process step in the proposed Direct Democracy Framework, our virtual system moves into the brick-and-mortar realm and begins to mimic how representative democracy is orchestrated in our modern world. For those organizations that require authentication of user voting, such as larger governments or other large public or regulated institutions, we could ask users to register their direct democratic activities. During this process a user would physically visit a site that facilitates direct democracy registration, which could be set up at local libraries and schools and administered by competent and neutral groups—similar to those who administer voter registration in the current democratic system. In fact, the direct voter registration process and the traditional voter registration process could easily be integrated into a single activity.

Once registered, the users would then confirm, in a secure environment provided by a Voting Management Server—perhaps at a terminal located directly in the registering agencies office—all of their positions on all of the direct democratic initiatives in which they were involved. This could be facilitated in a very trouble-free manner by allowing direct democracy participants to forward their registration data ahead of time, followed by simply proving their identity and confirming their positions during the registration process itself. Through the registration process, participants in the Direct Democracy Framework would also gain the ability to participate anonymously, as they do in most representative democracies. Their votes and petitions could be tied not to their complete identity, but to a registered voter identification that protects their privacy. Interestingly, once they have concluded the registration process, users of the Direct Democracy Framework will have voted in a system that includes all the same security and verification components of a traditional representative democracy. Instead of voting for individuals, however, they have voted for direct initiatives. The Voting Management Server could also easily produce a paper ballot during the registration process that replicates the audit trail of traditional voting systems.

Once a voter is registered, digital signature technology could be used to authenticate future voting activities in future petitions. With the third step in the process completed, the relevant agencies would again have the opportunity to act upon registered direct voting or—if a further level of validation and a final confirmation vote were required—move to the forth step.

Step 4—Congress. The next step would leverage the ability of the Voting Management Server to create a statistically valid sampling lottery and randomly select delegates. In this process, a limited number of the registered voters would be selected to appear as delegates to a congress to validate the registered vote. The voters may be any recipients of the initiative at any level, or recipients from only certain levels. When attending the congress, which could be as short or as long as required and could involve as many locations and delegates as appropriate, the delegates would simply reiterate their voting positions. Through this process, a final and conclusive confirmation of the will of the people would be conducted. Perhaps only the largest of voting organizations, such as national or global direct democratic initiatives, would require a congress of this fashion.

Step 5—Ratification. Finally, we must recognize that, although a Global Direct Democracy becomes a possibility with the implementation of the Direct Democracy Framework, it will not emerge overnight. In fact, many decades may pass before the Direct Democracy Framework serves as the primary tool of government anywhere. But, even during this period, the Direct Democracy Framework will be able to provide an infrastructure that supports and enhances the democratic process throughout the world. As such, the fifth and final step of the Direct Democracy Framework—ratification—is critical. It is in this step that the parallel existence of direct democracy and representative democracy is facilitated. During ratification the appropriate conventional government bodies and non-governmental entities would confirm the legitimacy of the initiatives sent to them through the direct process and write into law the process by which these initiatives would be enforced. Ratification might take place by individual legislative voting on each initiative, gaining sufficient momentum to warrant inclusion into law, or it might take place by constitutional process, whereby a government defines criteria such as the percentage of the voting population that has voted on an initiative, the percentage of supporting votes, and the longevity of the initiative as criteria for automated ratification.

Of course, not all of these steps are mandatory. It would depend on the particular protocols of the organization in question as to what steps were required. In the case of initiatives seeking to become global law, all five steps would likely take place.

End User Voting Tool: Capabilities Definition. The End User Voting Tool is the tool responsible for the first step in the Direct Democracy Framework process; the distributed voting and more importantly, is the tool that each individual user of the framework uses to create, send and view initiatives as they move through the process. It is therefore important to document the core functionality of this tool that is used to implement the Direct Democracy Framework. Functional capabilities.

Figure 14:
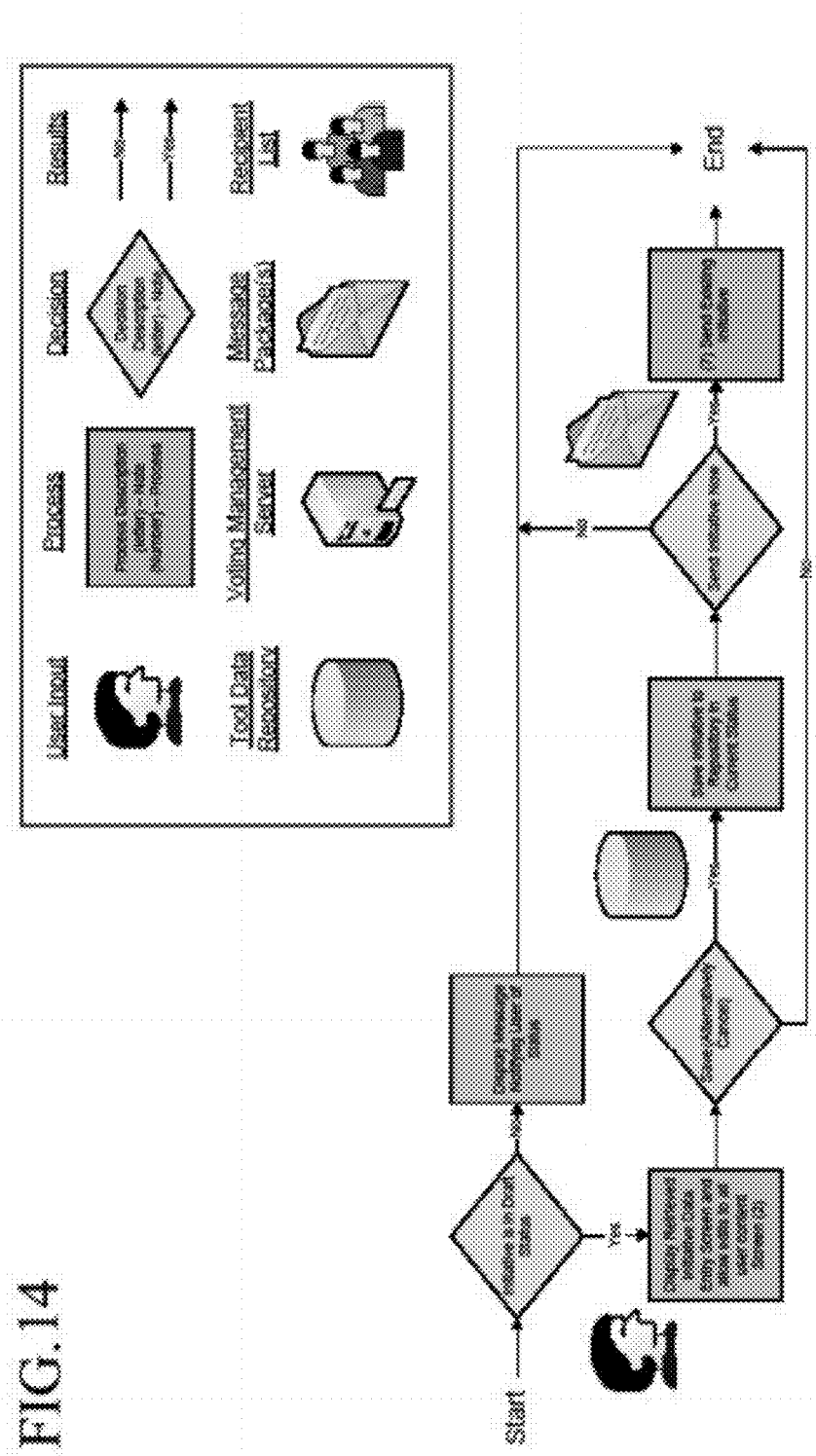
Figure 15:
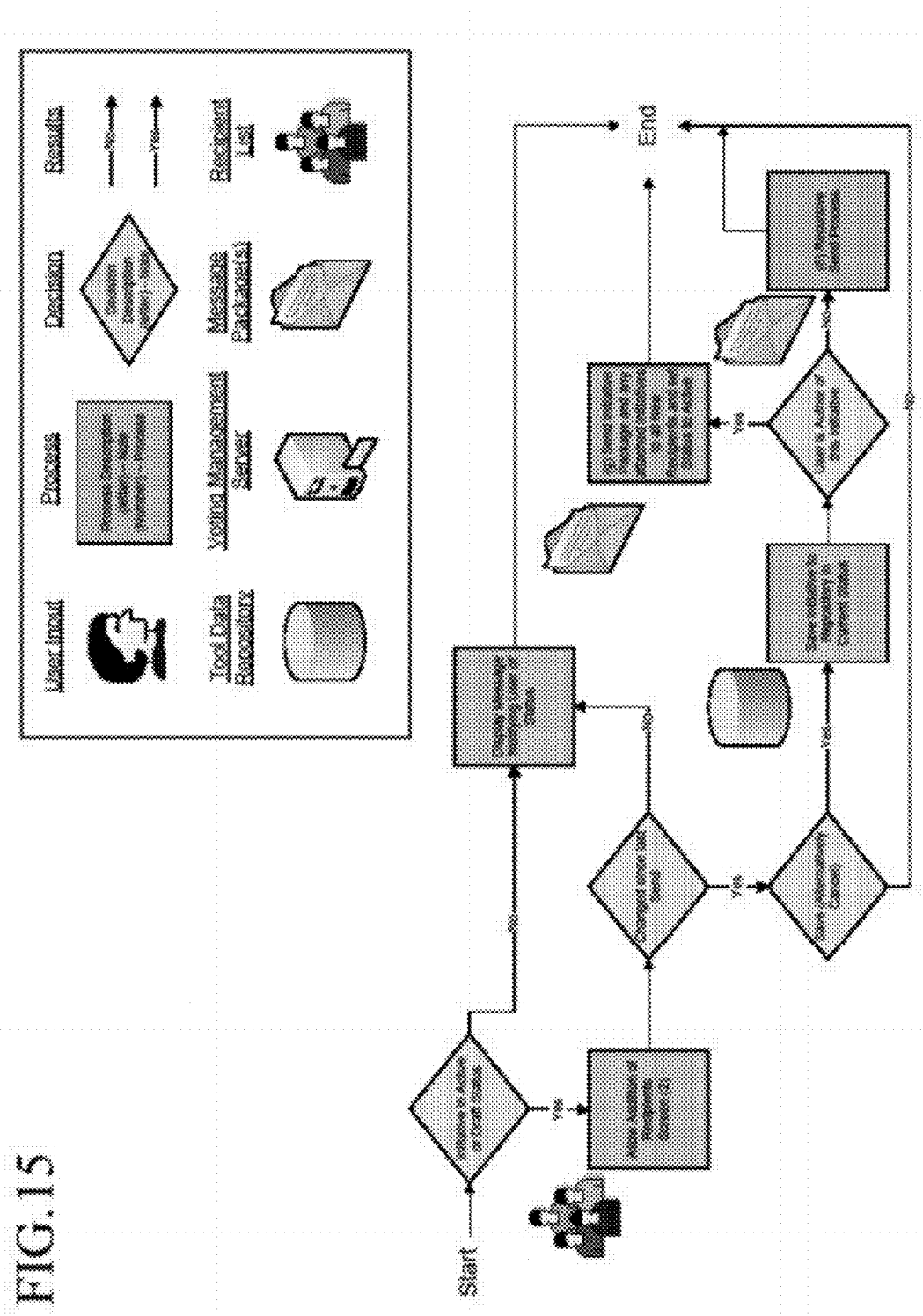

There are the following functional capabilities: Create initiative—The user is able to create and edit a direct democracy initiative a manner that is as intuitive and easy as composing an email then (optionally) send the initiative out to selected recipients. See FIGS. 9-15. See also Initiative Package Edit Initiative. The user is able to find and edit an existing direct democracy initiative a manner that is as intuitive and easy as updating a draft email then (optionally) send the initiative out to selected recipients. See FIGS. 10-15 and in particular FIG. 14. See also Initiative Package.

Send Initiative. The user is able to find and send an existing direct democracy initiative a manner that is as intuitive and easy as sending a draft email. See FIGS. 10-15 and in particular FIG. 15. See also Initiative Package.

Figure 17:
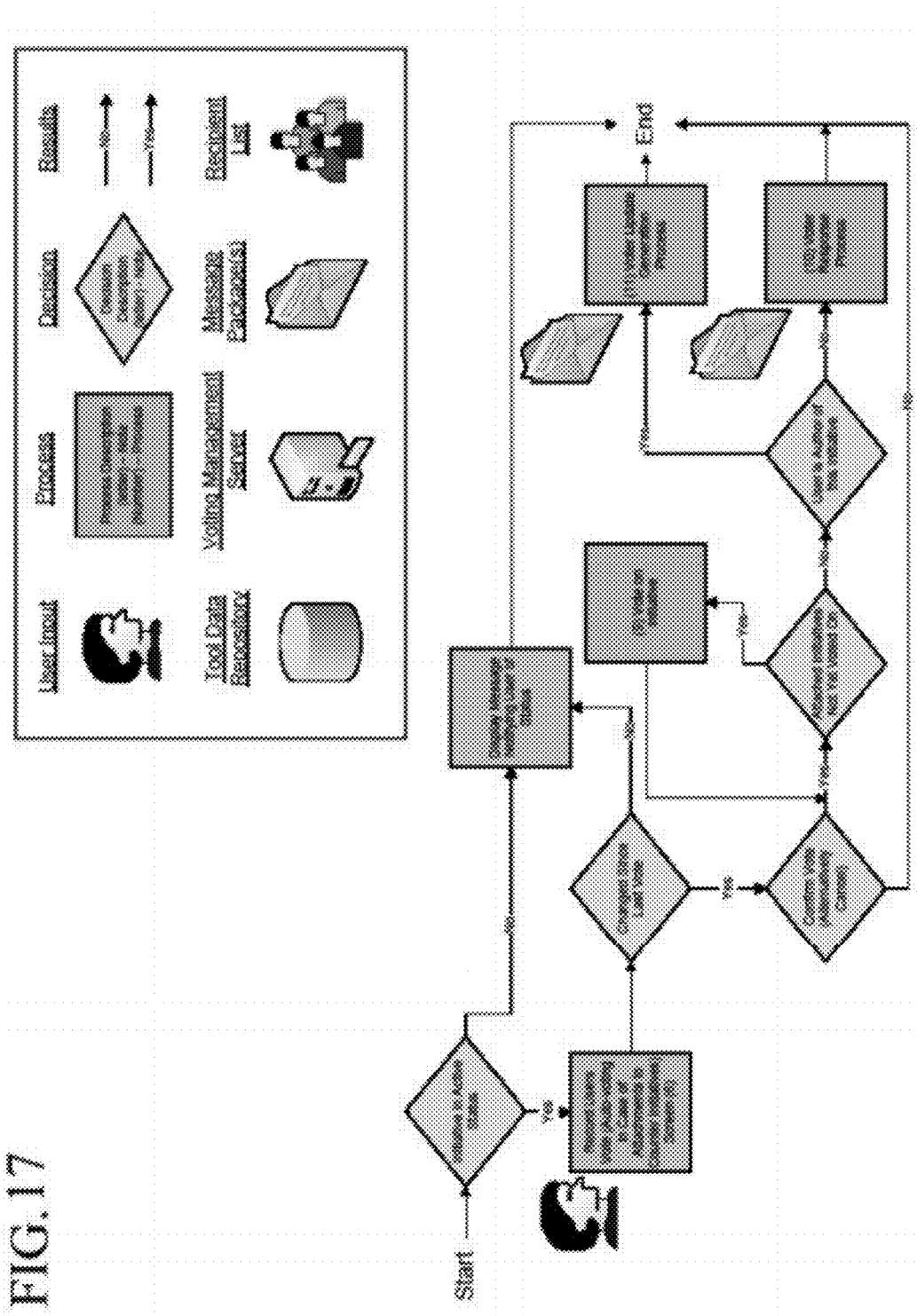
Figure 18:
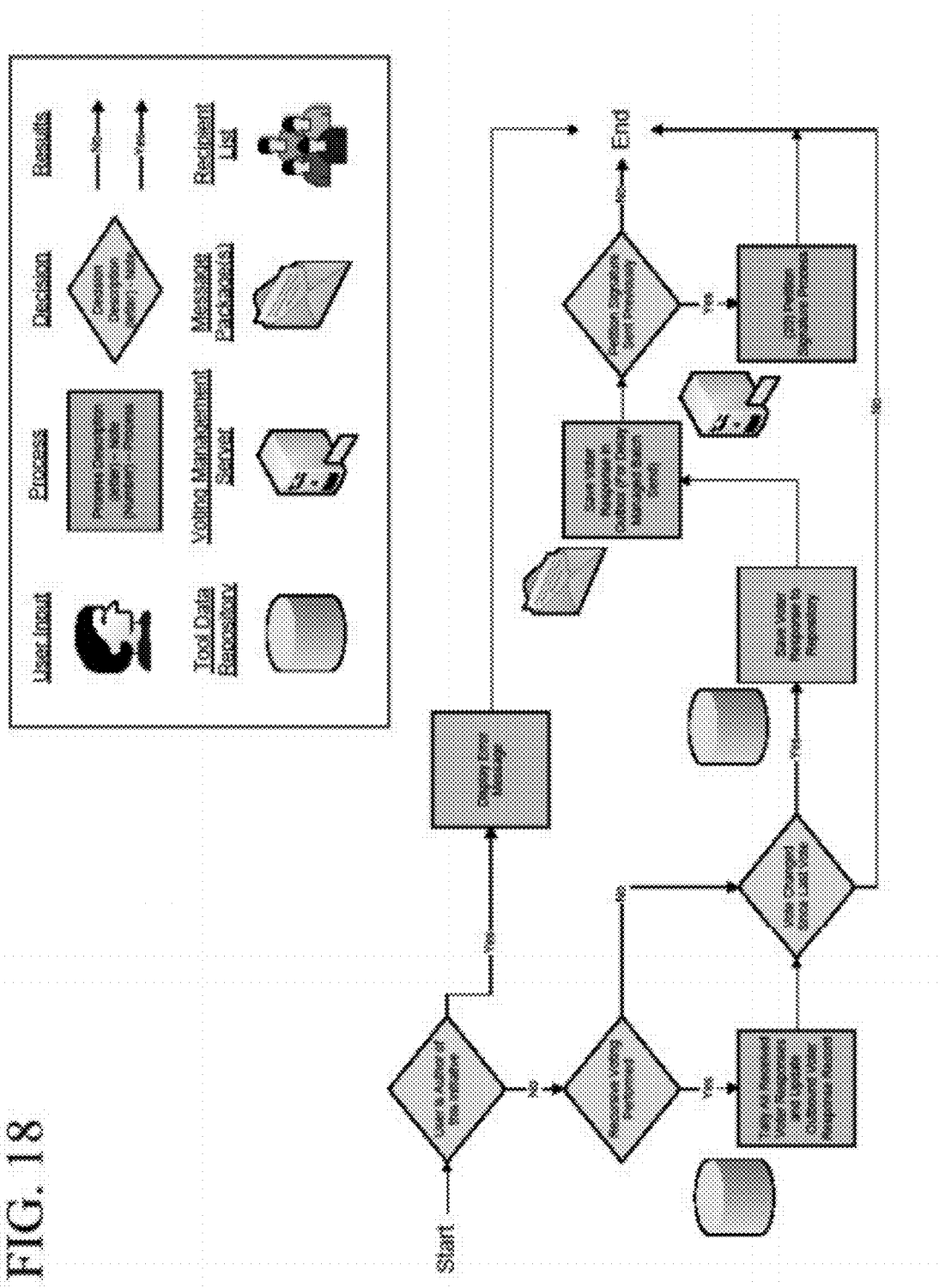
Figure 19:
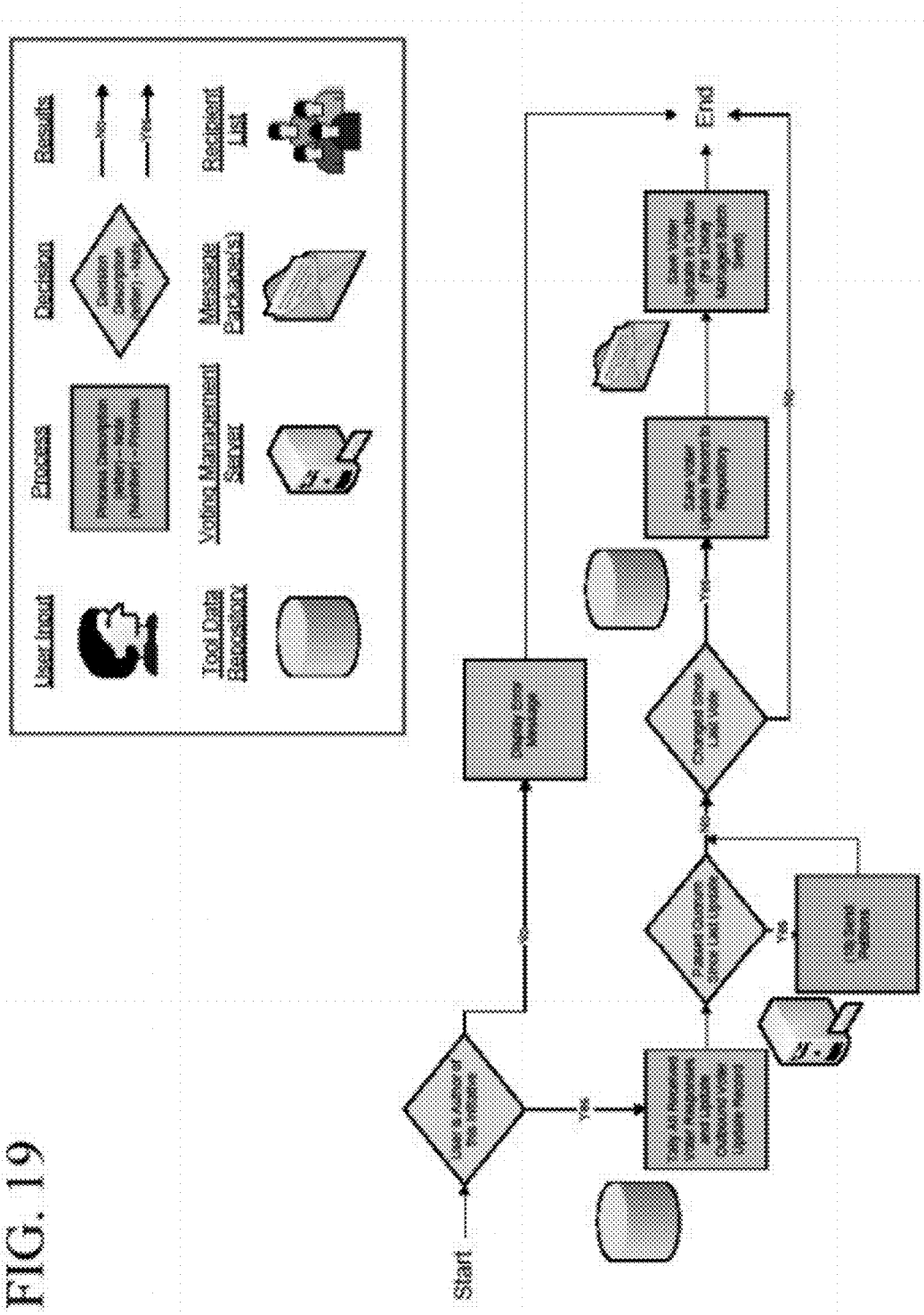
Figure 20:
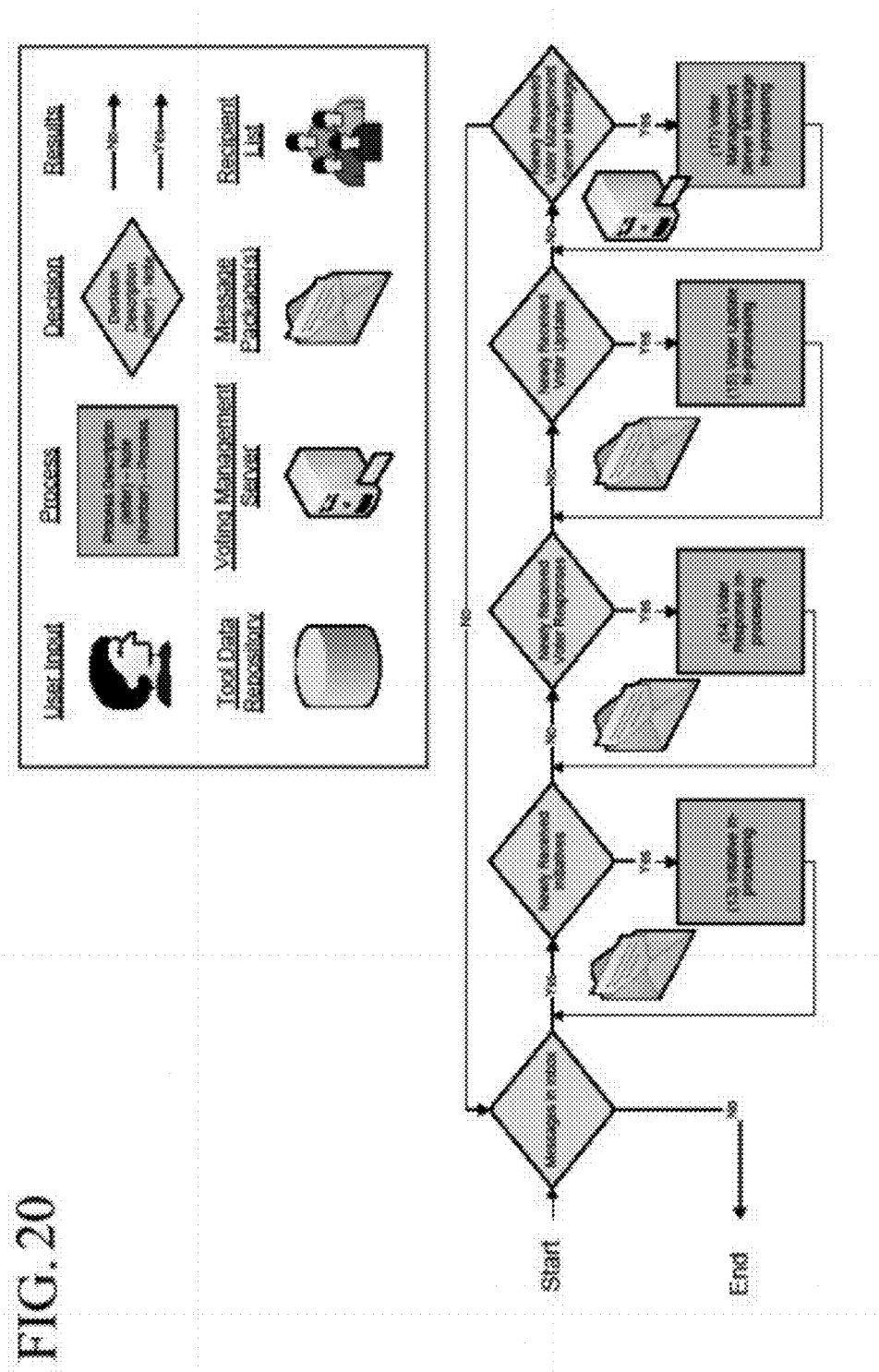
Figure 21:
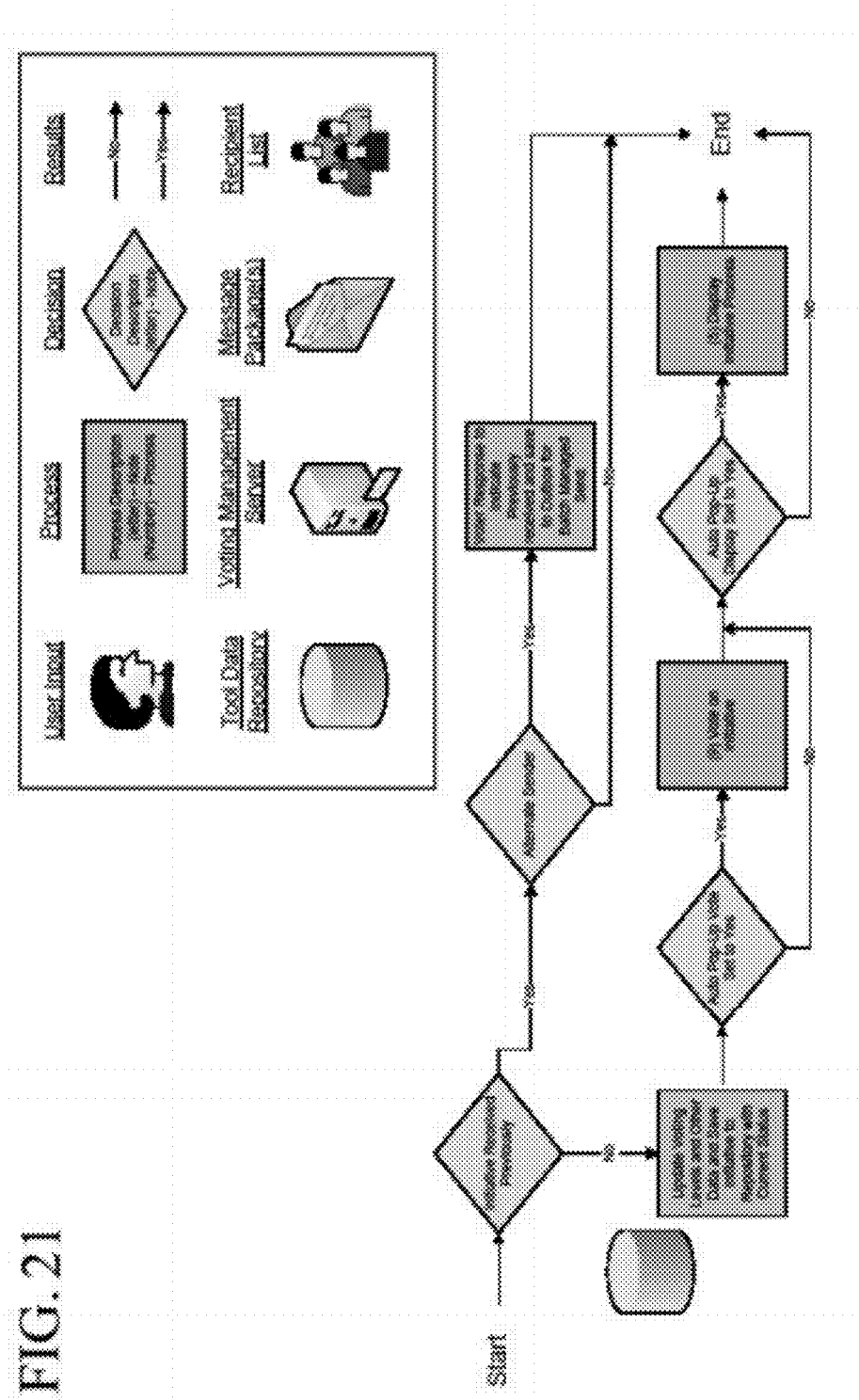

Vote on Initiative. The user is able to receive a sent direct democracy initiative and vote on it in a manner as intuitively as responding to an email the resulting information should be sent back to the original author of the initiative. See FIGS. 17-19. See also Initiative Package & Voter Response Package.

Figure 16:
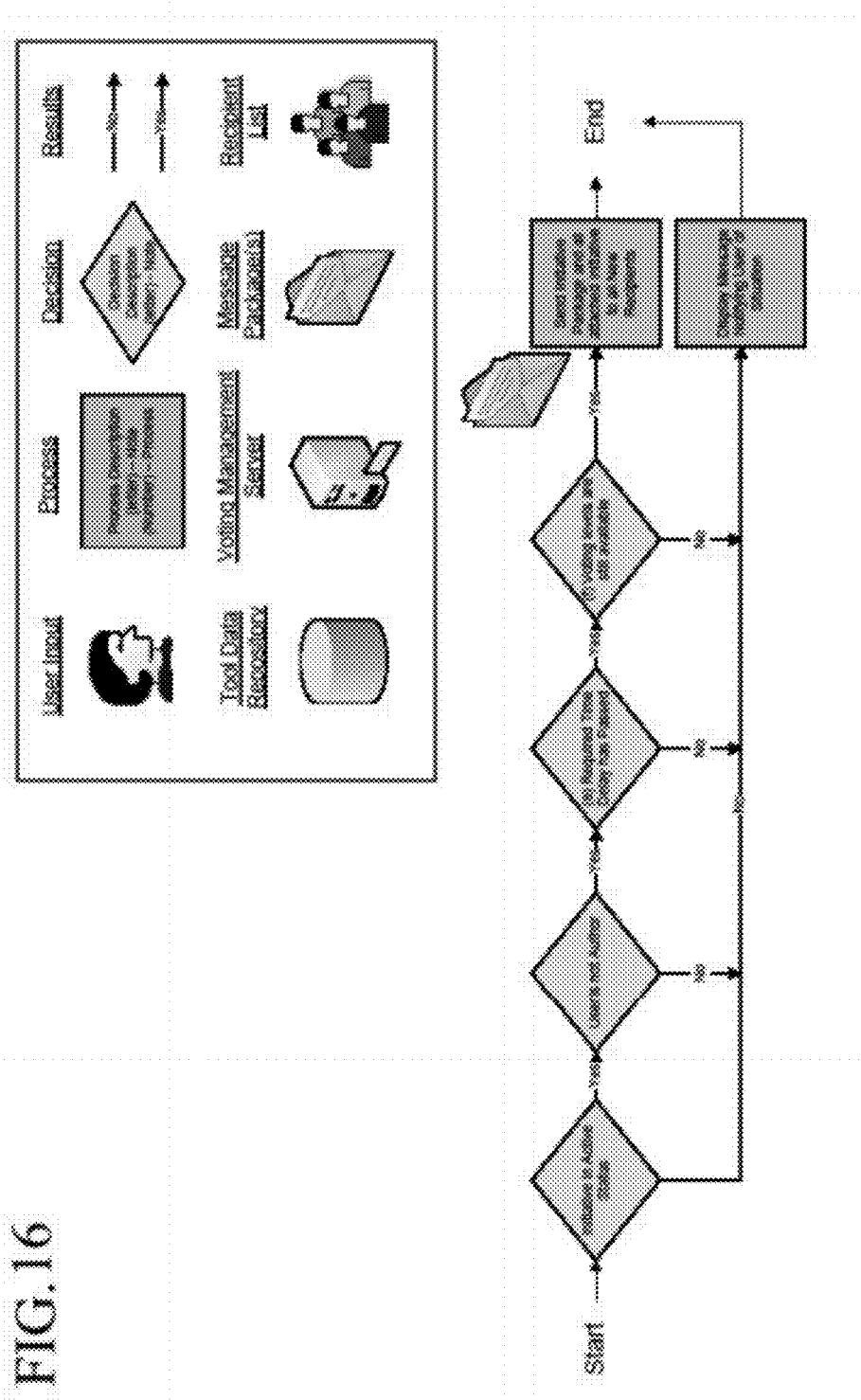
Figure 23:
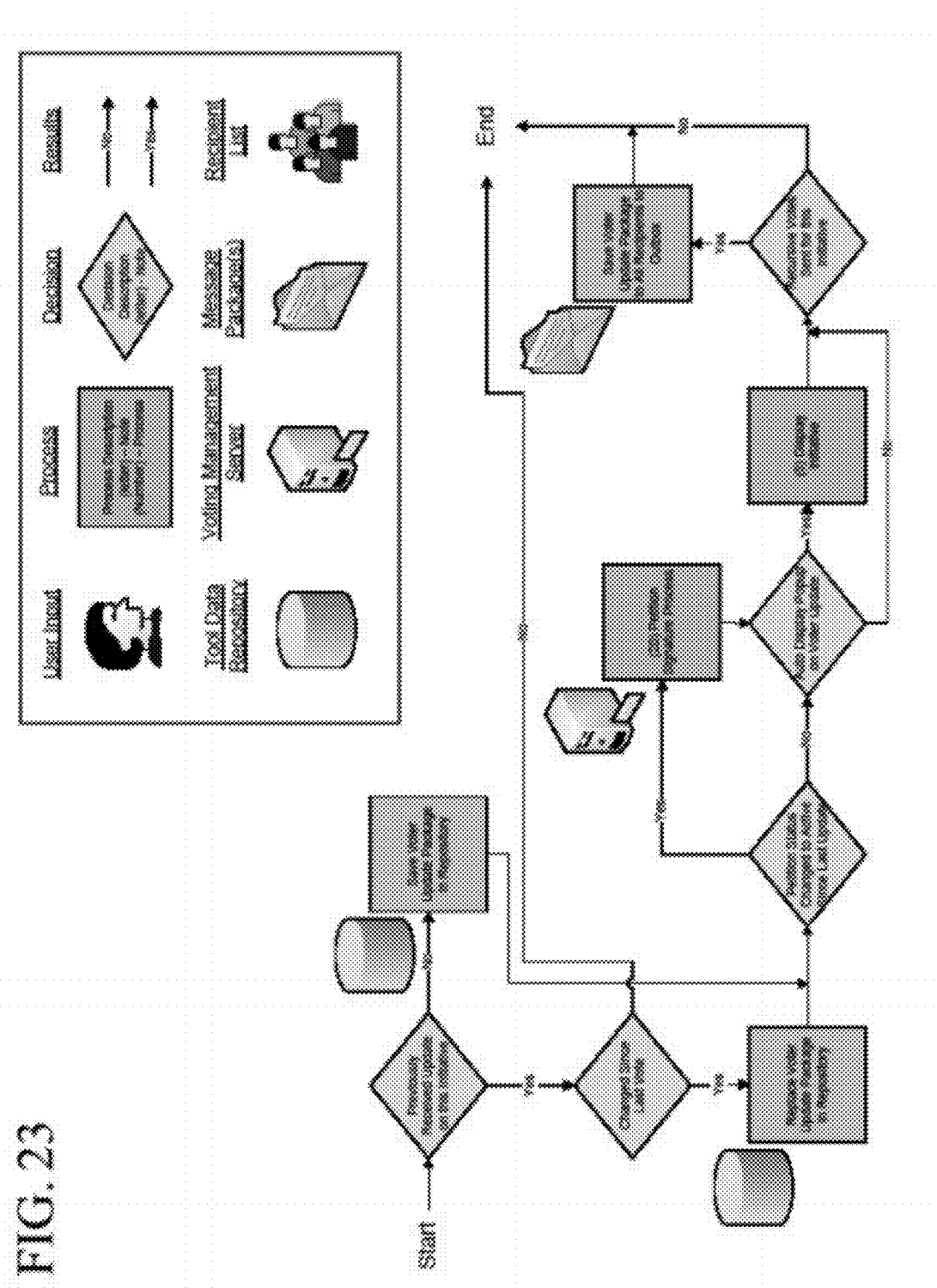

View Vote Tally. The user is able to find a direct democracy initiative and review the current vote tally. The current vote tally is also referred to as the originator total tabulation. See FIG. 23. See also Initiative Package & Voter Update Package Send Initiative (Recursive). The user is able to find and send an existing direct democracy initiative to additional users (if permitted by the author) in a manner that is as intuitive and easy as forwarding an email. See FIGS. 15-16. See Also Initiative Package & Voter Update Package.

Figure 26:
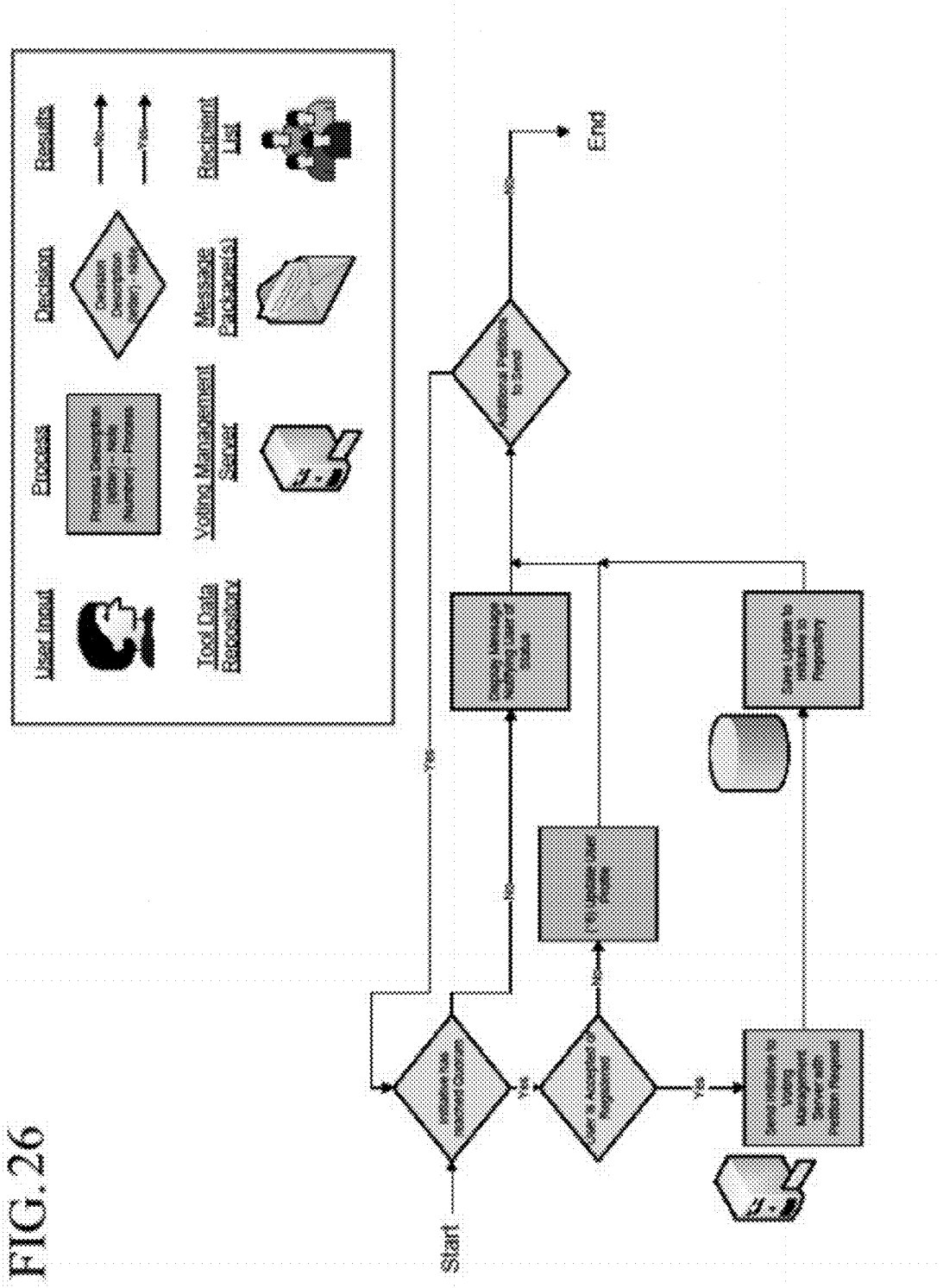
Figure 27:
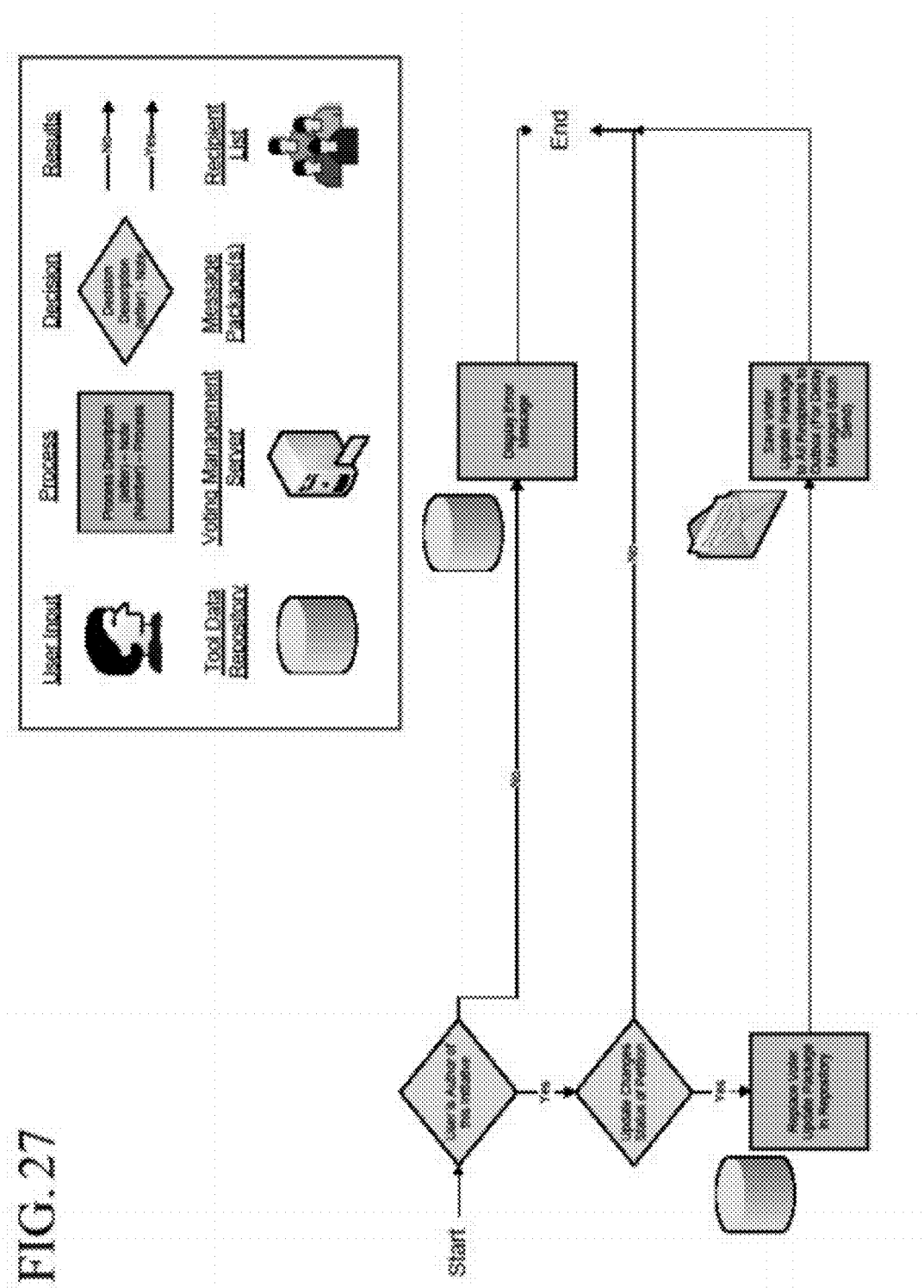
Figure 28:
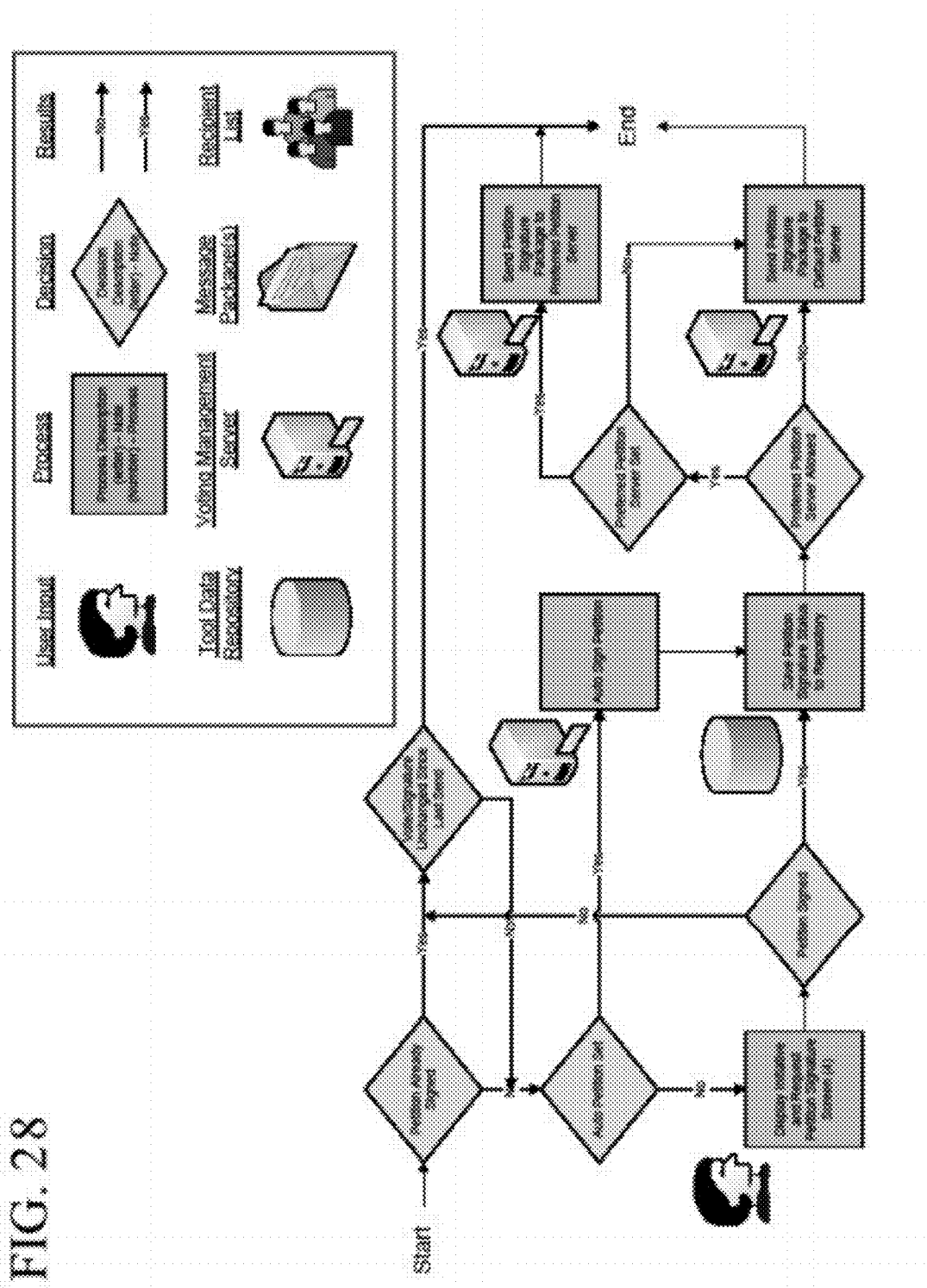
Figure 29:
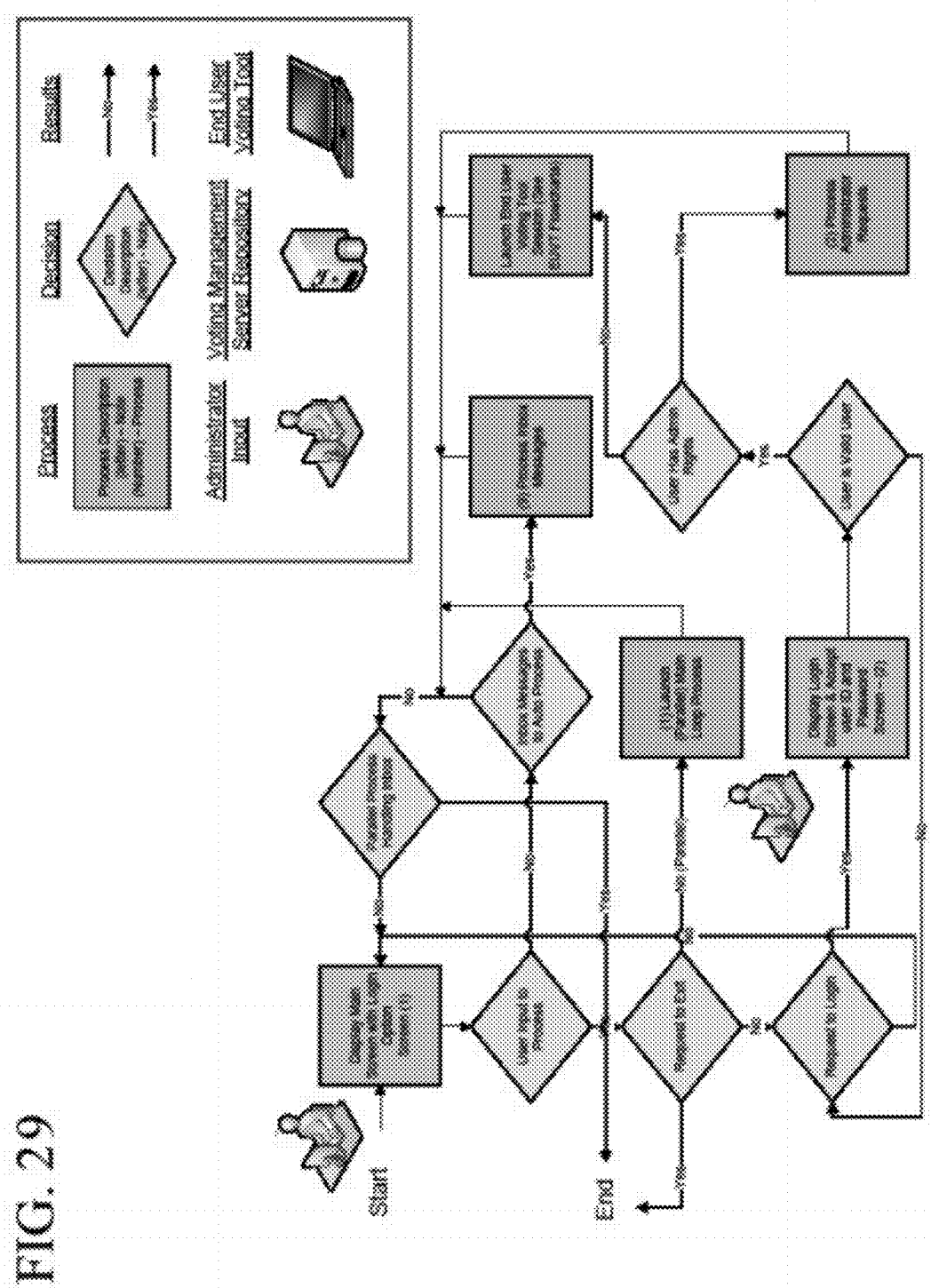
FIGS. 29-42 are Voting Management Server Flowcharts
Figure 30:
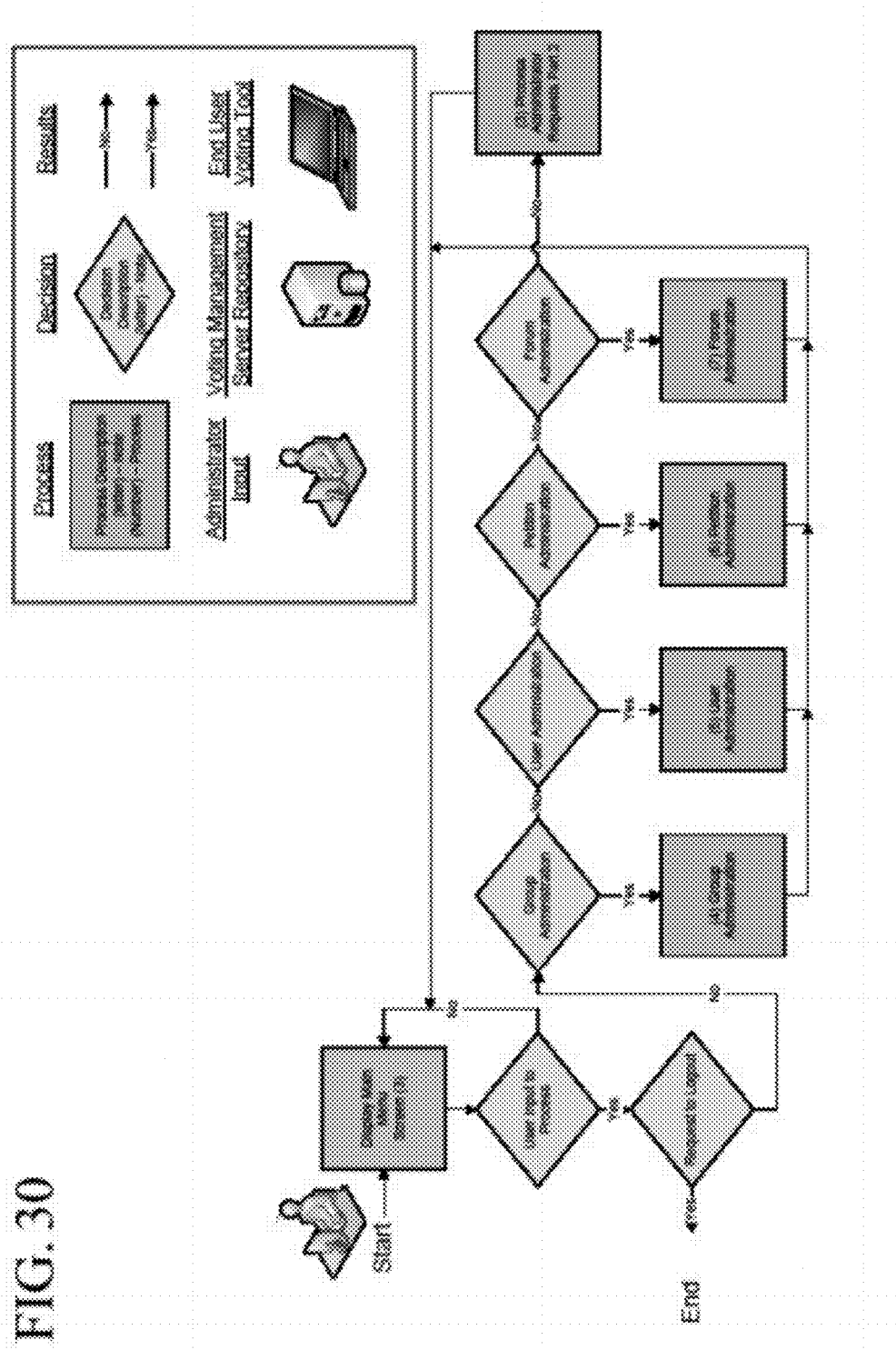
Figure 31:
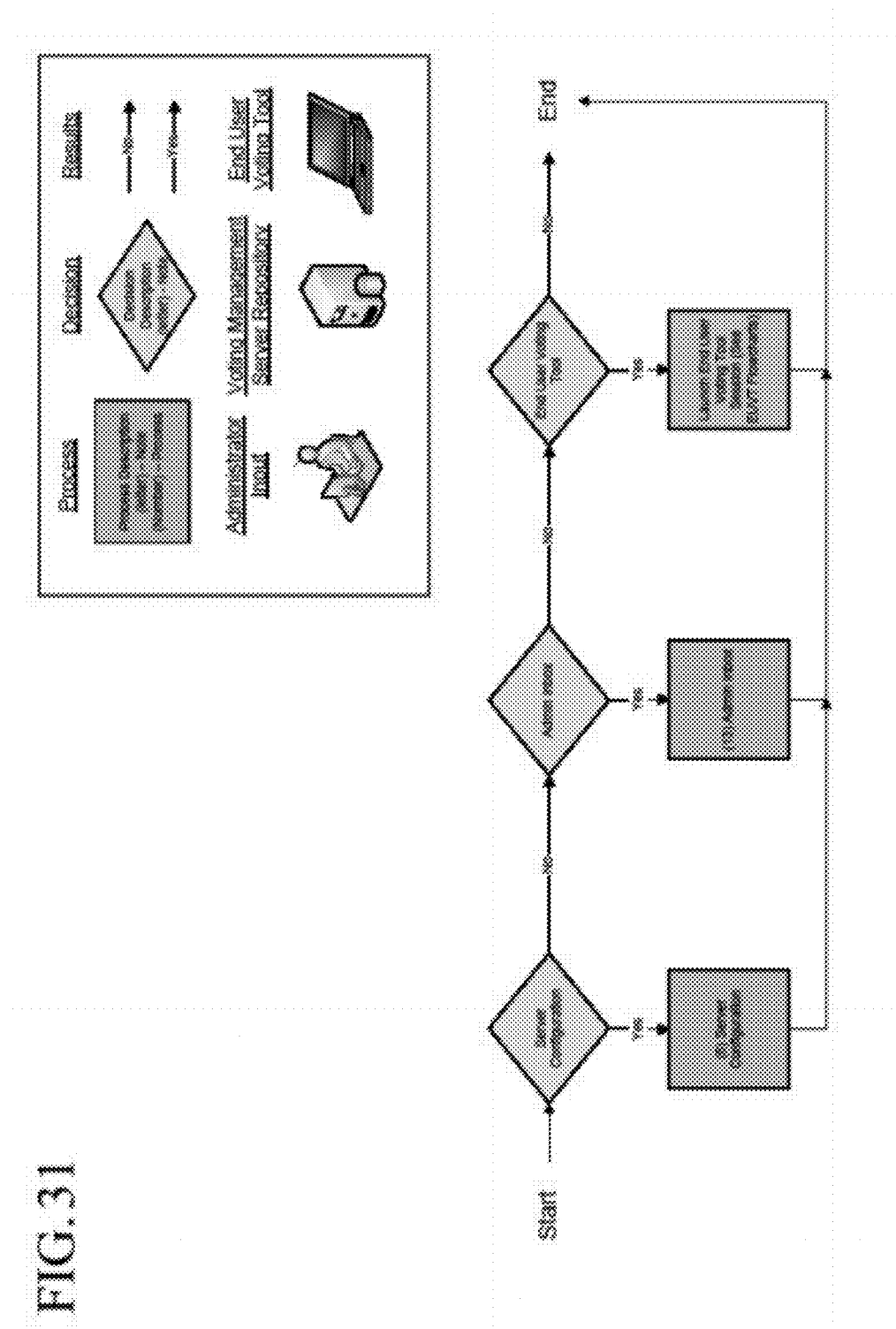
Figure 32:
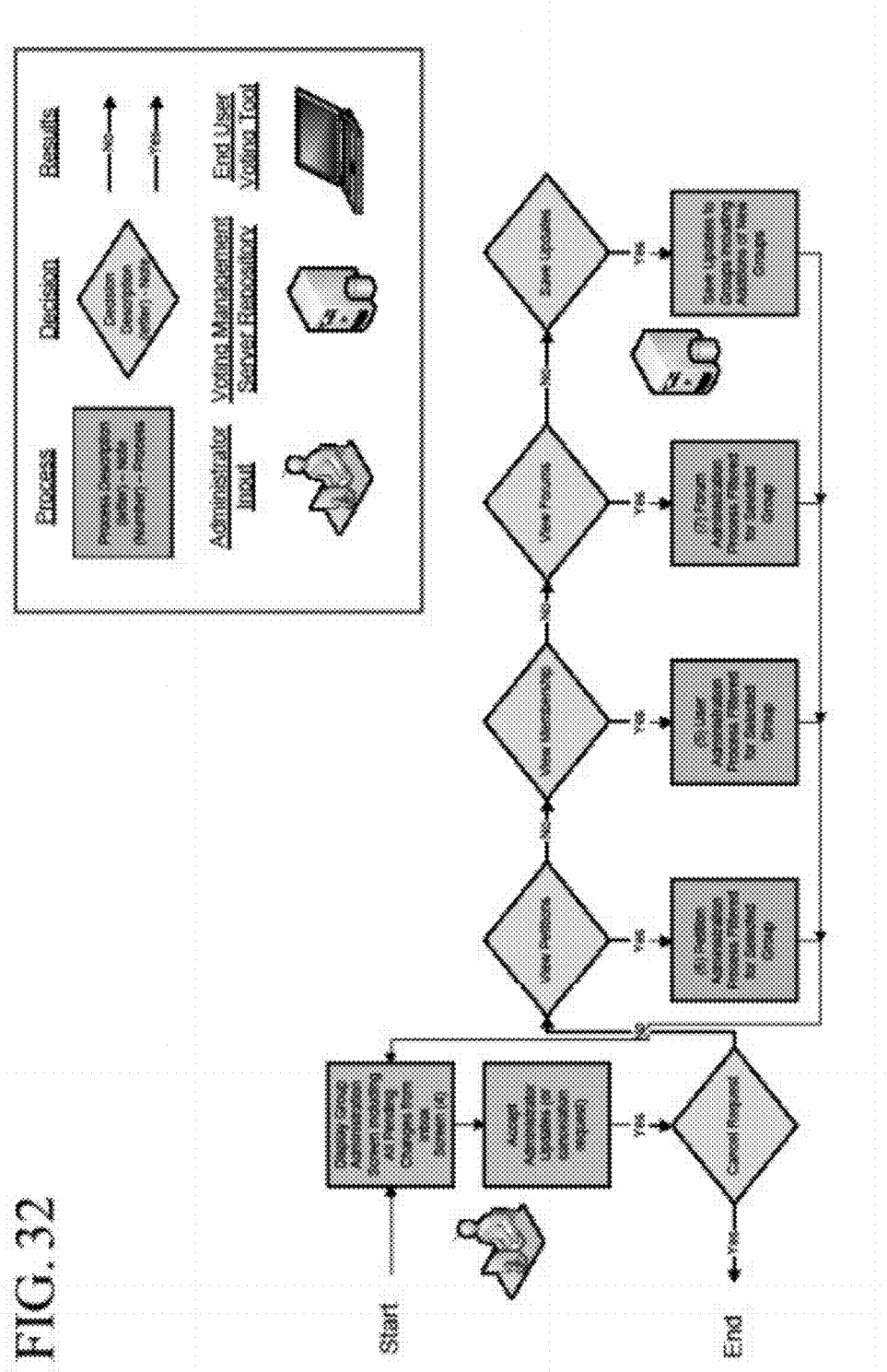
Figure 33:
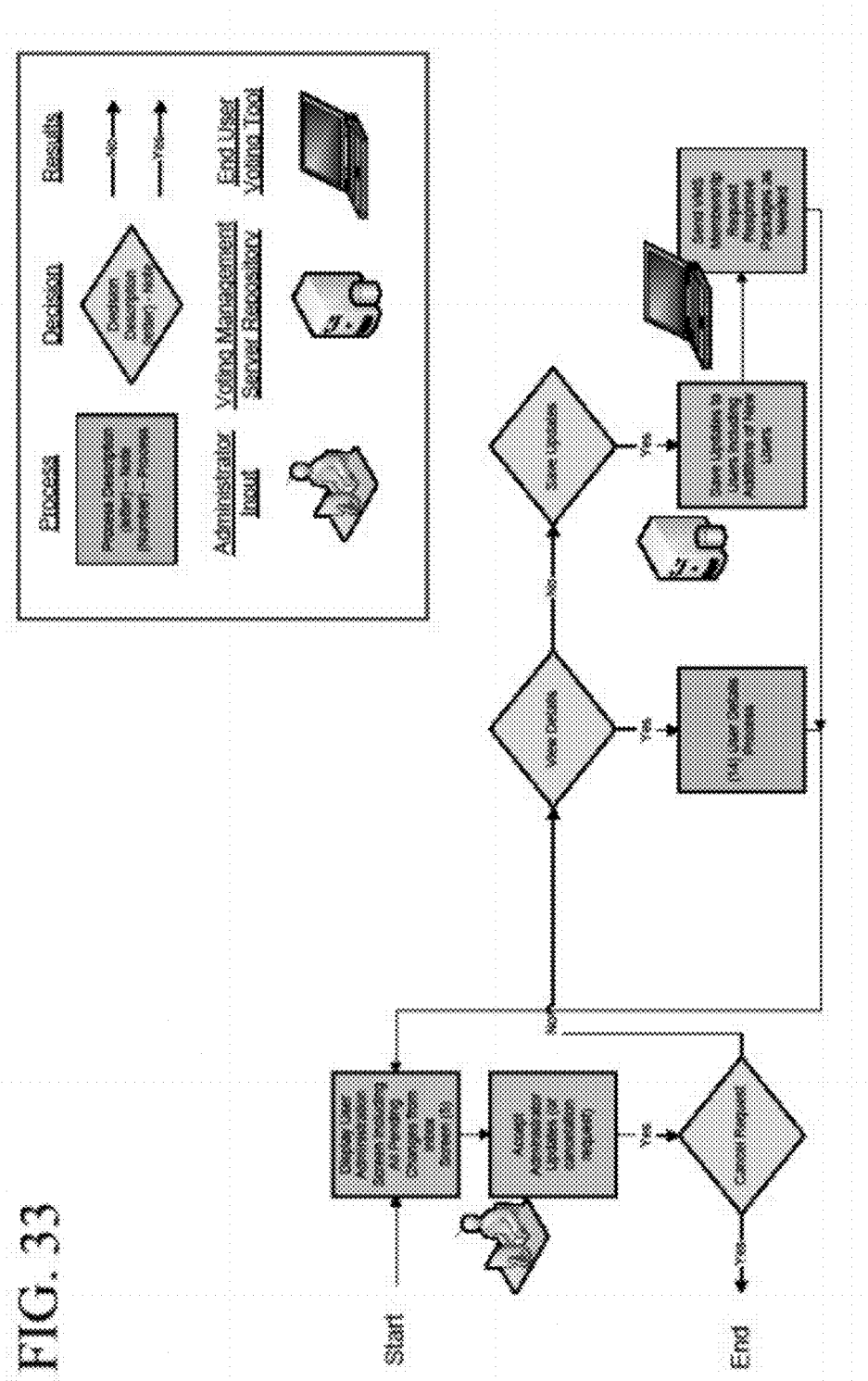
Figure 34:
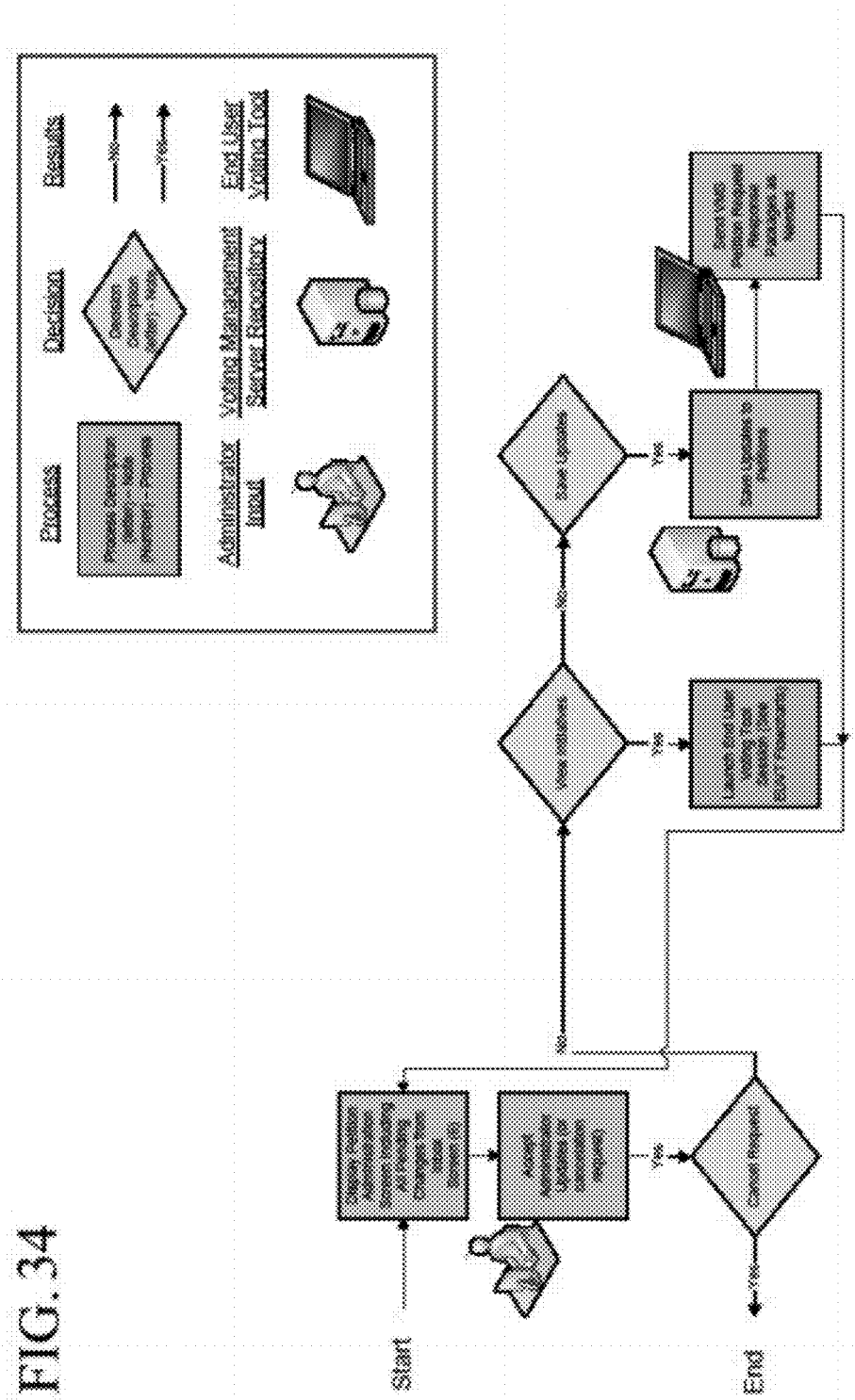
Figure 35:
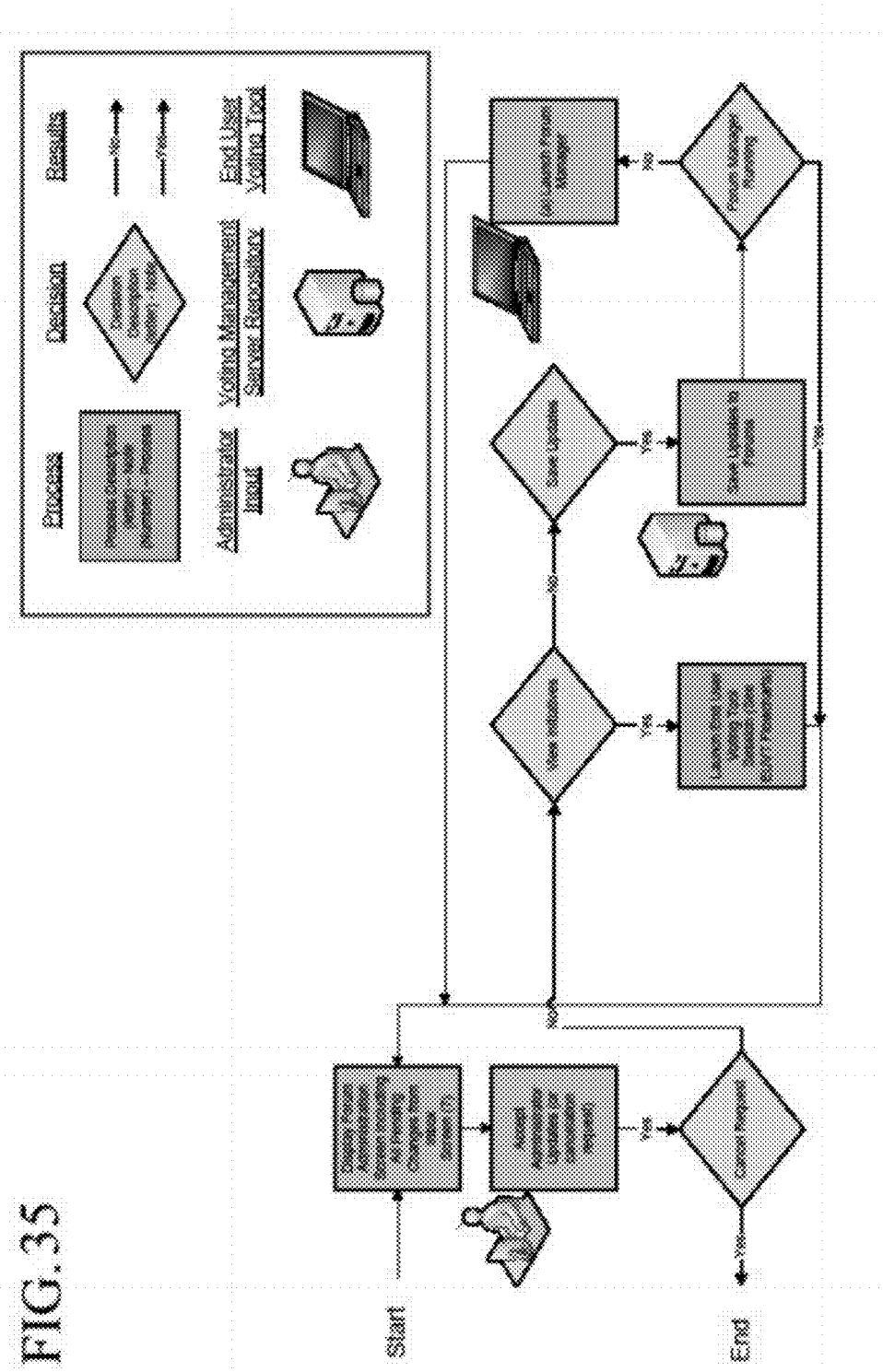
Figure 36:
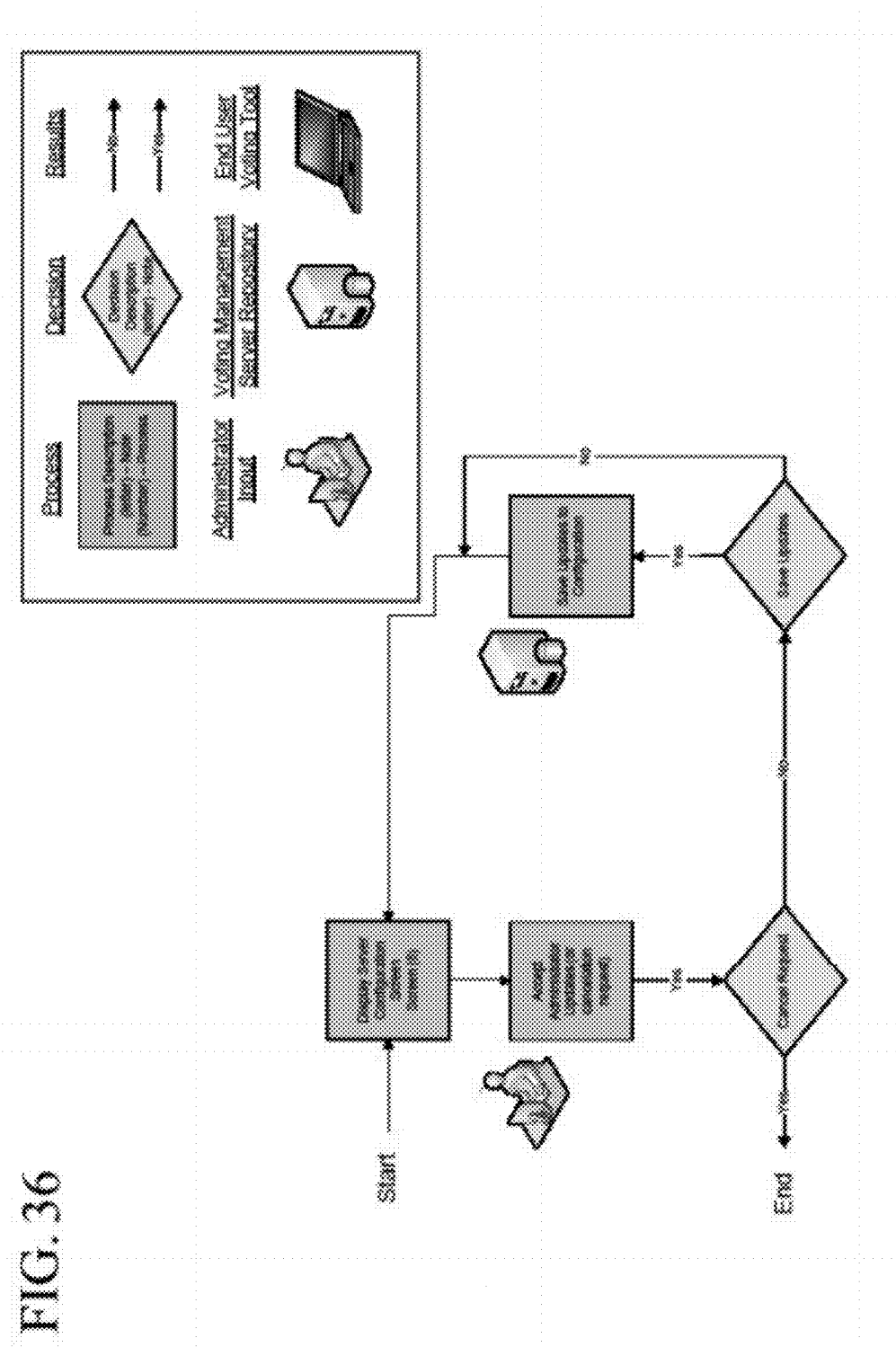
Figure 37:
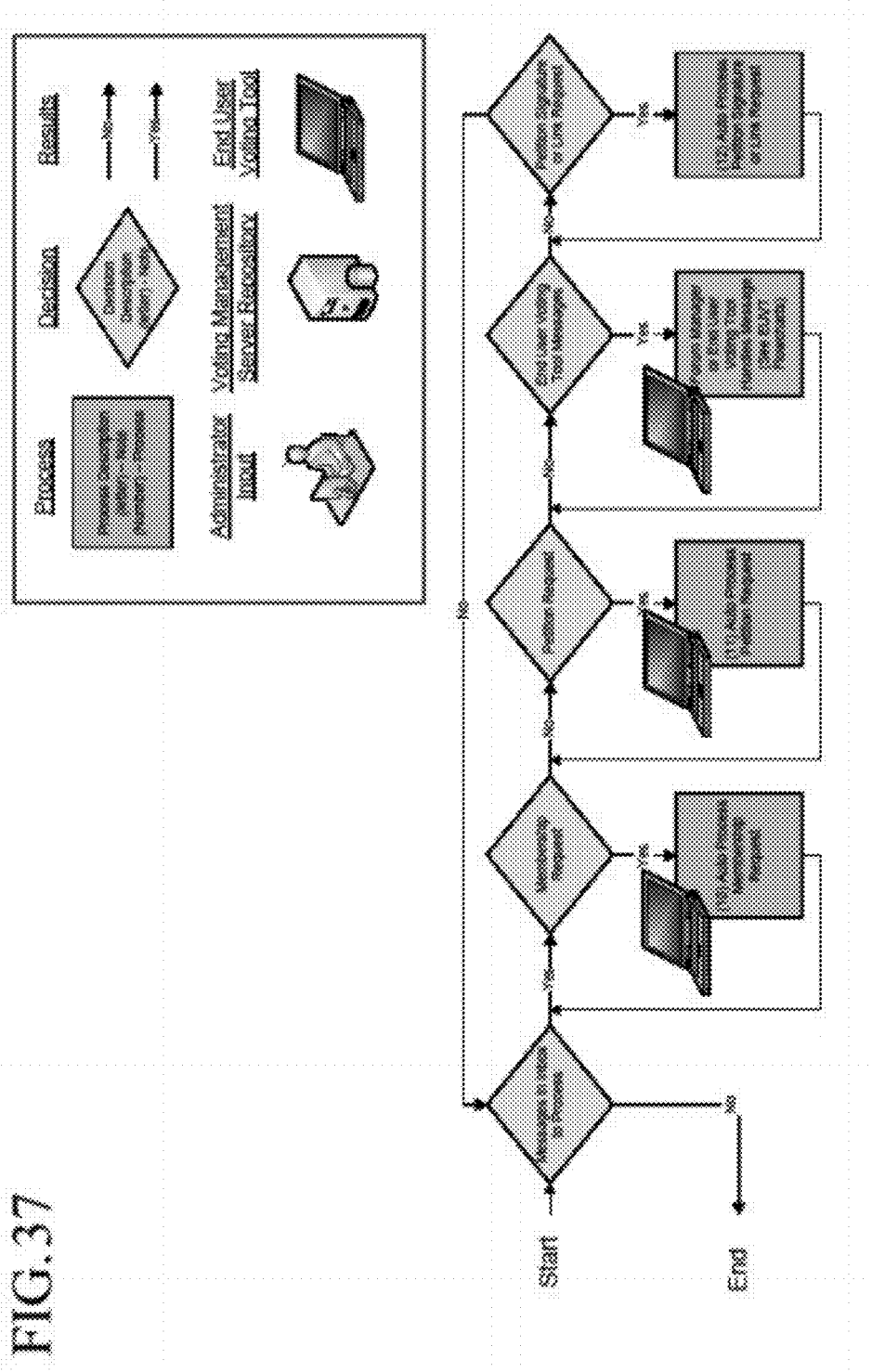
Figure 38:
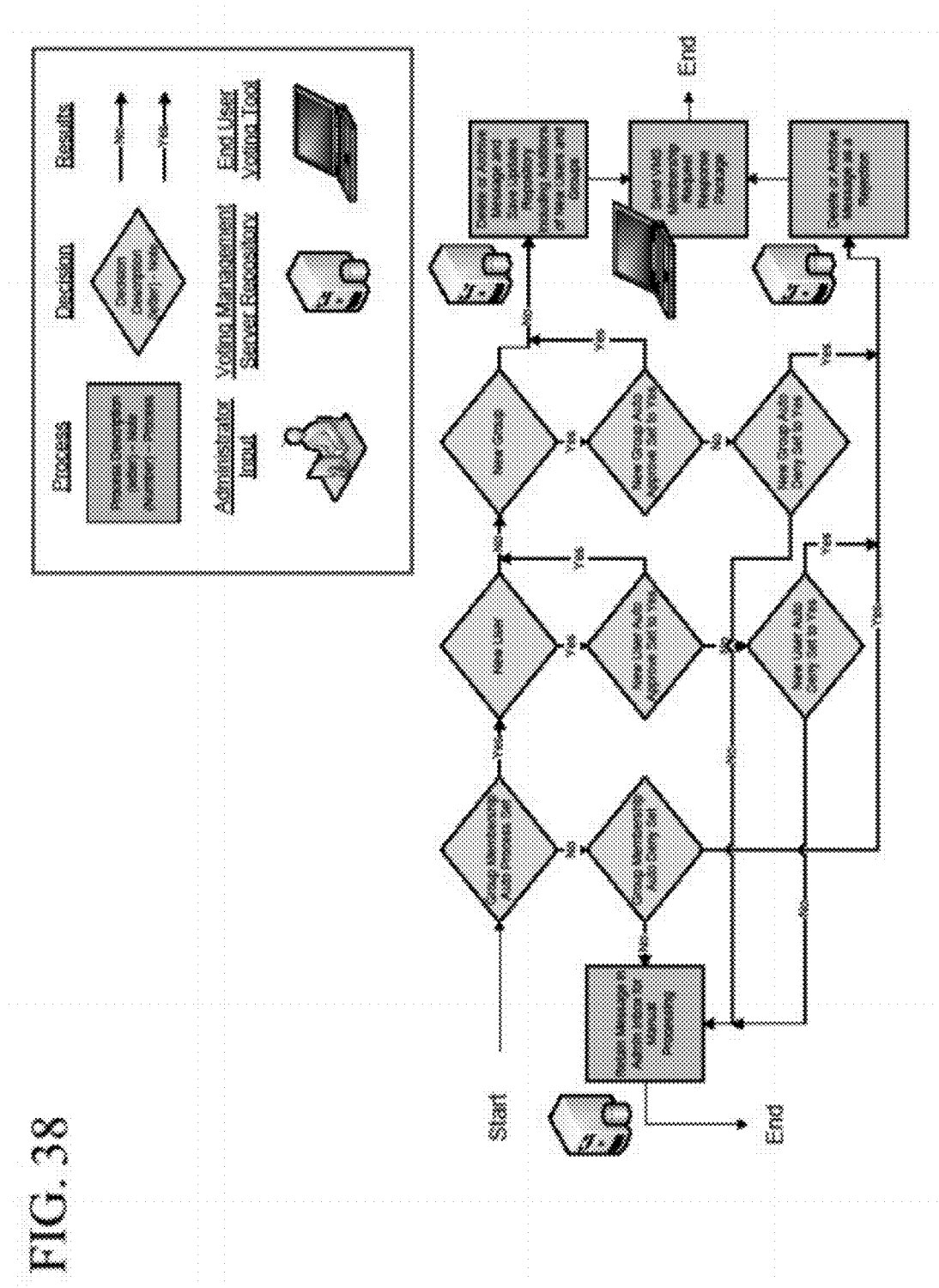
Figure 39:
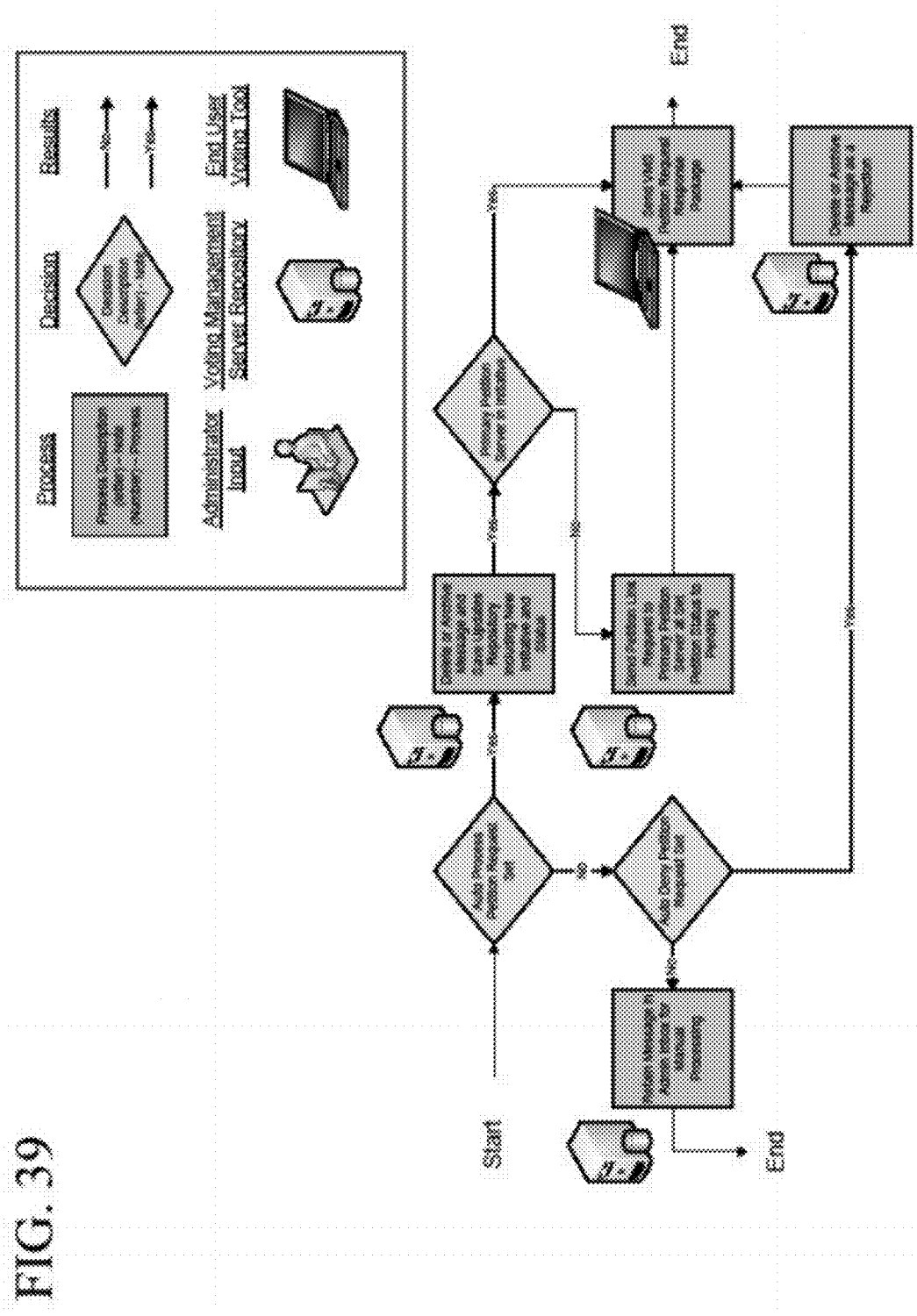
Figure 40:
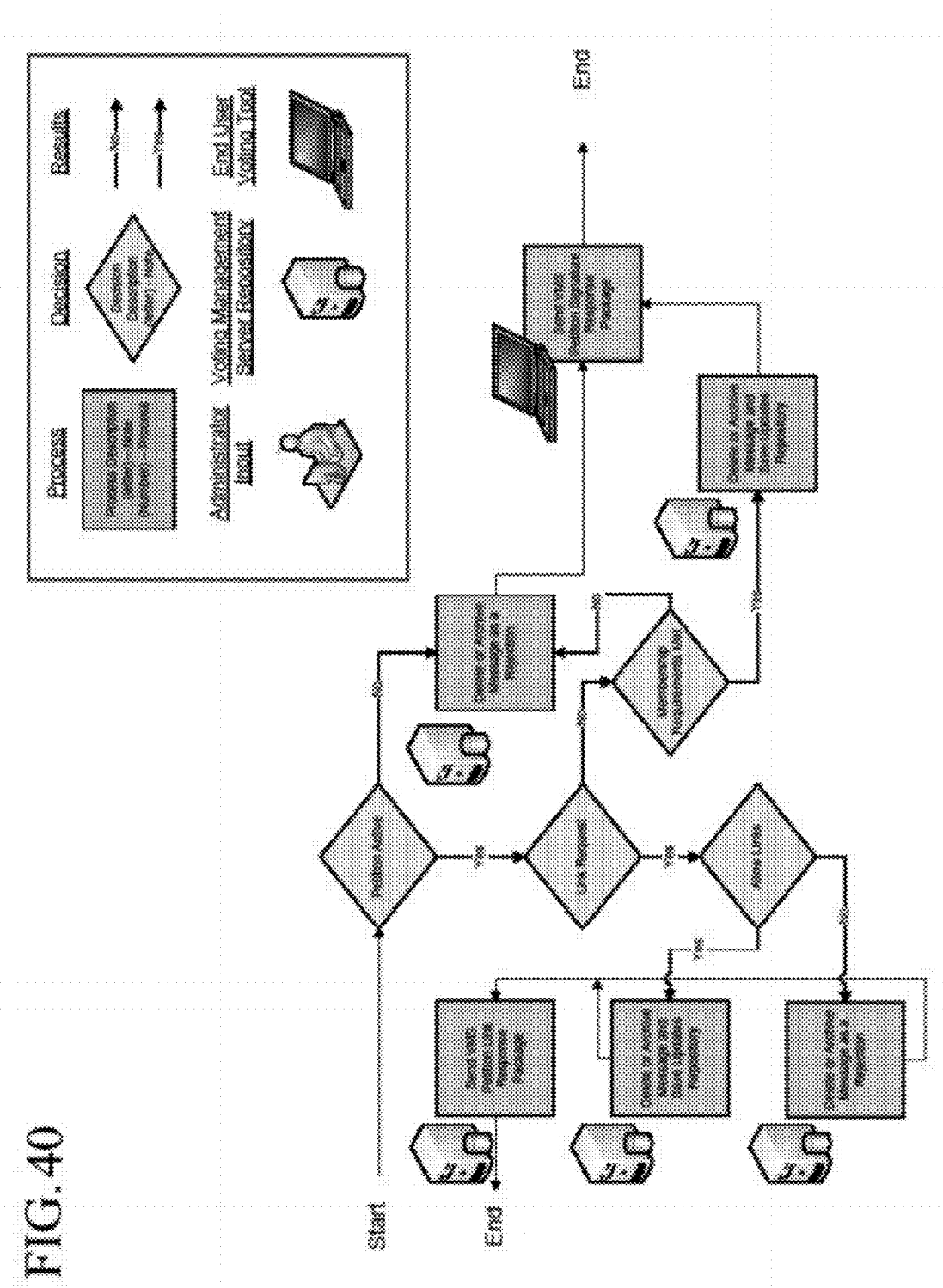
Figure 41:
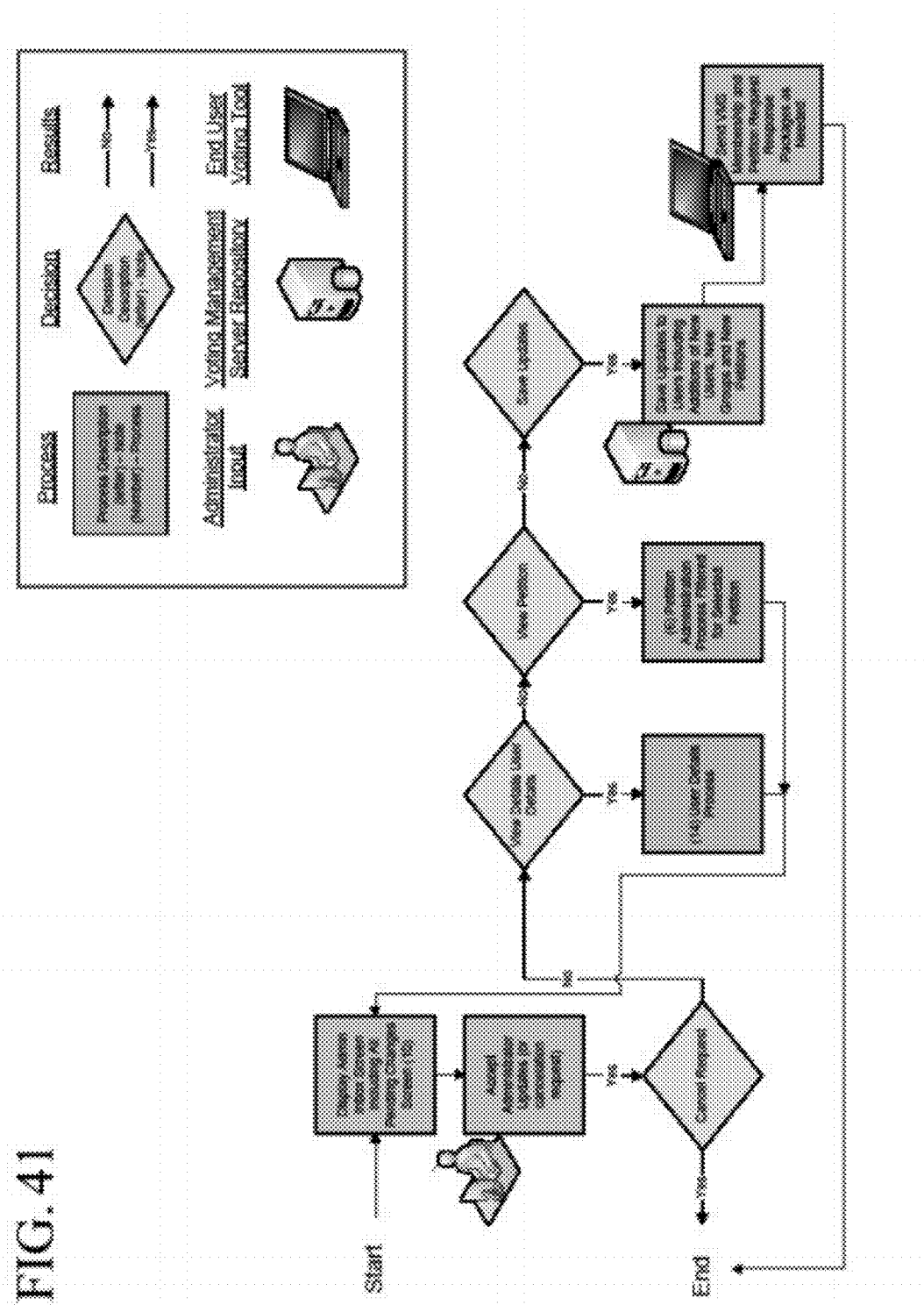
Figure 42:
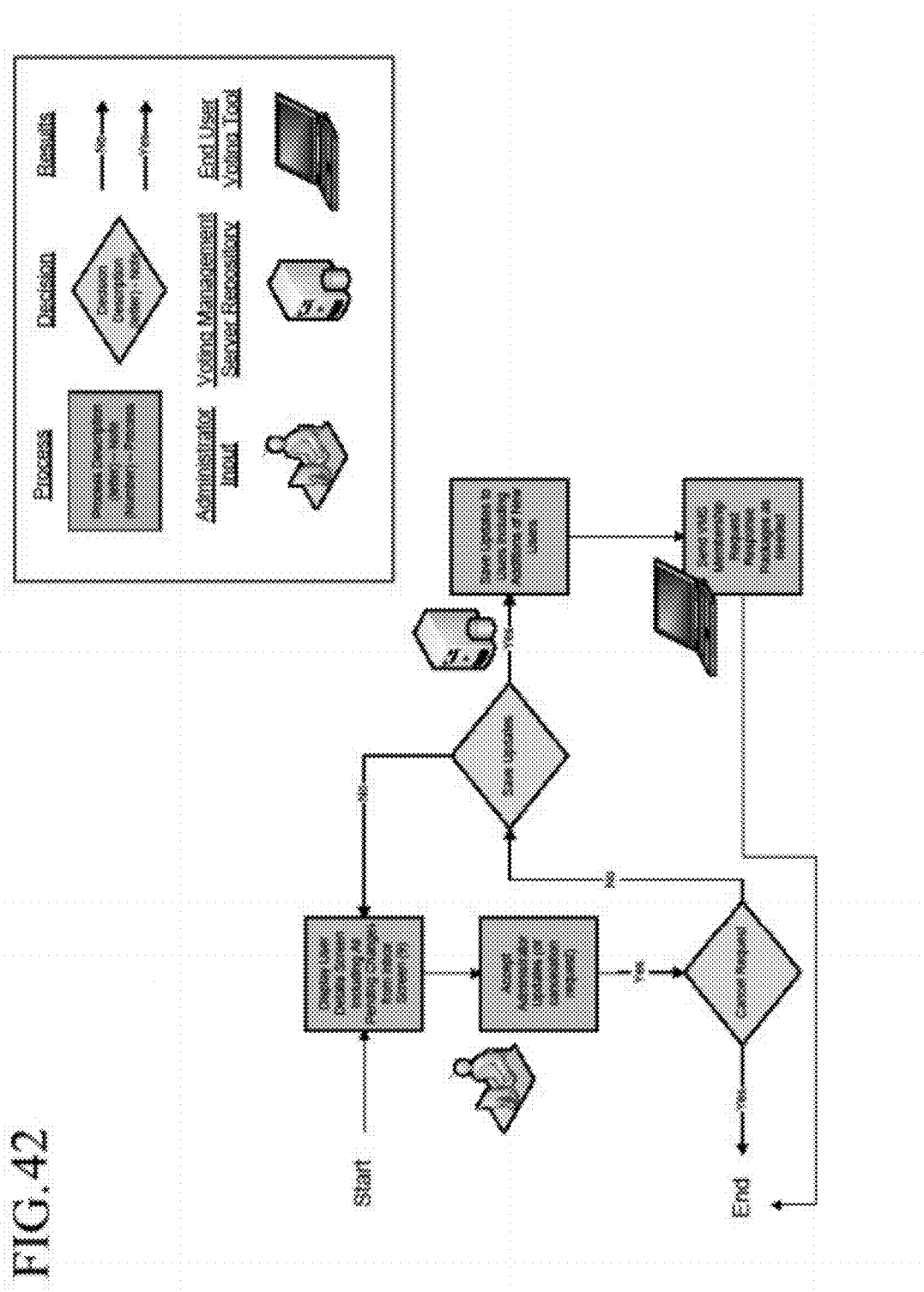

Petition Initiative. The user is able to petition an initiative either automatically based on achieving a certain voting Quorum or manually through an easy confirmation process. See FIGS. 26-28. See Also Voter Update Package, Voting Management Server Membership Request Package and Voting Management Server Petition Request Package.

Sign Petition. A user who has previously voted on an initiative which has subsequently been petition is able to send a signature to the petition in an intuitive way. See Also Voter Update Package, Voting Management Server Membership Petition Signature Package Create and Send Counter Initiatives and Amended Initiatives. The user is able to attach existing initiatives to an existing initiative and, in the case of counter initiatives, automatically register a vote against them. See also Initiative Package.

Vote on Initiatives including Amended and Counter Initiatives. The user is able to receive a sent direct democracy initiative together with attached initiatives and able to vote on all initiatives in the package. See FIGS. 17-21. See also Initiative Package & Voter Response Package.

Figure 24:
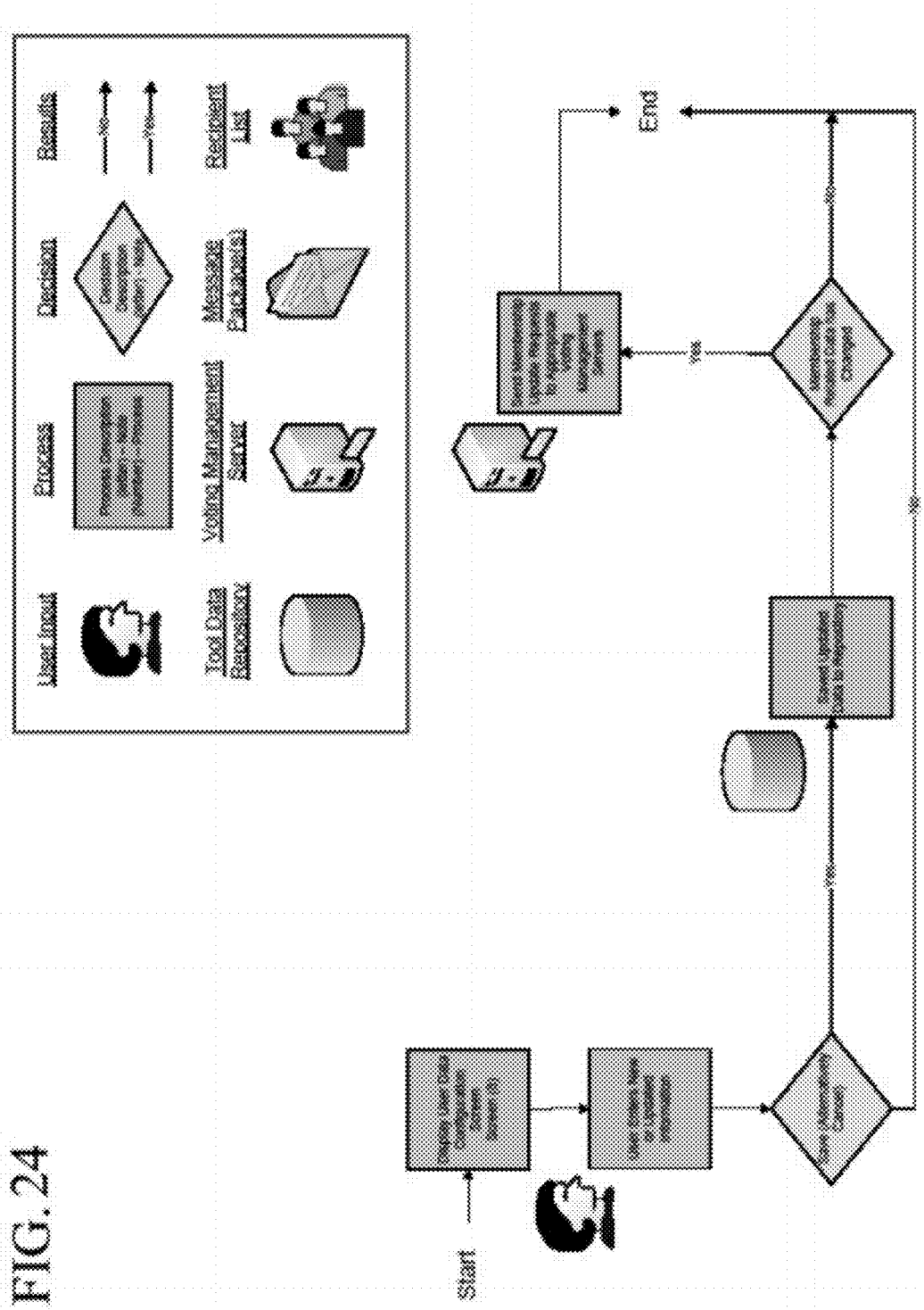

Set, Update and Maintain User Profile Information. The user is able to set, update and maintain user profile information and automatically generate the appropriate updates and messages to associated Voting Management Servers. See FIG. 24. See also End User Voting Tool Configuration Elements.

End User Voting Tool: Message Data Structures. The end-user voting tool technically enhances the typical email client software tool in a similar manner as a calendar software package enhances the same solution. A calendar tool adds specific message types, such as calendar event invitations and calendar event replies, adds a user interface to view and edit the user's calendar and then defines underlying process by which those elements interact; similarly, the end-user voting tool adds specific message types that can be sent, an associated end-user interface and certain new underlying processes. The new message types defined are either utilized in response to the end user's direction or driven by the automation within the end-user voting tool (described later in this document).

The present invention may be implemented as an enhancement package or "plug-in" to email systems. The End User Voting Tool would be implemented as a "plug-in" to client email systems such as Microsoft Outlook for example and the Voting Management Server would be a "plug-in" enhancement to the email server such as Microsoft Exchange. Access to your end user voting tool, would consist of clicking on a new icon or menu option within your email application. Currently you would have options, like mail, calendar, contacts, and tasks. This new option may be called, for example, initiatives, voting or direct democracy. Once you select this option, you would have various folders you can access to view your initiatives. By default these might include drafts, inbox and outbox. The inbox would contain initiatives you have received. The Outbox would include initiatives you've sent and drafts would contain initiatives you have written but not yet sent. The email plug-in might also allow the user to select certain initiatives to update a desktop application or widget that would display current vote tabulation in a live manner. As new voter updates the Desktop Display would update automatically and display it to the user.

The discussion of message types is critical to technically defining the framework. Three specific message types are required and used by the End User Voting Tool during the distributed voting process, with additional ones needed by the Voting Management Server and interaction with it. The message types needed by the End User Voting Tool are: Initiative message types (Packages), Voter Response message types (Packages), and Voter Update message types (Packages). It should also be noted that in addition to being sent between End User Voting Tools, these message packages form the records within the internal database structure of the End User Voting Tool. Referred to as the repository this database stores all the required information the tool needs to function. The following sections will examine these three message types and in further detail.

The Initiative Package is a message generated by the end-user voting tool when the original author starts the process of gathering votes on a Direct Democracy Framework initiative. The user enters the data of choice into a user interface screen that looks similar to an email program's "send message" screen. The specific look and feel of the screen is defined by the specific software developer. The Initiative Package can also be resent by other users when recursive voting is employed (described in more detail below). However, under these circumstances, unlike email, the Initiative Package cannot be altered, merely forwarded with changes made only to certain fields. The initiative package message type may have initiative package data elements selected from the group consisting of message type, initiative ID, Title, content, date/time sent, first level recipients, recursive voting levels permitted, recursive voting levels used, sender, author, attachments, voting deadline, minimum update response delay, digital signature required, required memberships, required security certifications, attached initiatives, voter update data, allow secondary petition servers and other data.

The initiative package supports, the inclusion of the data element "Message Type" which provides System-defined indicator states that this is an Initiative Package. Generated by the system when the user selects the option to send or resend an initiative. There may be a data element named "Initiative ID" which provides a unique identifier for the Initiative as a type of data. Includes sufficient data to ensure it is always a unique number and can never be duplicated by any other end-user voting tool at any time this field never changes after creation There may be a data element named "Title" which provides a type of data stringfield labeling the initiative. It may be entered by author and the initiative does not change after the author sends the initiative making it active.

There may be a data element named "Content" which provides a type of data "Appropriate content data in various formats, such as Text, HTML, and Rich Text" It may be written by the original author, the content cannot be changed once the initiative is sent by the author making it active.

There may be a data element named "Date/Time Sent" which provides data on Date and Time Information. It may be automatically generated by the tool and does not change after the initiative is first sent by the author.

There may be a data element named "Recipients" which provided data as a "List of the recipients of the initiative" It may be selected by author or sender; and can also include forums or mailing lists and it only includes the immediate recipients of the message; previous recipients in recursive voting are not included meaning that this field is cleared and repopulated with new recipients each time it is resent.

There may be a data element named "Attachments" which provides a type of data "file attachments". Any additional documents needed and cannot be added or deleted once initiative is sent and made active. Related initiatives can be attached as required.

There may be a data element named "Recursive Voting Levels Permitted" which provides a type of data as an integer between zero and unlimited. It may be entered by the user to control recursive voting and cannot be changed once the initiative is sent by the author. by the author There may be data element named "Recursive Voting Levels Used" which provides an integer between zero and unlimited. It identifies the number of levels removed from the original author of the initiative and is used to control the growth of the tree on recursive voting this field automatically increases by one each time the initiative is received by another level in the voting tree.

There may be the data element "Sender" which provides the Sender's electronic contact added address (typically email). It may be automatically added by the system, is the author the first time the system is sent, changes when the initiative is sent recursively with the original sender being stored to the repository and associated to this initiative, facilitating the delivering of Voter Response Packages to the correct sender.

There may be the data element "Author" which may be the authors electronic contact address (typically email). This field would be different than the sender in the case of recursive voting and is an optional field. It would not change once the initiative is sent by the author.

There may be the data element "voting deadline" which provides date and time information and indicates the time by which a response is required to be included in the vote.

There may be the data element "minimum update response delay" which provides a time period ranging from zero or instant to some upper limited—most likely no more than a few hours. This defines the amount of time that a responder has to wait in order to send an updated Voter Response Package after sending the first response package; this is used to manage data transmission requirements of the framework.

There may be the data element "Digital Signature Required" which is a boolean field that indicates whether a digital signature is required or not in the response. This is an optional feature that may be implemented in some versions of the software There may be the data element "Required Memberships" which is a field that identifies the membership(s) that are required in order to vote in this particular initiative. It may be selected by the author and linked to membership certificates issued by a Voting Management Server. This field would not change after being sent by the author.

There may be the data element "Required Security Certifications". This is a field that identifies the security certification(s) required in order to vote on this initiative. Security certificates would be issued by Voting Management Servers based on security scans and software updates performed by the Voting Management Server. This field would not change after being sent by the author.

There may be the data element "Attached Initiatives" which may be a boolean field that identifies whether or not this initiative has any attached initiatives or not. It may be created by the author (or "creator") when the initiative is created and would not change after being sent by the author. Note the terms "author" and "creator" are interchangeable.

There may be the data element "Voter Update Data" which may be the initial Initiative Package, and also contain a complete copy of the Voter Update Package. All data is included in the Voter Update when the initiative is first sent out subsequently Voter Update Packages are sent by themselves to avoid resending redundant data.

There may be the data element "Allow secondary petition servers" which identifies whether a petition can be sent to a user's own preferred petition server or not. This may be used for large initiatives to allow distribution of petition data across a large number of servers, secondary servers can link into the primary petition servers (see below). In this way, the voting management server may transmit the petition across multiple servers.

There may be a data element "Other data" as needed. This would be as defined and required by the specific software developer.

Voter Response Package. When the Initiative Package is received by another End User Voting Tool, the recipient sees the initiative in a very similar manner as when viewing a normal email. However, instead of allowing the recipient to respond to the initiator with a message of his or her own, the tool only allows the recipient to respond with predetermined responses, such as support, in opposition, or with no opinion. (Other voting formats may be supported as well, but they are not discussed in detail here.) The Voter Response Package is the message that is sent back, either in response to the user making or changing the vote or in response to incoming recursive voting. Thus, it can be sent either by the user or automatically. At a minimum, the voter response package data supports the inclusion of the following data.

There may be the data element "message type" in the voter response package which is a system defined indicator that this is a voter response package. This may be generated by the system when the user selects the option to send a certain response.

There may be the data element "Initiative ID" in the voter response package which provides a unique identifier for the initiative. It is linked to the original.

There may be the data element "date/time sent" in the voter response package which provides data regarding the Date and time and may be automatically generated by the tool.

There may be the data element "sender" in the voter response package which provides data on the Sender's electronic contact address, in this case the recipient of the initiative who is responding (typically their email address). It may be automatically added by the system.

There may be the data element "voter response" in the voter response package which provides data on the selection as determined by the voting format of the initiative. This may be automatically added by the system There may be the data element "digital signature" in the voter response package which is an optional field providing the digital signature of the sender. May not be supported by all versions of the Software.

There may be the data element "Recursive Votes Supporting Initiative" in the voter response package which may be an integer between zero and a ten-digit number. Tallies up the additional votes received through recursive voting and sends them on to the next level. This is to say that each time a voter submits a vote in support of an initiative another vote is added to the total number of votes in support of the initiative. As stated previously, a vote in "support" indicates the voter agrees with and supports the initiative.

There may be the data element "Recursive Votes Not Supporting Initiative" in the voter response package which may be an integer between zero and a ten-digit number. This tallies up the additional votes received through recursive voting and sends them on to the next level. The term "not supporting" is the same as rejecting the initiative. It is to say, they do not agree with or support the initiative.

There may be the data element "Required Membership Certificates" in the voter response package. This field confirms the membership(s) that are required in order to vote in this particular initiative. This may be linked to membership certificates issued by a Voting Management Server.

There may be the data element "Required Security Certificates" in the voter response package. This may be fields that confirm the security certification(s) required in order to vote on this initiative. Security certificates would be issued by Voting Management Servers based on security scans and software updates performed by the Voting Management Server There may be the data element "Petition Status" in the voter response package which is a field that records whether the petition status for each petition of this Initiative for this user status would be not-sent, sent, confirmed. This may be managed automatically by the tool based on outbound and inbound messages to the Voting Management Server.

There may be the data element "Other Data" in the voter response package. This may be as needed, as defined and required by the specific software developer.

Voter Update Package. The third and final message type required to support the distributed voting step in the Direct Democracy Framework is the Voter Update Package. This message type is automatically generated by the End User Voting Tool when the votes tally or status of the initiative changes. Its purpose is to keep all recipients of the initiative updated in regards to the total vote of the initiative. It is therefore resent by all users who have participated in recursive voting to their own recipients. It also supports the petition process (described later).

The voter update package may contains the following data elements: message type, initiative ID, date/time sent, sender, total votes supporting imitative, total votes rejecting initiative, voting status, petition status, quorum, registered voting status, extended initiative status, petition location. There may be the data element "Message Type" in the voter update package. System-defined indicator that is a Voter Update Package. Automatically generated by the tool periodically as updates are necessary There may be the data element "initiative ID" in the voter update package. A unique binary identified for the initiative. This is typically linked to the original.

There may be the data element "Date/Time Sent" in the voter update package. This provides data on the date and time sent and may be automatically generated by tool.

There may be the data element "Sender" in the voter update package. This provides data on the sender, such as the senders contact address—in this case, the sender of the initiative or the recipient one level up who is resending via recursive voting (typically email). It may be automatically added by the system There may be the data element "Total Votes Supporting Initiative" in the voter update package. This may be an integer between zero and a ten-digit number. Tallies up the total votes received through all voting and sends that number out to all recipients.

There may be the data element "Total Votes Not Supporting Initiative" in the voter update package. This may be an integer between zero and a ten-digit number. Tallies up the total votes that do not support the initiative received through all voting and sends that number out to all recipients.

There may be the data element "Voting Status" in the voter update package. Identifies the current voting status of the initiative as draft (cannot yet be voted on), active (open for voting) or closed (voting is completed). Automatically managed by the voting process from the author's End User Voting Tool.

There may be the data element "Petition Status" in the voter update package. Like the voting status, the petition status determines where the petitioning process stands. Statuses include pre-petition, petition in progress, petition-closed. Either modified manually when the initiative is petitioned or automatically when the quorum is reached.

There may be the data element "Registered Voting Status" in the voter update package. Like the voting status registered voting status determines where the registered voting process stands statuses include pre-registered voting, registered voting in progress, registered voting-closed. Controlled by the sponsoring agency through the Voting Management Server.

There may be the data element "Extended Initiative Status" in the voter update package. This is a selection field that indicates additional status information about the initiative (extended status types might include options such as in-process, passed, cancelled, expired, in congress, pending ratification, and ratified.) Software developers need to define standards for the types of initiative status their version supports.

There may be the data element "Petition Location(s)" in the voter update package. Contains a list of locations of Voting Management Servers to which the initiative has been petitioned. Is defined by the author, if he or she wishes to submit a successful initiative to some type of organization for consideration.

There may be the data element "Quorum" in the voter update package. This may be data in the form of an integer and provide the total number of votes required before a initiative is considered valid. Maybe used to automatically trigger a petition.

There may be the data element "Other Data" in the voter update package, as needed and as defined and required by the specific software developer.

By incorporating all three of these voting packages into a recursive voting process, we can reach any size of audience in a relatively trouble-free manner.

End User Voting Tool: User Configuration. In addition to retaining message data regarding initiatives, the repository also stores certain information that controls the function of the End User Voting Tool. This is referred to as configuration data. The following table defines the configuration data needed to implement the core functionality of the End User Voting Tool:

There may be the data element "Owner Contact Data" in the End User Voting Tool Configuration Elements. Contains multiple fields recorded appropriate data about the owner such as name, address, phone number, email address, etc. Linked to the contact database so that user data can easily be sent as appropriate.

There may be the data element "Membership(s)" in the End User Voting Tool Configuration Elements. Lists organizations and the associated Voting Management Servers for which the end user is registered or is registering each organization listed would include a current membership status such as applied, accepted, registered and not-active. Links to Voting Management Servers for Petitions and Registered Voting There may be the data element "Minimum Required Delay Setting" in the End User Voting Tool Configuration Elements. The setting that determines the delay setting associated with all outbound initiatives and defines the delay setting for outbound voter responses and voter updates. Initially defined by the user, would be very low for high performance server based End User Voting Tools and very high for low bandwidth devices.

There may be the data element "Auto Display Setting(s)" in the End User Voting Tool Configuration Elements. Determines whether or not user automatically votes on inbound initiatives automatically displays inbound initiatives and if initiatives that have just been voted on are displayed. This may be set by the user.

There may be the data element "Auto Petition Settings" in the End User Voting Tool Configuration Elements. Defines whether or not the user automatically submits petitions signatures or should be requested by the tool to send petition signatures. This may be set by the user.

There may be the data element "Default Initiative Data" in the End User Voting Tool Configuration Elements. Initiative Template that defines the default field entries for a newly created initiative. Multiple templates may be supported.

There may be the data element "Preferred Petition Server" in the End User Voting Tool Configuration Elements. Identifies a location where Petition signatures are sent when a preferred or secondary petition signature server is allowed. This is set by the user.

There may be the data element "Other Data" in the End User Voting Tool Configuration Elements. This may be as needed, as defined and required by the specific software developer End User Voting Tool: Additional Notes. Having discussed the capabilities of the End User Voting Tool, the core data structures it uses (with additional structures defined below), and the process flow utilized, it is important we close the discussion of this component of the Direct Democracy Framework by notating some other important aspects of this tool.

Data Transmission Capacity Management. An important issue addressed is the accumulation of massive amounts of data being generated if recursive voting allowed all data associated with an initiative—including every user's identification data and vote—to be passed on through the voting tree. Therefore, to protect both the users' privacy and the technical viability of the system, as the earlier example and data structures indicate, we limit the size of the Voting Response Package to only the most critical data. Initiators receive the votes of all users to whom they sent the initiative directly as well as the total tally of all the votes collected. They do not receive a complete list of all voters as such a list could not be built until the petition and registration process of the Direct Democracy Framework (described below).

Data Transmission Frequency Management. Another issue addressed is the impact that even small Voter Response Packages might have on the communications network if the frequency of their transmission rate is too high. This problem is alleviated through simple response delays incorporated into the tool. For example, requiring a 10-minute delay before an updated Voter Response Package or Voter Update Package is transmitted would significantly reduce the quantity and frequency of packages being sent across the communications network. This time delay could be defined by the end user based on the resources available and impact to the system and network in which the end-user voting tool is being operated. An end-user voting tool embedded in a high performance server might not need such a delay, whereas an end-user voting tool sitting on a cell phone might be best served by a long delay. All recipients of an initiative would be notified of the minimum delay associated with the sender's device and would set the delay for that initiative to the higher value of their own delay setting and the setting of the initiative. Even with this delay mechanism included, a massive volume of users can be reached and the most distant response would still arrive in a matter of hours. Most would agree this is a very reasonable amount of time to begin gathering millions—or even billions—of votes from across the globe. Such heartbeat control of the frequency of transmissions would consequently reduce network load significantly.

Voting Frequency Management. The end-user voting tool ensures that a user can only vote on an issue once by tracking the unique initiative identification and the identity of the user who sent the initiative to users. Subsequent attempts by others to reach the same user on that initiative result in a response that signals the user previously supported, opposed, or indicated no opinion; this process occurs in the background so users are not bothered by seeing the same initiative repeatedly unless they choose to review the initiative again and change their response.

Broken Voting Tree Branch Management. Finally, the last issue to note that we have tackled above involves determining what happens when a branch of the voting tree becomes broken or disconnected—a problem that results in the downstream recursive voting portion of the voting tree linked to the disconnected recipient not being able to reach the initiator so that a complete and accurate tally of the votes is maintained. In determining an approach to this challenge several approaches were reviewed.

One approach is simply to allow broken branches to continue to grow as they normally do and recognize that—like any distributed system—our voting tree will be imperfect. Ultimately, a strong initiative that reaches the petition or registration phase carries a certain media awareness with it that enables users who become disconnected and do not hear about the petition through the voting tree to become informed about what was happening and send in their petitions anyway.

Another approach is to rely on the timestamp of the Voter Update Package sent from the initiating end-user voting tool. We can subsequently restrict recursive voting to being initiated only after an indication is received down the voting tree that determines the original vote has most likely already been tallied. This can be done by waiting to send out recursive votes until the timestamp of the latest Voter Update Package has aged by at least the send delay setting multiplied by the number of levels removed from the initiator. Note the term initiator is interchangeable with creator, author. This control mechanism could stunt the growth of any broken branches of the voting tree until the breach is reconnected, thereby preventing new users from becoming connected to the broken branch of the tree. This method is discussed in more detail below.

Finally, perhaps the most complicated method for handling broken branches involves allowing those areas of the voting tree to reconnect to the tree through an alternate path. This could be facilitated by allowing open forums built into the voting tree to be passed down the voting tree. With this information, a branch that is unable to pass its tally up could instead connect to any of the listed open forums and pass its tally up that way. The part of the tree that has lost the branch could, after a certain period of time, remove the tally of the disconnected branch from its own tally. As a result, the vote count is correctly maintained while reaching the initiator through a different route.

Calculating Distribution Timeframes. An interesting technical aspect of recursive voting to explore is the timeframes required for a tree to grow, which can be performed by analyzing the method of broken branch management we chose to use and then determining the number of levels in the tree in question. For example, as we have used the Voter Update Package timestamp method to control the growth of the tree, the time required for each layer to be added to the tree is calculated as follows:

$$\text{Time to add level} = \text{Time Delay Setting} \times (1 + (\text{total levels in tree} \times 2))$$

By utilizing this formula, we can estimate the following defining the time required to build voting trees based on the number of levels in the tree: If there is 1 tree level, it would take approximately Ten Billion average recipients per send to reach Ten billion voters and 10 minutes to build the tree based on a 10-minute response delay. If there are 2 tree levels, it would take approximately 100,000 average recipients per send to reach Ten billion voters and 1 hour to build the tree based on a 10-minute response delay. If there are 3 tree levels, it would take approximately 2,000 average recipients per send to reach Ten billion voters and 2 hours, ten minutes to build the tree based on a 10-minute response delay. If there are 4 tree levels, it would take approximately 300 average recipients per send to reach Ten billion voters and 3 hours, 40 minutes to build the tree based on a 10-minute response delay. If there are 5 tree levels, it would take approximately 100 average recipients per send to reach Ten billion voters and 5 hours, 30 minutes to build the tree based on a 10-minute response delay. If there are 6 tree levels, it would take approximately 47 average recipients per send to reach Ten billion voters and 7 hours, 40 minutes to build the tree based on a 10-minute response delay. If there are 7 tree levels, it would take approximately 27 average recipients per send to reach Ten billion voters and 10 hours, 10 minutes to build the tree based on a 10-minute response delay. If there are 8 tree levels, it would take approximately 18 average recipients per send to reach Ten billion voters and 13 hours to build the tree based on a 10-minute response delay. If there are 9 tree levels, it would take approximately 13 average recipients per send to reach Ten billion voters and 16 hours, 10 minutes to build the tree based on a 10-minute response delay. If there are 10 tree levels, it would take approximately 10 average recipients per send to reach Ten billion voters and 19 hours, 40 minutes to build the tree based on a 10-minute response delay.

As this table indicates, this methodology enables us to reach the entire world's population—even if each sender is only contacting an average of ten recipients in less than a day. This is the amazing power of recursive voting.

Voting Management Server: Capabilities Definition. To recap the role of the Voting Management Server it is the tool responsible for the second through fourth steps in the Direct Democracy Framework process; petition, registration and congress and also provides a server based version of the End User Voting Tool. It is therefore critically important to document the core functionality of this server system that is required to implement the Direct Democracy Framework.

There may be "web based end-user voting tool functionality" as a functional requirement feature in the voting management server. The Voting Management Server must provide a multi user web based End User Voting Tool environment that is intuitive and provides all the functionality discussed above. See end user voting tool flowcharts.

Figure 25:
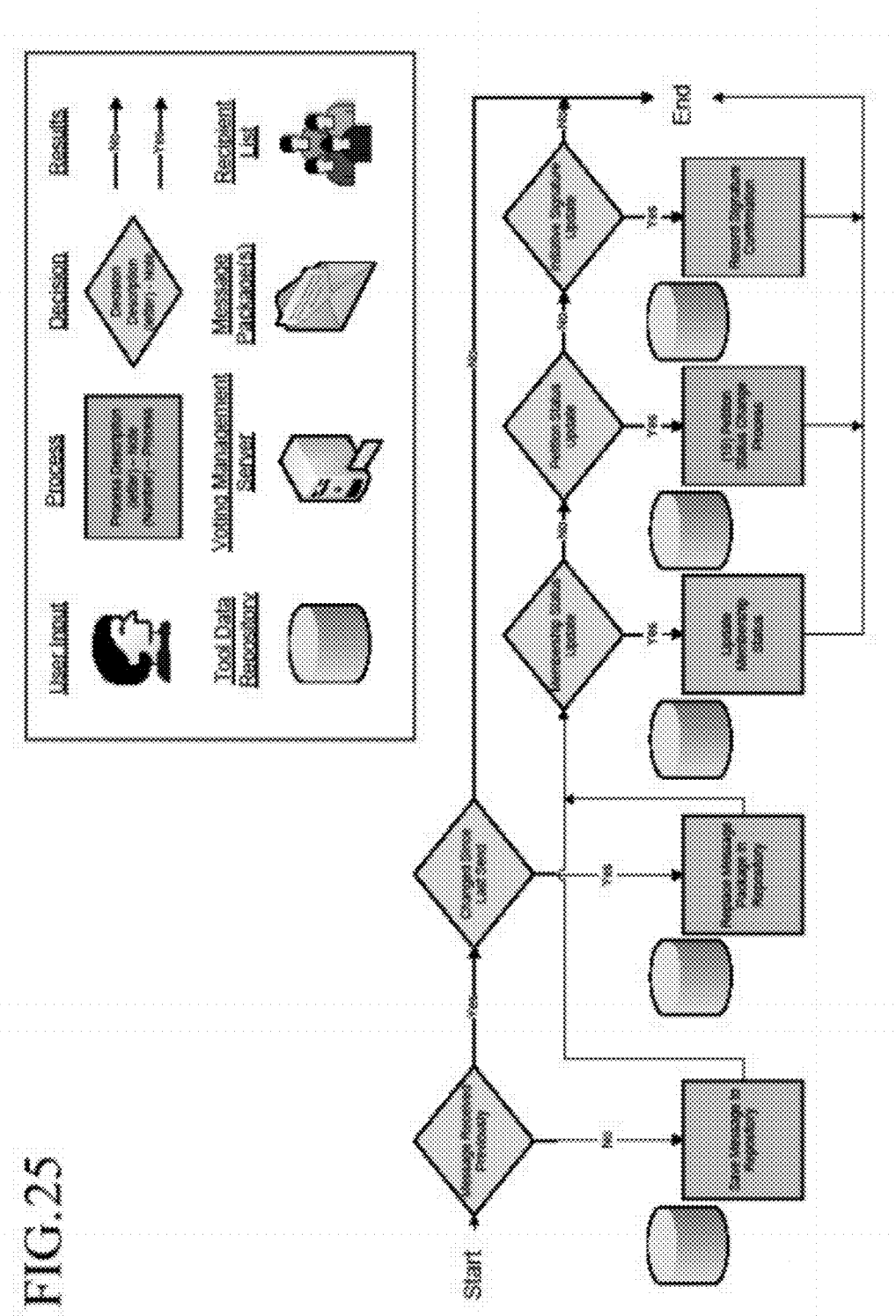

There may be "Registered Users" as a functional requirement feature in the voting management server. The Voting Management Server administrator must be able to accept and approve requests for membership(s) on the Voting Management Server. See FIG. 25.

There may be "Create New Petitions" as a functional requirement feature in the voting management server. The Voting Management Server administrator must be able to accept and approve requests for petitions from existing members either automatically or by manual approval. There may be "Receive and Accept Petition Signatures" as a functional requirement feature in the voting management server. The Voting Management Petition Server administrator must be able to accept Signatures and approve requests for petitions from existing members either automatically or by manual approval.

There may be "Register Initiative" as a functional requirement feature in the voting management server. The Voting Management Server administrator must be able to assign an existing petitioned initiative into the voter registration process either automatically or by manual approval.

There may be "User Registration" as a functional requirement feature in the voting management server. The Voting Management Server administrator must be able to accept the in-person identity verification of users and assign them registered status.

There may be "Registered Voting" as a functional requirement feature in the voting management server. The Voting Management Server administrator must be able to grant access to End User Voting Tool functionality in a secure location to allow users to re-vote in a secure registered environment. See end-user voting tool flowcharts.

There may be "Congress Selection" as a functional requirement feature in the voting management server. The Voting Management Server administrator must be able to assign an existing registered initiative for selection of delegates for a congress.

There may be "Congressional Voting" as a functional requirement feature in the voting management server. The Voting Management Server administrator must be able to grant access to End User Voting Tool functionality in a secure location to allow users to re-vote in a secure registered environment during a congress.

There may be "Delegate Check-in" as a functional requirement feature in the voting management server. The Voting Management Server administrator must be able to accept the in-person identity verification of delegates and assign them check-in status during a Congress.

There may be "Ratify Initiative" as a functional requirement feature in the voting management server. The Voting Management Server administrator must be able to assign an existing registered initiative into a ratified status.

There may be "Create New Forums" as a functional requirement feature in the voting management server. The Voting Management Server administrator, must be able to accept and approve requests for open forums from existing members either automatically or by manual approval.

There may be "Manage Existing Users" as a functional requirement feature in the voting management server. The Voting Management Server administrator must be able to search for an update existing user profiles including security access, membership, forums and profile data.

There may be "Manage Existing Groups" as a functional requirement feature in the voting management server. The Voting Management Server administrator must be able to search for an update existing groups including security access, membership, forums and profile data.

There may be "Manage Existing Petitions" as a functional requirement feature in the voting management server. The Voting Management Server administrator must be able to search for any update petitions including status.

There may be "Manage Existing Forum" as a functional requirement feature in the voting management server. Voting Management Server administrator must be able to search for an update existing Forums including Initiative Status.

Voting Management Server: Message Packages. In this section of the document we will describe all the data structures of the message types that are used when interacting with the Voting Management Server. There are in all eight message packages that we need to discuss and they are as follows:

Voting Management Server Membership Request Package. The Voting Management Server Membership Request Package is sent by an End User Voting Tool to request a user be added, group be added or membership status of a user be changed. It is sent automatically by the End User Voting Tool in response to the user making changes to the user configuration.

The Voting Management Server Membership Request Package supports at a minimum the inclusion of the following data elements: message type, user contact data, membership(s), status request(s), time and date, certificates, digital signatures and other data. The package supports, at a minimum, the inclusion of the following data.

The Voting Management Server Membership Request Package data element "message type" is a system-defined indicator that is a Voter Management Server Membership Request. It may be automatically generated by the tool based on End User Voting Tool user configuration changes.

The Voting Management Server Membership Request Package data element "User Contact Data" contains multiple fields and recorded appropriate data about the owner such as name, address, phone number, email address, etc. Linked to the contact database from End User Voting Tool.

The Voting Management Server Membership Request Package data element "Membership(s)" lists organizations and the associated Voting Management Server for which the end user is requesting a membership or status change. Groups would be configured on the Voting Management Server. See FIG. 27.

The Voting Management Server Membership Request Package data element "Status Request(s)" specifies the status change requested such as application, extension, cancelation, etc. Would then be validated by the administrator of the Voting Management Server.

The Voting Management Server Membership Request Package data element "Time and Date" provide date on the Time and Date of Request. It may be generated by End User Voting Tool when sent to the Voting Management Server.

The Voting Management Server Membership Request Package data element "Certificates" attaches any security certificates that may be required to get membership. It may be provided by this or other Voting Management Servers.

The Voting Management Server Membership Request Package data element "Digital Signatures" attaches digital signatures if required. Provided by this or other voting management servers.

The Voting Management Server Membership Request Package data element "other data" is as needed, as defined and required by the specific software developer.

Voting Management Server Membership Request Response Package. The Voting Management Server Membership Request Response Package is sent by the Voting Management Server either automatically when a Voting Management Server Membership Request Package is processed by the server, or when the server administrator manually responds to the request. The Voting Management Server Membership Request Response package supports, at a minimum, the inclusion of the following data: data elements "message type", "memberships", "status request", "time and date", "certificates" and "other data."

The Voting Management Server Membership Request Response Package data element "Message Type" is a system-defined indicator that is a Voter Management Server Membership Request Response. It may be generated by the Voting Management Server based on either automated membership assignment of Administrator authorization.

The Voting Management Server Membership Request Response Package data element "Membership(s)" lists organizations and the associated Voting Management Server for which the end user is requesting a membership or status change. Groups would be configured on the Voting Management Server.

The Voting Management Server Membership Request Response Package data element "Status Request" specifies status change granted or denied in this response. It would then be validated by the administrator of the Voting Management Server.

The Voting Management Server Membership Request Response Package data element "Time and Date" provides data on the Time and Date of the Request. It may be generated by Voting Management when sent to End User Voting Tool.

The Voting Management Server Membership Request Response Package data element "Certificates" attaches any security certificates assigned as part of this process. It may be provided by the Voting Management Servers.

The Voting Management Server Membership Request Response Package data element "other data" may be as needed, as defined and required by the specific software Developer.

Voting Management Server Petition Request Package. The Voting Management Server Petition Request Package is sent by the End User Voting Tool either automatically when an initiative passes its quorum or manually at the request of an end user. It is the step that progresses an initiative from step one to step two in the Direct Democracy Framework Process. The package supports, at a minimum, the inclusion of the following data: "message type", "initiative package", "time and date" and "other data."

The Voting Management Server Petition Request Package data element "Message Type" is a system-defined indicator that is a Petition Request. Generated by End User Voting Tool either manually or automatically, when Quorum is achieved in voting numbers.

The technical implementation of a quorum would consist of allowing the creation of an initiative to include the entry of an additional integer field identifying the desired quorum in order to petition the Initiative or take other actions. Once the number of votes received reaches the entered quorum this could automatically trigger certain events such as the posting to special open forums for high interest initiatives, or the launching of a partition. A user might be able to setup multiple quorums depending on their goals, based for example of the qualification criteria of different voting management server hosts. As an example a user might create an initiative to put a certain road sign onto a road they frequently travel, they may setup petition criteria for their local government, county government and state government each at different levels of voting. The primary purpose of Quorums within the Direct Democracy Framework is to trigger petitioning, see FIG. 26.

The Voting Management Server Petition Request Package data element "Initiative Package" provides the complete Initiative Package being petitioned and is provided by the End User Voting Tool as part of the Petition Request.

The Voting Management Server Petition Request Package data element "Time and Date" provides data about the Time and Date of Petition Request. Generated by End User Voting Tool at time of send.

The Voting Management Server Petition Request Package data element "Other Data" is provided as needed, as defined and required by the specific software developer.

Voting Management Server Petition Request Response Package. The Voting Management Server Petition Request Response Package is sent by the Voting Management Server either automatically when a Voting Management Server Petition Membership Request Package is processed by the server, or when the server administrator manually responds to the request. The package supports, at a minimum, the inclusion of the following data: "Message type", "initiative package id", "time and date", "status" and "date".

The Voting Management Server Petition Request Response Package data element "Message Type" is a System-defined indicator that is a Petition Request Response. It may be Generated by Voting Management Server either automatically or at the request of the Administrator The Voting Management Server Petition Request Response Package data element "Initiative Package" provide the id (or identification) of the Initiative in question. It may be provided by the End User Voting Tool as part of the Petition Request.

The Voting Management Server Petition Request Response Package data element "Time and Date" provides the Time and Date of Petition Request Generated by Voting Management Tool at time of send.

The Voting Management Server Petition Request Response Package data element "Status" provides the Status of a Petition as a result of this request. It may be generated by the Voting Management Server either automatically or at the request of the Administrator.

The Voting Management Server Petition Request Response Package data element "Other Data" provides information as needed, as defined and required by the specific software Developer.

Voting Management Server Petition Signature Package. The Voting Management Server Petition Signature Package is sent by the End User Voting Tool either automatically when the End User Voting Tool receives and processes a Voter Update Package that indicates the initiative has gone into petition or manually at the request of an end user. The Voting Management Server Petition Signature package supports, at a minimum, the inclusion of the following data: "message type", "initiative package id", "time and date", "vote", "certificates", and "other data". See FIGS. 29-42, which depict voting management server flowcharts.

The Voting Management Server Petition Signature package data element "Message Type" is a system-defined indicator that is a Petition Signature. It may be generated by End User Voting Tool when the user signs the petition.

The Voting Management Server Petition Signature package data element "Initiative Package id" provides the id (identification) of the Initiative in question. It may be Provided by the End User Voting Tool as part of the Petition Request.

The Voting Management Server Petition Signature package data element "Time and Date" provides the Time and Date of Petition Request. It may be generated by Voting Management Tool at time of send.

The Voting Management Server Petition Signature package data element "Vote" Indicates whether Signature opposes or supports initiative. It may be Generated by End User Voting Tool when the user signs the petition.

The Voting Management Server Petition Signature package data element "Certificates" Contains any security certificates that were required to authenticate signature to this server. Generated by this or other Voting Management Servers originally.

The Voting Management Server Petition Signature package data element "Other Data" provides data as needed, as defined and as required by the specific software developer.

Voting Management Server Petition Signature Response Package. The Voting Management Server Petition Signature Response Package is sent by the Voting Management Server when a Voting Management Server Petition Signature Request Package is acknowledged. The Voting Management Server Petition Signature Response Package supports, at a minimum, the inclusion of the following data: "message type", "initiative package id", "time and date", "confirmation", and "other data".

The Voting Management Server Petition Signature Response Package data element "Message Type" provides a system-defined indicator that is a Petition Signature Response. It may be generated by Voting Management Server automatically.

The Voting Management Server Petition Signature Response Package data element "Initiative Package id" which provides the identification (id) of the Initiative in Question. It may be provide by the End User Voting Tool as part of the Petition Request.

The Voting Management Server Petition Signature Response Package data element "Time and Date" provides data on the Time and Date of Petition Signature Request Response. Generated by Voting Management Tool at time of send.

The Voting Management Server Petition Signature Response Package data element "Confirmation" provide confirmation of whether signature opposes or supports Initiative. Generated by Voting Management Server when the user signs the petition.

The Voting Management Server Petition Signature Response Package data element "Other Data" provides data as needed and as defined and required by the specific software developer.

Voting Management Server Petition Link Request Package. The Voting Management Server Petition Link Request Package is sent from one Voting Management Server to another when a petition is sent to a preferred Voting Management Server during a petition process. The Voting Management Server Petition Link Request package supports, at a minimum, the inclusion of the following data elements: "message type", "Initiative Package Id", "Time and date" "server address" and "other data"

The Voting Management Server Petition Link Request Package data element "message type" is a system-defined indicator that is a Voting Management Server Petition Link Request Package. It may be Generated by Voting Management Server automatically.

The Voting Management Server Petition Link Request Package data element "Initiative Package id" which provides the id of the Initiative in question. It may be provided by the End User Voting Tool as part of the Petition Request.

The Voting Management Server Petition Link Request Package data element "Time and Date" provides data about the Time and Date of Voting Management Server Petition Link Request Package. It may be generated by Voting Management Tool at time of send.

The Voting Management Server Petition Link Request Package data element "Server Address" provides information (the server address) identifying the server that is requesting the petition link. It may be Generated by Voting Management Server when it sends the Package.

The Voting Management Server Petition Link Request Package data element "Other Data" provides data as needed, as defined and required by the specific software Developer.

Voting Management Server Petition Link Request Response Package. The Voting Management Server Petition Link Request Response Package is sent from one Voting Management Server to another when a petition is sent to a preferred Voting Management Server during a petition process. It confirms receipt of the link. The Voting Management Server Petition Link Request Response Package supports, at a minimum, the inclusion of the following data elements: "message type", "initiative package id", "time and date", "confirmation" and "other data".

The Voting Management Server Petition Link Request Response Package data element "Message Type" is a system-defined indicator that is a Voting Management Server Petition Link Request Response Package. It may be generated by Voting Management Server Automatically.

The Voting Management Server Petition Link Request Response Package data element "Initiative Package id" provides the id of the Initiative in question. It may be provided by the End User Voting Tool as part of the Petition Request.

The Voting Management Server Petition Link Request Response Package data element "Time and Date" provide the Time and Date of Voting Management Server Petition Link Request Response Package. It may be generated by Voting Management Tool at time of send.

The Voting Management Server Petition Link Request Response Package data element "Confirmation" provides information confirming (or alternatively denying) the link to the petition. It may be Generated by Voting Management Server when it sends the package.

The Voting Management Server Petition Link Request Response Package data element "other data" provides data as needed and as defined and required by the specific software developer.

Voting Management Server: Server Configuration. In addition to retaining message data regarding initiatives, the Voting Management Server repository must also store certain information that controls the function of the Voting Management Server. This is referred to as server configuration data. The following table defines the configuration data needed to implement the core functionality of the Voting Management Server:

Voting Management Server Configuration Elements. There may be the following data elements for voting management server configuration elements: "Auto Process Setting(s)" and "other data." Auto Process Setting(s) may provide data in multiple fields that defined whether requests for new users, new groups and new group membership requests are approved automatically, denied automatically or manually processed. They may be Enter by Voting Management Server administrator to define how the server should react to inbound Messages. There may also be "other data" as needed, as defined and as required by the specific software developer.

The following notes apply to the above Voting Management Server flowcharts: (a) The Forum Manager is a session of the End User Voting Tool running automatically, so that the Forum itself votes "no opinion" on all received initiatives, and automatically sends recursive voting to every member of the group associated with the Forum.

Additional Features. There may be additional technical capabilities provided by the Direct Democracy Framework. A few examples are introduced in order to demonstrate the potential flexibility of this system.

Integration and Automation. An important capability of the Direct Democracy Framework is its ability to automate the interactions of other technologies. Such integration uses APIs for the end-user voting tool and the Voting Management Server, which enables the framework to define potentially complex voting rules (e.g., unanimous support or majority support combined with a yes vote of named key stakeholders) with other technologies to automate certain key processes.

A simple scenario might be the automated scheduling or cancelation of a calendar event, based on the approval or disapproval of attendees, or a local government that proactively implements democratically controlled electronic speed limits on local streets. Another far more serious scenario might be the automated activation of lethal force capability with the unanimous vote of a set of well-trained security officers monitoring an emerging security threat. As military forces around the world increasingly rely on unmanned combat systems, such capabilities might become critical.

Weighted Voting. Another powerful feature for the Direct Democracy Framework could be the implementation of weighted voting. This feature would work by allowing the author to designated an initiative as a weighted initiative then apply a particular percentage weight to each recipient. When recursive voting is utilized, the percentage assigned to a particular recipient could then be broken down by that recipient to their own list of recipients. Such a feature might be very valuable in the financial services industry where the voting on a particular issue is weighted by the number of shares or percentage of ownership. A given public company could send a stockholder initiative to all shareholders, then if a given stockholder happened to be a mutual fund, that fund could then forward to fund member based on the number fund shares they owned.

Variable Format Voting. Although the greatest value of the Direct Democracy Framework might be its ability to enable voting on issues in a simple support/do not support/no opinion format, nothing is preventing the framework from enabling additional voting formats. Multiple-choice surveys or multi-question initiatives could be added through a custom voting format configured by the initiative author or selected from a group of templates. In such a scenario, information for articulating the custom voting format would be sent along with the initiative for each end-user voting tool receiving it to decode and present information to the voter in the appropriate format.

Bundled Initiatives. Another important technical feature of the Direct Democracy Framework is its ability to bundle initiatives together. It may be important for a user to receive not only the initiative, but also other initiatives linked to it. Through this mechanism, the Direct Democracy Framework supports the amended initiatives and counter-initiatives.

Initiative Templates. The technical concept of an initiative template consists of a standard format for the creation of an initiative. This could include the formatting of content, allowable attachments, pre-defined quorum required and other attributes. Templates could be created by organizations that participate in the direct democracy framework and could be designed to facilitate easier petition, registration and ratification processing of the initiative in question.

Dynamic Initiatives. A dynamic initiative is one that focuses not on achieving an accurate vote at a certain point in time, but rather tracking a vote over a specific period of time. This would be implemented by allowing the End User Voting Tool to either record each individual transaction, or just recording the vote tally periodically at given time intervals. An example of a dynamic initiative might be one for example that tracks the approval rating of a certain political figure over time.

Vote Transaction Audit Trail. It is also a possibly valuable addition to the end user voting to permit it to track activities that the end user performs. This might be critical in highly secure or regulated voting environments. The voting activity audit trail could also be a source of data to create dynamic initiatives.

End User Voting Tool Replication, Backup and Software Updates. For users who wish to take advantage of the performance security and redundancy that can be built into an End User Voting Tool embedded into a voting management server, yet also take advantage of the convenience of a client device based End User Voting Tool, the Direct Democracy Framework could allow the configuration of replicated End User Voting Tools.

In this structure, one or more End User Voting Tools could be configured to manage the data associated with a single user and automatically forward data sent and received from each copy of the software to each other. This might be thought of as something very similar to the email configuration of someone using both an email server and a client based device to access the same email account.

This capability could easily be expanded to support the backup of data on an End User Voting Tool and the updating of the software on those tools.

Content Management. Another important role provided by the Voting Management Server is to store a repository of initiatives and their associated attachments that have been submitted to it—either in its forums or by petition—and their status. This would form a searchable database that would also be capable of automatically updating itself based on voter activity and date changes. Effective dates and expiration dates could be employed to automatically change the status of an initiative. This creates a virtual 'book of law,' allowing users to search and review proposed, current, and obsolete laws for a given institution or government. In addition, when the web based End User Voting Tool is employed, the content management features of the Voting Management Server can help make much more efficient use of storage space and vastly accelerate the time required to distribute initiatives through the use of a centralized content repository.

In this scenario, Initiative Packages would have key data elements such as content and attachments replaced by pointers to a centrally managed content repository. This would mean that any given attachment or content component that was references many times by initiatives on the server would only have to exist once. An initiative could be written and sent to hundreds or even thousands of users, and the content would only need to be replicated when a user whose End User Voting Tool did not reside on the server itself received the initiative. These content management capabilities leverage the existing technologies associated with internet-based content management.

Subscriber Notifications. In addition to subscribing to open forums, users of the Direct Democracy Framework would also be able to create profiles on the Voting Management Servers allowing them to receive initiatives of their choosing. This might include any initiative submitted to an open forum, only initiatives that are petitions, only registered initiatives or perhaps even only initiatives having gained a certain level of votes, petition signatures, or registered votes.

Enforcing Security. The primary purpose of the five steps of the Direct Democracy Framework is to create an environment that is flexible and yet secure enough to support a democratic process on any scale. There are additional technical features that the Voting Management Server can provide to enhance and streamline the implementation of effective security.

Additional Security Features of the Direct Democracy Framework. The following describes the various security features that can be integrated into the technology of the End User Voting Tool and the Voting Management Server. These features supplement rather than replace the security inherent in the five steps of the Direct Democracy Framework.

Initiative Validity. Certificate, encryption and hashing technologies could be used to ensure that an initiative is valid when it is received by an End User Voting Tool. If somehow an initiative became corrupted or changed and the content of the initiative did not hash correctly when compared by an appropriate algorithm to the initiative id, the End User Voting Tool would not allow a user to vote on it.

Digital Signature. As mentioned earlier in the document, during the registration phase, the digital signatures can optionally be attached to Voter Response Packages in order to ensure that the user's identity is valid.

Required Membership. The required membership feature of the Direct Democracy Framework would work by having initiatives labeled in accordance with the organizational membership required in order to vote on them. It would be implemented by allowing Voting Management Servers to issue certificates for registered membership in an organization, and adding a field to the Initiative Package & Voter Response Package that include a field for identifying required memberships.

Required Security Certification. Implemented in an identical manner to the membership feature discussed above, a required security certification feature, would identify the level of security that's successfully implemented in the End User Voting Tool being used. This security level would be established by updating, scanning and auditing of the End User Voting Tool by a Voting Management Server very similar to how virus scanning software and software distribution servers work today.

Centralized Voting Tree Implementation. By leveraging membership and/or security certification to require all users within a given organization to utilize an End User Voting Tool embedded into a secure and high performance server or set of servers, we are creating a highly secure and centralized voting tree. In this environment, response delays as well as the requirement to utilize the additional four steps of the Direct Democracy Framework could be eliminated. This could create an extremely fast and efficient mechanism for making formal democratic decisions within secure environments.

Security Fences. In the above example of the centralized voting tree implementation, it would further be possible to configure Voting Management Servers to prevent initiatives having certain membership or security restrictions to actually leave a server. Instead where a user outside a server was addressed, they could be sent an invitation to register with the organization managing the server in question. This feature could allow organizations to institute voting on classified or confidential items. This would be extremely convenient of users working in jobs requiring high security or confidentiality. They could use a single End User Voting Tool for all their voting activity and rely on security fences to keep important initiatives inside their secure environment. Security fences would compliment not replace other electronic security measures. For example a security fence sits above and beyond standard firewall security that would exist in a secure network.

Figure 22:
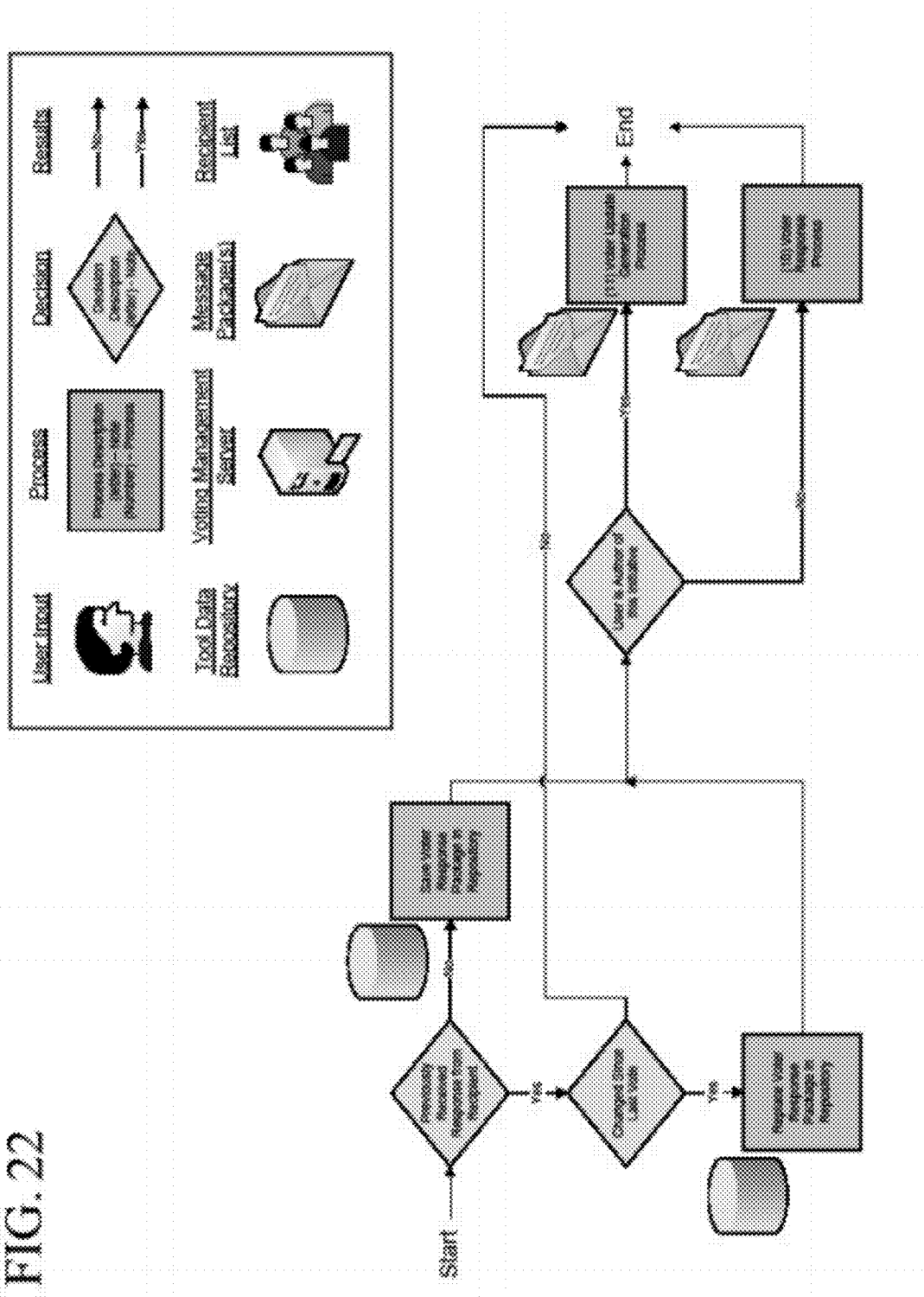

According to one aspect of the present invention, a computer processor implemented method of providing recursive voting is disclosed. The term "recursive" means repeated and in the context of the present invention refers to the fact that an initiative may be forwarded (and voted on) repeatedly. An initiative is a message that presents a new proposition, bill or measure. The initiative may be an original initiative, counter-initiative, bundled initiative, dynamic initiative (vote responses are changed and tracked over time) and amended initiative. The term "initiative" would be appreciated by those skilled in the art and is frequently used in a legislature of a new bill or measure. As depicted in FIGS. 1-4, there may be the step of creating an original initiative (18) by a creator (or author (12)) on a computing device (10) for transmission to at least one first level recipient (e.g. 14, 18, 22, 26, 30) on a computing device (e.g. 16, 20, 24, 28 and 32) wherein the original initiative (18) requires a vote response. There may be predetermined vote responses such as support for the initiative, rejection of the initiative, or no opinion to the initiative, and each first level recipient (e.g. 14, 18, 22, 26, 30) is selected by the creator. As will be appreciated by those of skill in the art, a vote response of support for the initiative means that the first level recipient (e.g. 14, 18, 22, 26, 30) agrees with or supports the proposition proposed in the initiative. Similarly, a vote response of rejection of the initiative means the first level recipient (e.g. 14, 18, 22, 26, 30) does not agree with or does not support the proposition proposed in the initiative. See also FIG. 22, depicting voter response in-processing.

Although the present invention envisions allowing recipient to vote on issues in a simple support/do not support/no opinion format, nothing is preventing the framework from enabling additional voting formats. Multiple-choice surveys or multi-question initiatives could be added through a custom voting format configured by the initiative author or selected from a group of templates. In such a scenario, information for articulating the custom voting format would be sent along with the initiative for each end-user voting tool receiving it to decode and present information to the voter in the appropriate format. There may, optionally, be the step of authenticating each vote response. Where authentication of user voting is required, each voter may be requested to register by physically visiting a site. Also users may be required to register and confirm their vote response in a secure computing environment provided by a voting management server.

The next step may be transmitting the original initiative (18) to each first level recipient (14, 18, 22, 26 and 30), wherein the original initiative (18) may not be altered once transmitted. The next step may be transmitting the initiative by at least one first level recipient (e.g. 14, 18, 22, 26 and 30) through a computing device (e.g. 16, 20, 24, 28 and 32) to at least one second level recipient (e.g. 36, 40), wherein each second level recipient (e.g. 36, 40) is selected by a first level recipient (e.g. 14) to provide selected second level recipients. It is important to note that the term "selected second level recipients" refers to those recipients selected by a first level recipient. For example, in FIG. 43, recipient first level recipient (14) transmits or forwards the initiative to selected second level recipients (34 and 38). The next step may be receiving in a computing device by each first level recipient (e.g. 14) a tabulation of vote responses from selected second level recipients (e.g. 24 and 38) to provide a second level vote tabulation, wherein each first level recipient receives a tabulation of vote responses from only their selected second level recipients. This is to say that first level recipient (14) receives a tabulation of vote responses from only those second level recipients (e.g. 24 and 38) that they have transmitted the initiative to, that is what is meant by "their selected second level recipients". Also note that the term "recipient" may mean an electronic address (typically an email address) associated with an intended person. The next step may be providing a first level vote tabulation for each first level recipient (e.g. 14) according to the second level vote tabulation and a vote response from the first level recipient. For example, recipient 34 may be in support of the initiative, recipient 38 may rejects the initiative and recipient 14 may be in support of the initiative. So the first level vote tabulation would be 2 in support and 1 rejecting the initiative. Note that the first level vote tabulation for a given first level recipient includes the second level tabulation for only their (the given first level recipients) selected second level recipients. So, for example, with reference to FIG. 43, First level recipient (30) would receive a second level vote tabulation tabulating votes from second level recipient (46) and second level recipient (42) and the first level tabulation for first level recipient (30) would be votes tabulation for recipients (42 and 46) and first level recipient (30)'s vote. It is important to note that the first level tabulation for first level recipient (30) would not include votes for those second level recipients that were forwarded the initiative from other first level recipients (For example, first level recipient (30) would not receive vote tabulations from second level recipients (34) and (38)), who were forwarded the initiative from first level recipient (14). The next step may be sending by a computing device the first level vote tabulation for each first level recipient to the creator of the original initiative to provide an originator total tabulation. There may be the step of creating a petition upon receiving a preponderance of a predetermined vote responses for the initiative transmitting said petition to a hosting organization. The next step may be submitting a petition to at least one organization (which may be a hosting organization) according to the originator total tabulation, wherein a preponderance of support responses in the originator total tabulation is needed for the initiative to be submitted for petition. This is to say that there must be more vote responses in support of the initiative than vote responses rejecting the initiative. Vote responses of no opinion are not counted. The creator's identity may be transmitted with the petition to the hosting organization. There may be the step of notifying each of recipient that the initiative is now being petitioned. Also, only selected recipients at designated levels may be notified that the initiative is now being petitioned.

Figure 43:
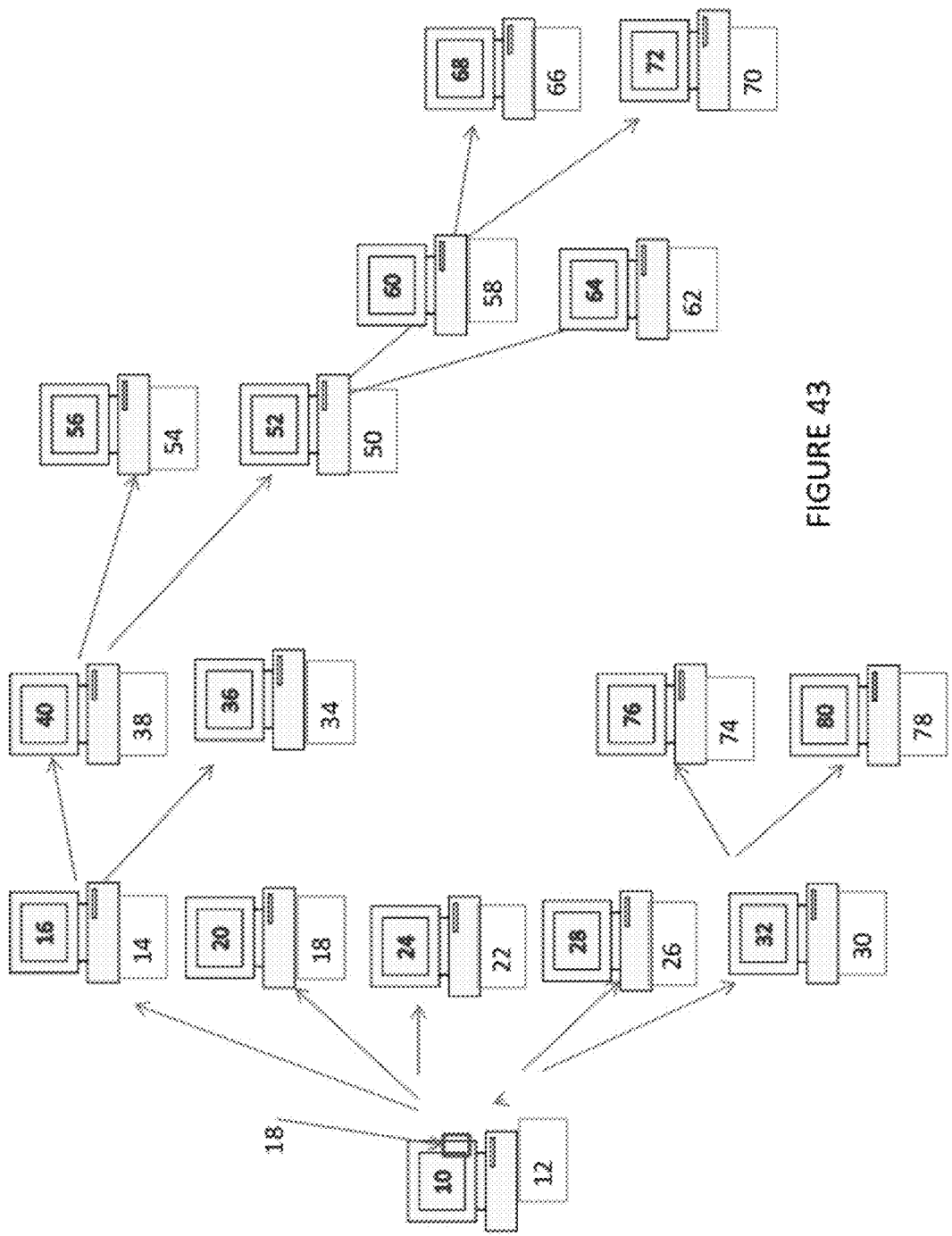
FIG. 43 depicts distributed recursive voting.

The next step may be transmitting by the creator a first level vote update to each first level recipient, wherein the first level vote update tabulates each vote response from each recipient. So for example, as shown in FIG. 43, a vote update would be sent from the creator computer (10) to recipient (14) computer (16), recipient (18) computer (20), recipient (22) computer (24), recipient (26) computer (28) and recipient (30) computer (32) and would tabulate all vote responses (e.g. vote responses by 12, 14, 18, 22, 26, 30, 38, 34, 74, 78, 54, 50, 58, 62, 66, 70). Vote responses may be anonymous. Anonymous voting can be supported in several different ways. First, in distributed voting each author or sender only know the identity of users they themselves send the Initiative to, all votes that reach them via recursive voting, are presented to them only as numbers of tabulated votes. Finally, Initiatives could be configured or individual End User Voting Tools could be configured so that the individual votes of even the recipients that a given Initiative was sent directly to are not displayed. The identity and vote would, of course, be contained in the Voter Response message, but it could be encrypted and not displayed directly in the Initiative. This would provide anonymous voting.

First level recipient 14 may receive a vote update saying there were 10 vote responses in support of the initiative and 6 vote responses rejecting the initiative. There may be the next step of transmitting by a computing device a vote update to each second level recipient, wherein the vote update tabulates all vote responses. While the vote update tabulates all vote responses received, it is transmitted by the first level recipient to their selected second level recipients. This is to say that second level vote updates are associated with a first level sender and their selected second level recipients. So, second level recipients would receive a vote update from a level one recipient who forwarded the initiative to them. So, for example, second level recipients (34) computing device (36) and second level recipient (38) computing device (40) would receive a vote update containing vote responses for all recipients (e.g. vote responses by 12, 14, 18, 22, 26, 30, 38, 34, 74, 78, 54, 50, 58, 62, 66, 70) from first level recipient (14) computing device (16). Second level recipients (74) computing device (76) and second level recipient (78) computing device (80) would receive a vote update containing vote responses for all recipients (e.g. vote responses by 12, 14, 18, 22, 26, 30, 38, 34, 74, 78, 54, 50, 58, 62, 66, 70) from first level recipient (30) computing device (32). The vote update may also contain other update information such as the petition status. Third level recipient (54) computing device (56) and third level recipient (50) computing device (52) would receive a vote update containing vote responses for all recipients (e.g. vote responses by 12, 14, 18, 22, 26, 30, 38, 34, 74, 78, 54, 50, 58, 62, 66, 70) from second level recipient (38) computing device (40).

The method may further comprise the steps of forwarding the initiative by at least one recipient (e.g. recipient 50 at a third level) to selected recipients (e.g. recipient (58 and) and (64) at a fourth level) to provide at least one forwarding recipient (50) and their associated selected recipients ((58) and (62)) at a numbered level (e.g. 4$^{th}$ level), the level being the number of times removed the initiative is from the creator. The term "number of times removed" denotes the number of levels the initiative has been transmitted from the creator. In FIG. 43, the Recipient (54) and Recipient (50) are at a third level, as the initiative was transmitted from the creator to a recipient (14) at a first level, recipient (14) transmitted or forwarded the initiative to a recipient (38) at a second level and recipient (38) transmitted the initiative to recipient (50) at a third level. The step of forwarding the initiative may be performed a predetermined number of levels. By way of example, the initiative may be forwarded a maximum of 20 levels. The next step would be iteratively receiving by each said at least one forwarding recipient (e.g. 38) in a computing device a leveled vote tabulation containing a tabulation of vote responses for that forwarding recipients associated selected recipients at a numbered level (e.g. vote responses for recipient (54) and recipient (50) and all at least one subsequent forwarding recipients (and their associated selected recipients up to the predetermined number of levels). So for example, (38) would receive a leveled vote tabulation containing a tabulation of votes for their associated selected recipients (e.g. (50, 54) at a numbered level (e.g. third level) and all subsequent forwarding recipients (e.g. recipient 58 and 62), transmitting by each said forwarding recipient a leveled vote tabulation update containing a tabulation of vote responses for that forwarding recipients associated selected recipients at that level.

There may be the steps of recursively forwarding an initiative by at least one recipient at a number level to selected recipients at a next numbered level to provide at least one forwarding recipient at a numbered level and their associated selected recipients at a next numbered level. So, for example, Recipient (50) at a third level may forward an initiative received from recipient (38) at a second level. Recipient (50) becomes a forwarding recipient by forwarding the initiative to their associated selected recipients (58 and 62) at a next level (a fourth level). Recipient (58) at a fourth level may then forward the initiative to recipients 66 and 70 at a fifth level. In this way it may be recursively forwarded.

The next step may be sending a vote response from each associated selected recipients (58, 62) at a next numbered level to their forwarding recipient (50) at a numbered level. The number of levels may be limited providing a level limit and once the level limit has been reached the step of forwarding an initiative ends. It should be understood that the vote response only goes from a selected recipient to the forwarding recipient. For example, at the fifth level vote responses would be sent from recipient (70) and recipient (66) to forwarding recipient (68).

The next step may be recursively calculating a cumulative branch vote tabulation to provide creator with said originator total tabulation. The term cumulative branch vote tabulation is intended to denote that the votes are each counted and added to create an originator total tabulation for each vote in response to an initiative that has been sent or forwarded. The term recursively is intended to denote that the calculation is repeated. In this way, we arrive at total vote responses by returned vote responses from associated selected recipients at a next level which includes all vote responses from any recipients they may have forwarded the initiative to. It is important to note that the vote responses at a given level (for example a fifth level) for recipients (66) and (70)) are sent back to the forwarding recipient (for example 58) at a prior level (e.g. fourth level) who forwarded the initiative. The vote response of recipients (70), (66), (58) and (62) are then sent to recipient (50) as a cumulative branch vote tabulation. The vote response of recipients (70), (66), (62), (58), (50) and (54) are sent to second tier recipient (38). The vote response of recipients (70), (66), (62), (58), (50), (54), (38), (34) are sent to recipient (14). The vote response of recipients (70), (66), (62), (58), (50), (54), (38), (34), (14), (18), (22), (26) and (30) are then sent to author (12) to create an originator total tabulation. Note that end user tools on each of the recipients computers would send the vote responses to their forwarding recipient (or the person who sent them the initiative). This would result in a distributed computer environment which would allow for large scale petitioning without the need for large scale infrastructure.

Each vote response may be weighted. The weighting may be, for example, according to shares in a company. The vote response may also be weighted according to the level. For example, the vote response of a first level recipient may be given more weight than the vote response of a second level recipient. This may be desirable were a person has a core group they would like to receive input from, and feel that input from anyone they forward it to is important, but may not be as important (for example). Accordingly, they may say that vote is given half of the weight of the forwarding recipient. So, for example, the first level are given full votes, the second level is given a 50% vote (so it takes 2 votes "in support of" to register as 1 vote in support of) and so on. This feature may also work by allowing the author to designated an initiative as a weighted initiative then apply a particular percentage weight to each recipient. When recursive voting is utilized, the percentage assigned to a particular recipient could then be broken down by that recipient to their own list of recipients. Such a feature might be very valuable in the financial services industry where the voting on a particular issue is weighted by the number of shares or percentage of ownership. A given public company could send a stockholder initiative to all shareholders, then if a given stockholder happened to be a mutual fund, that fund could then forward to fund member based on the number fund shares they owned.

Each vote response and the tabulation of vote responses may be anonymous. This is to say, when a particular recipient submits a vote response of "in support of" it just shows up as 1 vote "in support of". There is no indication who the vote has been placed by. This may be accomplished by invisible message types. Within your End User Voting Tool area of your email application, the only message type that would be visible to you as the user would be the Initiatives. New Voter Responses and Voter Updates would not appear in any of the folders themselves, they would only serve to update the tabulation of voting and the petition status within an Initiative. Information received from these invisible message types would not be displayed independently it would be displayed within the initiative in the appropriate context.

The voting management server may create a statistically valid sampling lottery and randomly select a limited number of voters to appear as delegates to a congress to validate the registered vote. The validated registered vote may be ratified by the appropriate conventional government bodies. Non-government entities may confirm the legitimacy of the initiatives sent to them and write into law the process by which these initiatives would be enforced.

Another important technical feature of the Direct Democracy Framework is its ability to bundle initiatives together. It may be important for a user to receive not only the initiative, but also other initiatives linked to it. Through this mechanism, the Direct Democracy Framework supports the amended initiatives and counter-initiatives discussed in the original document.

The present invention also provides a system for providing recursive voting on a distributed network of computing devices, the system comprising: an end user voting tool on at least two voters computing devices (e.g. 16, 20), each end user voting tool having at least an initiative package message type, a voter response message type and a voter update message type; an initiative (18) created by a creator (12) on a creator computing device (10) which requires a vote response, wherein the creator selects first level recipients (e.g. 14, 18, 22, 26 and 30) to be sent the initiative as an initiative package message type from the creator (12) to the first level recipients (e.g. 14, 18, 22, 26 and 30). It should be understood that when we say any level recipients are selected (for example "the creator selects first level recipients to be sent the initiative") we are referring to selecting their email addresses or other electronic means to send the initiative to them. For example, it may be on a forum and the recipient may have a screen name. This will be appreciated by those of skill in the art to mean that the creator selects electronic addresses for the recipient, so that the recipient receives, for example, the initiative. The End user voting tool in each first level recipients computing device (e.g. 16, 20, 24, 28 and 32) receives an initiative package message type from the creators computing device (10) and provides an initiative to each at least one first level recipient which requires a predetermined vote response to the initiative and according to the vote response by each first level recipient (e.g. 14, 18, 22, 26 and 30) a voter response message type containing a vote response for each at least one first level recipient is sent back to the creator computing device (10) as a voter response message type. The first level recipient may transmit the initiative package message type through a computing device (e.g. 16) to at least one second level recipient (34, 38) to provide a first level recipients selected second level recipients (34, 38). The end user voting tool in at least one second level recipients computing device (36, 40) receives an initiative package message type from a first level recipient computing device (16) and provides an initiative to each at least one second level recipient (e.g. 34, 36) which requires a predetermined vote response to the initiative and according to the vote response by each second level recipient a voter response message type containing a vote response for each at least one second level recipient is sent back to the first level recipient computing device (16) as a voter response message type. The end user tool on each at least one first level recipients computing devices (e.g. 16, 20, 24, 28 and 32) tabulates each vote response received for each at least one second level recipient that they transmitted the initiative to, to provide a second level vote tabulation. The end user voting tool on each first level recipients computing device (e.g. 16, 20, 24, 28 and 32) generates and sends a vote update by a voter update message type to the first level recipients selected second level recipients computing device (36, 40) containing at least the vote tabulation for all recipients. So, for example, if first level recipient 14 elected to forward the initiative to second level recipients (34, 38), the vote update sent to second level recipients (34, 38) would contain all vote responses (originator total tabulation) but would only be sent by the first level recipient to their selected second level recipients. If, for example, recipient 30 forwarded the initiative on their computing device (32) to two other second levels recipients (74 and 78) and their computing devices (76 and 80) they would also receive a vote update from first level recipient (30) containing all vote responses. The end user tool on the creators computing device (10) tabulates each vote response received for each recipient to provide an originator total tabulation. The end user tool on the creators computing device (10) generates and sends a vote update by a voter update message type containing at least the originator vote tabulation to the creator and each first level recipient computing device (e.g. 16, 20, 24, 28 and 32) by a voter update message type. The end user tool on the creators computing device transmits the originator total tabulation to a voting management server which submits a petition to at least one organization according to the originator total tabulation, wherein a preponderance of predetermined responses in the originator total tabulation is needed for the initiative to be submitted for petition.

The initiative may also be is recursively forwarded by at least one recipient at a numbered level (for example, a second level recipient at a second level) may forward the initiative to selected recipients (e.g. 54, 50) computing devices (e.g. 56, 52) at a next numbered level (a third level) to provide at least one forwarding recipient (e.g. 38) at a numbered level (second level) and their associated selected recipients (e.g. 54, 50) at a next numbered level (third level). Each associated selected recipients (e.g. 54, 50) at a next numbered level (in this example, the third level) sends a voter response message type containing a vote response to their forwarding recipients (38) computing device (40). The end user tool on each forwarding recipients computing device (e.g. 40) calculates a cumulative branch vote tabulation. In this example, the end user voting tool on each forwarding recipients computing device would tabulate all vote responses received and send it to the recipient who forwarded them the initiative and add those vote responses to the tabulation, in this way it is cumulative. For example, Recipient (58) computing device (60) would receive voter response message type containing vote responses from recipient (66) computing device (68) and recipient (70) computing device (72). Recipient (50) computing device (52) would receive voter response message type containing a vote responses from recipient 58 (which because it is cumulative would include vote responses from recipient (66) and recipient (70)) and recipient (62). Recipient (38) computing device (40) would receive voter response message type containing a vote responses from recipient (54) computing device (56) and recipient (50) computing device (52) (which because it is cumulative would include vote responses from recipient (58), recipient (62), recipient (66) and recipient (70)). Recipient (14) computing device (16) would receive voter response message type containing a vote responses from recipient (34) computing device (36) and recipient (38) computing device (40) (which because it is cumulative would include vote responses from recipient (50), recipient (54), recipient (58), recipient (62), recipient (66) and recipient (70)). Then finally, creator (12) computing device (10) would receive voter response message type containing cumulative vote responses from recipient (14) computing device (16) (which because it is cumulative would include vote responses from recipient (34), recipient (38), recipient (50), recipient (54), recipient (58), recipient (62), recipient (66) and recipient (70)); recipient (18) computing device (20); recipient (22) computing device (24); recipient 26 computing device (28); and recipient (30) computing device (32) (which because it is cumulative would include vote responses from recipient (74) computing device (76) and recipient (78) computing device (80). This would represent the originator total tabulation, which is the total tabulation for the entire tree. The end user voting tool on each forwarding recipients computing device would then transmit a vote update by voter update message type to their associated selected recipients, wherein the vote update contains at least the originator total tabulation. So for example, recipient (30) computing device (32) would transmit a vote update by voter update message type to recipient (74) computing device (76)

and recipient (78) computing device (80). The vote update may be a tabulation of vote responses for all recipients or the originator total tabulation (in this example vote responses for recipients 14, 18, 22, 26, 30, 74, 78, 34, 38, 54, 50, 58, 62, 66 and 70). As always the vote update may be a weighted update and may be anonymous. The voter response packages contain the tabulations of the branches and flow along the tree in the direction of the originator, tabulating each level as they go, the Voter Update is the total tabulation, it does not change as it moves through the tree until a new Voter Update is sent by the Originator.

The initiative package message type may be delayed (or not sent) until the timestamp of the latest Voter Update Package has aged by not more than the send delay setting multiplied by the number of levels removed from the initiator plus some minimal allowed delay. This addresses the issue of what happens when a branch of the voting tree becomes broken or disconnected—a problem that results in the downstream recursive voting portion of the voting tree linked to the disconnected recipient not being able to reach the initiator so that a complete and accurate tally of the votes is maintained. By relying on the timestamp of the Voter Update Package sent from the initiating end-user voting tool, we can subsequently restrict recursive voting to being initiated only after an indication is received down the voting tree that determines the original vote has most likely already been tallied. Note the term initiator is interchangeable with creator, author. This control mechanism could stunt the growth of any broken branches of the voting tree until the breach is reconnected, thereby preventing new users from becoming connected to the broken branch of the tree. The basic principle is that by ensuring that the Vote Update received is recent this ensures the likelihood that the connection to the initiator or author is still intact. Recipients with old or "stale" Voter Updates, would not be able to send out recursive votes.

The present invention has been described in relation to particular examples, which are intended to be illustrative rather than restrictive, with the scope and spirit of the invention being indicated by the following claims and their equivalents.

What is claimed is:

1. A computer processor implemented method of providing recursive voting comprising the steps of:
    Creating, by a computing device, an initiative package requiring a predetermined vote response by a creator on a computing device for transmission to at least one first level recipient selected by the creator on a computing device;
    transmitting, by a computing device, the initiative package to each first level recipient computing device;
    preventing alterations to the initiative package by the computing device once transmitted;
    transmitting, by a computing device, the initiative package by at least one first level recipient computing device to at least one second level recipient selected by a first level recipient on a computing device enabling selecting of second level recipients;
    receiving by a computing device by each first level recipient a tabulation of vote responses from only their selected second level recipients to provide a second level vote tabulation;
    providing, by a computing device, a first level vote tabulation for each first level recipient according to the second level vote tabulation and a vote response from the first level recipient;
    sending, by a computing device, the first level vote tabulation for each first level recipient to the creator of the initiative package to provide an originator total tabulation,
    submitting, by a computing device, a petition to at least one organization according to the originator total tabulation;
    requiring, by the computing device, a preponderance of a predetermined vote responses in the originator total tabulation for the initiative package to be submitted for petition;
    transmitting by the creator computing device a vote update containing at least the originator total tabulation to each first level recipient computing device;
    wherein the vote update contains at least the originator total tabulation;
    transmitting, by each first level recipient computing device, the vote update to each selected second level recipient computing device.

2. The computer processor implemented method of claim 1 further comprising the step of weighting each vote response.

3. The computer processor implemented method of claim 1, further comprising the steps of:
    recursively forwarding an initiative package by at least one recipient computing device at a numbered level to selected recipients at a next numbered level to provide at least one forwarding recipient and their associated selected recipients;
    sending a vote response, by a computing device, from each associated selected recipients to their forwarding recipient;
    recursively calculating, by a computing device, a cumulative branch vote tabulation to provide creator with said originator total tabulation;
    transmitting by each at least one forwarding recipient computing device to their associated selected recipients a vote update containing at least the originator total tabulation.

4. The computer processor implemented method of claim 3, wherein the number of numbered levels has a limit providing a level limit and once the level limit has been reached the step of recursively forwarding an initiative package ends.

5. The computer processor implemented method of claim 1, wherein each said vote response and said tabulation of vote responses is anonymous.

6. The computer processor implemented method of claim 3, wherein said vote response is weighted according to the level.

7. The computer processor implemented method of claim 1, further comprising the steps of:
    creating a petition upon receiving a preponderance of support for an initiative package;
    transmitting said petition to a hosting organization;
    transmitting with said petition the creator's identity to said hosting organization.

8. The computer processor implemented method of claim 1, further comprising the step of notifying each of recipient that the initiative package is now being petitioned.

9. The computer processor implemented method of claim 3, further comprising the step of notifying selected recipients at designated levels that the initiative package is now being petitioned.

10. The method of claim 1, further comprising the step of authenticating each vote response.

11. The method of claim 1, further comprising the step of generating a counter-initiative by a recipient and automatically recording a vote to oppose an original initiative, wherein said counter-initiative becomes an initiative attached to the original initiative.

12. The computer processor implemented method of claim 1, further comprising the step of tracking, by a computing device, vote response changes over time to provide a dynamic initiative.

13. The computer processor implemented method of claim 1, wherein said initiative is selected from the group consisting of initiative, counter-initiative, bundled initiative, dynamic initiative and amended initiative.

14. The computer processor implemented method of claim 1, further comprising automatically triggering, by a computing device, an event once a number of votes received reaches an entered quorum.

15. The computer processor implemented method of claim 1, wherein said vote update also contains the petition status.

* * * * *